US012041491B2

(12) United States Patent
Hsieh et al.

(10) Patent No.: US 12,041,491 B2
(45) Date of Patent: Jul. 16, 2024

(54) SEQUENCE NUMBER TRANSFER FOR RADIO BEARERS

(71) Applicant: GOOGLE LLC, Mountain View, CA (US)

(72) Inventors: Jing Hsieh, Taipei (TW); Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 401 days.

(21) Appl. No.: 17/615,090

(22) PCT Filed: May 28, 2020

(86) PCT No.: PCT/US2020/034906
§ 371 (c)(1),
(2) Date: Nov. 29, 2021

(87) PCT Pub. No.: WO2020/243291
PCT Pub. Date: Dec. 3, 2020

(65) Prior Publication Data
US 2022/0232431 A1     Jul. 21, 2022

Related U.S. Application Data

(60) Provisional application No. 62/854,304, filed on May 29, 2019.

(51) Int. Cl.
*H04W 36/00* (2009.01)
*H04L 1/1607* (2023.01)
*H04W 80/02* (2009.01)

(52) U.S. Cl.
CPC ....... *H04W 36/0033* (2013.01); *H04L 1/1621* (2013.01); *H04W 36/0022* (2013.01);
(Continued)

(58) Field of Classification Search
CPC ......... H04W 36/0033; H04W 36/0022; H04W 36/0066; H04W 36/0069; H04W 80/02;
(Continued)

(56) References Cited

U.S. PATENT DOCUMENTS 8,208,498 B2   6/2012   Kitazoe et al.
8,379,855 B2   2/2013   Kubota et al.
(Continued)

FOREIGN PATENT DOCUMENTS

CN   103533586 A   1/2014
CN   105594251 A   5/2016
(Continued)

OTHER PUBLICATIONS

English Translation with respect to KR Publication No. 102597009 (Year: 2018).*
(Continued)

*Primary Examiner* — Ian N Moore
*Assistant Examiner* — Sun Jong Kim
(74) *Attorney, Agent, or Firm* — MARSHALL, GERSTEIN & BORUN LLP

(57) ABSTRACT

One or more processors, operating in a source base station and/or a target base station, determines a change in the termination point from the source base station to the target base station for a radio bearer with a current count value according to data unit sequencing. The one or more processors determine (1806) whether a user equipment (UE) changes the data unit sequencing as a result of the change in the termination point. In a first instance, the one or more processors cause the target base station to apply (1810) the current count value to the radio bearer, in response to determining that the data unit sequencing does not change. In a second instance, the one or more processors cause the target base station to apply (1820) a new count value
(Continued)

different from the current count value to the radio bearer, in response to determining that the data unit sequencing changes.

20 Claims, 39 Drawing Sheets

(52) U.S. Cl.
CPC ... *H04W 36/0066* (2013.01); *H04W 36/0069* (2018.08); *H04W 80/02* (2013.01)

(58) Field of Classification Search
CPC ............. H04W 36/0055; H04W 36/08; H04W 36/00222; H04W 36/00224; H04W 36/00226; H04W 36/0064; H04W 36/00692; H04W 36/00695; H04W 36/00698; H04W 36/083; H04W 36/085; H04W 36/087; H04W 36/13; H04L 1/1621
See application file for complete search history.

(56) References Cited

U.S. PATENT DOCUMENTS

| | | | |
|---|---|---|---|
| 10,334,471 B2 | 6/2019 | Koskinen | |
| 10,375,606 B2 | 8/2019 | Futaki et al. | |
| 10,448,447 B2 | 10/2019 | Wu | |
| 10,972,947 B2 | 4/2021 | Balasubramanian et al. | |
| 11,026,091 B2 | 6/2021 | Zhang et al. | |
| 11,310,856 B2 | 4/2022 | Kim et al. | |
| 11,330,439 B2 | 5/2022 | Kim | |
| 11,337,118 B2 | 5/2022 | Ingale et al. | |
| 11,457,498 B2 | 9/2022 | Teyeb et al. | |
| 2018/0083688 A1 | 3/2018 | Agiwal et al. | |
| 2020/0028564 A1 | 1/2020 | Agiwal et al. | |
| 2020/0068639 A1* | 2/2020 | Kim | H04W 76/16 |
| 2020/0120572 A1* | 4/2020 | Fiorani | H04W 36/06 |
| 2020/0374961 A1* | 11/2020 | Ingale | H04W 36/00698 |
| 2021/0045029 A1 | 2/2021 | Ryu | |
| 2021/0127362 A1 | 4/2021 | Jin et al. | |

FOREIGN PATENT DOCUMENTS

| | | |
|---|---|---|
| CN | 106134099 A | 11/2016 |
| CN | 107211475 A | 9/2017 |
| EP | 3182758 A1 | 6/2017 |
| KR | 102597009 B1 * | 11/2023 |
| WO | WO-2018/127842 A1 | 7/2018 |
| WO | WO-2019/031947 A1 | 2/2019 |
| WO | WO-2019/066588 A1 | 4/2019 |

OTHER PUBLICATIONS

First Examination Report for India Application No. 202147056755, dated May 17, 2022.
Office Action, Japanese Patent Application No. 2021-570496, dated Dec. 9, 2022.
Search Report for European Application No. 21216496.6, dated Mar. 10, 2022.
Notice of Reasons for Rejection for Japanese Application No. 2021-570496, dated Dec. 19, 2022.
First Office Action for Chinese Application No. 202080052324.3, dated Sep. 11, 2023.
Google, "Correction to SN Status Transfer Considering PDCP Version Change," 3GPP Draft (2019).
Google, "Discussion on PDCP Version Change and SN Status Transfer," 3GPP Draft (2019).
HTC, "TP For Status Transfer," 3GPP Draft (2017).
International Search Report and Written Opinion for Application No. PCT/US2020/034906, dated Aug. 19, 2020.
Samsung, "PDCP for MCG DRB and SRB," 3GPP Draft (2017).
Samsung, "PDCP Operations During PDCP Version Change in EN-DC," 3GPP Draft (2017).
ETSI, "ETS TS 137 340 V 15.8.0 (Jan. 2020); Universal Mobile Telecommunications System (UMTS); LTE; 5G; NR; Multi-Connectivity; Overall Description; Stage-2 (3GPP TS 37.340 version 15.8.0 Release 15)," (2020).

* cited by examiner

SEQUENCE NUMBER TRANSFER FOR RADIO BEARERS

FIELD OF THE DISCLOSURE

This disclosure relates generally to wireless communications and, more particularly, to transferring sequence numbers for radio bearers when modifying termination points for the radio bearers.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP TS 36.323) and New Radio (NR) (see TS 38.323) provides sequencing of protocol data units (PDUs) in the uplink direction (from a user equipment (UE) to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages and use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include non-access stratum (NAS) messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of either the MN or the SN can be referred to as split DRBs.

To establish, modify, release, etc. and otherwise operate on radio bearers, UEs and base stations use PDCP entities. A UE that supports EUTRA and NR radio interfaces can include EUTRA PDCP and NR PDCP entities. An Evolved Node B (eNB) that supports EUTRA and a 5G Node B (gNB) can include EUTRA PDCP and NR PDCP entities, respectively, but in some cases an eNB also can include an NR PDCP entity.

In various dual connectivity scenarios related to SN addition, SN modification, and SN release, etc., as well as in some single connectivity scenarios related to handover for example, base stations modify the termination point for a radio bearer so that, at the radio access network (RAN) end, the radio bearer switches between EUTRA and NR PDCP versions. For example, an eNB can configure a UE with a DRB and then "offload" the DRB to a gNB. Although EUTRA PDCP and NR PDCP are generally similar, due to some of the differences between these protocols (e.g., sequence number (SN) bit length, optional integrity in a DRB, duplication and discarding policies for radio bearers), a UE establishes different respective PDCP entities for radio bearers that use EUTRA PDCP and NR PDCP. There are situations when the differences between PDCP entities, and particularly the differences in sequencing, cause UEs or base stations to lose data units when changing termination points of radio bearers.

SUMMARY

A base station of this disclosure supports various scenarios in which the termination point of a radio bearer changes from one base station to another base station. The base station determines whether this change also results in a change in the PDCP version (e.g., from EUTRA PDCP to NR PDCP, from NR PDCP to EUTRA PDCP) due to which the data unit sequencing changes for the radio bearer. In particular, the UE can establish a new PDCP entity and accordingly restart the data unit sequencing. The base station then determines, based on whether there is a change in the PDCP version, whether the current count value for the radio bearer should continue to increase, or whether the count value should resume at some default value (e.g., zero) after the termination point of the radio bearer changes. More particularly, the base station determines whether the base station to which the termination point of the radio bearer changes should use the current count value or reset the counter.

In some implementations, a base station that transmits the Sequence Number (SN) Status Transfer message (which can convey the DL count and the UL count values for a radio bearer) determines whether or not it should include the current count value in the message. When the base station determines that it should not include the current count value, the base station can determine to not send the SN Status Transfer message at all, when there are no other radio bearers for which the base station is attempting to transfer the SN status. In other implementations, a base station transmits the current count value in the SN Status Transfer message regardless of whether there is a change in PDCP version for a radio bearer, but the receiving base station determines whether it should discard (i.e., ignore) the count value due to the change in PDCP version. In further implementations, a base station that transmits the SN Status Transfer message (which can convey the DL count and the UL count values for a radio bearer) sets the DL count value to a default DL count value instead of the current DL count value and sets the UL count value to a default UL count value instead of the current UL count value, if there is a change in PDCP version for a radio bearer. The default DL count value and the default UL count value can be same or different. In a typical case, the current DL count value is different from the DL default value, and the current UL count value is different from the default UL count value. The base station that receives the SN Status Transfer message uses the default DL count value and default UL count value for the radio bearer.

In some scenarios, the termination point for a radio bearer changes from a gNB supporting NR PDCP to an eNB supporting EUTRA PDCP. In other scenarios, the termination point for the radio bearer changes from an eNB supporting EUTRA PDCP to gNB supporting NR PDCP. In yet other scenarios, both the old termination point and the new termination point of the radio bearer are eNBs, but because one or both eNBs support EUTRA PDCP as well as NR PDCP, the PDCP version changes as a result of the change in the termination point.

An example embodiment of these techniques is a method in a network for changing a termination point of a radio bearer. The method can be executed by one or more processors and includes determining a change in the termination point from a source base station to a target base station for the radio bearer with a current count value according to data unit sequencing. The method further includes determining whether the data unit sequencing changes as a result of the change in the termination point. In a first instance, in response to determining that the data sequencing does not change, the method causes the target base station to apply the current count value to the radio bearer. In a second instance, in response to determining that the data sequencing changes, the method causes the target base station to apply a new count value different from the current count value to the radio bearer.

Another embodiment of these techniques is a base station including processing hardware and configured to implement the method above.

DETAILED DESCRIPTION OF THE DRAWINGS

Figure 1A:
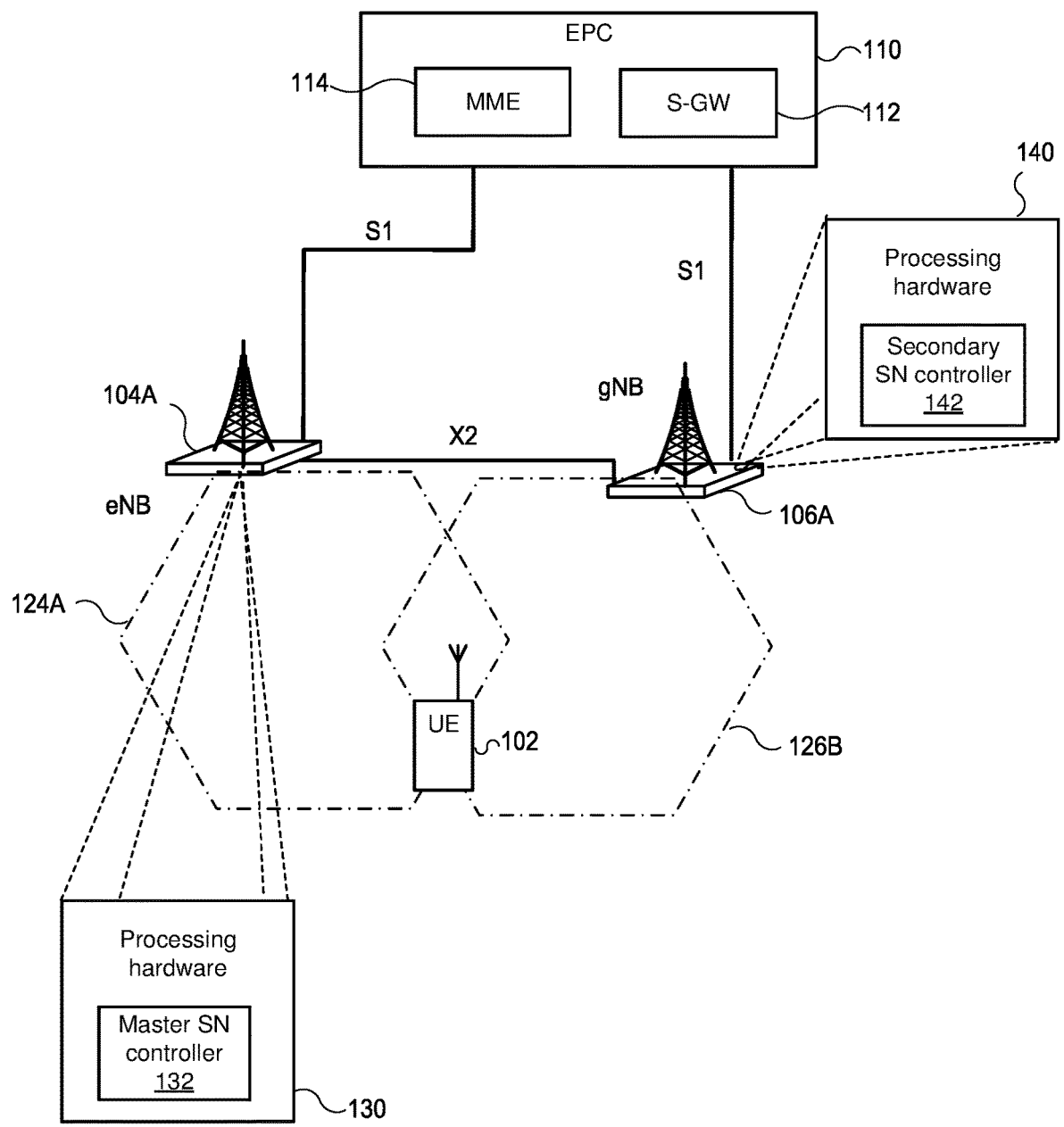
FIG. 1A is a block diagram of an example system in which a master node (MN) and/or a secondary node (SN) can implement the sequence number (SN) management techniques of this disclosure.

FIG. 1A depicts an example wireless communication system in which a UE 102 uses a radio bearer that at different times terminates at an eNB 104A or a gNB 106A. The eNB 104A and/or the gNB 106A implement the techniques of this disclosure for managing SN status transfer so that the UE 102 does not miss inbound or outbound data units as a result of the radio bearer changing its termination point.

Both base stations 104A and 106A can connect to the same core network (CN), an evolved packet core (EPC) 110. The gNB 106A accordingly can be implemented as an en-gNB, or a base station that supports the NR radio interface as well as an S1 interface to the EPC 110. To directly exchange messages during DC scenarios and other scenarios discussed below, the eNB 104A and the gNB 106A can support an X2 interface.

Among other components, the EPC 110 includes a Serving Gateway (S-GW) 112 and a Mobility Management Entity (MME) 114. Generally speaking, the S-GW 112 is configured to transfer user-plane packets related to audio calls, video calls, Internet traffic, etc., and the MME 114 is configured to manage authentication, registration, paging, and other related functions.

As illustrated in FIG. 1A, the eNB 104A supports a EUTRA cell 124A, and the gNB 106A supports an NR cell 126A. The cells 124A and 126A can partially overlap, so that the UE 102 can communicate in DC with the eNB 104A and the gNB 106A operating as an MN and a SN, respectively. More particularly, when the UE 102 is in DC with the eNB 104A and the gNB 106A, the eNB 104A operates as an MeNB, and the gNB 106A operates as an SgNB. In other scenarios, the eNB 104A can hand the UE 102 over to the gNB 106A or, conversely, the gNB 106A can hand the UE 102 over to the eNB 104A. In general, the EPC 110 can include any suitable number of base stations supporting NR cells and/or EUTRA cells. An example configuration in which the EPC 110 is connected to additional base stations is discussed below with reference to FIG. 1B.

Although the examples below refer specifically to an EPC and specific RAT types, 5G NR and EUTRA, in general the techniques of this disclosure also can apply to other suitable radio access and/or core network technologies.

The eNB 104A is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes a master SN controller 132 configured to manage SN status transfer messaging when the eNB operates as an MN. The gNB 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes a secondary SN controller 142 configured to manage SN status transfer messaging when the gNB operates as an SN.

Figure 1B:
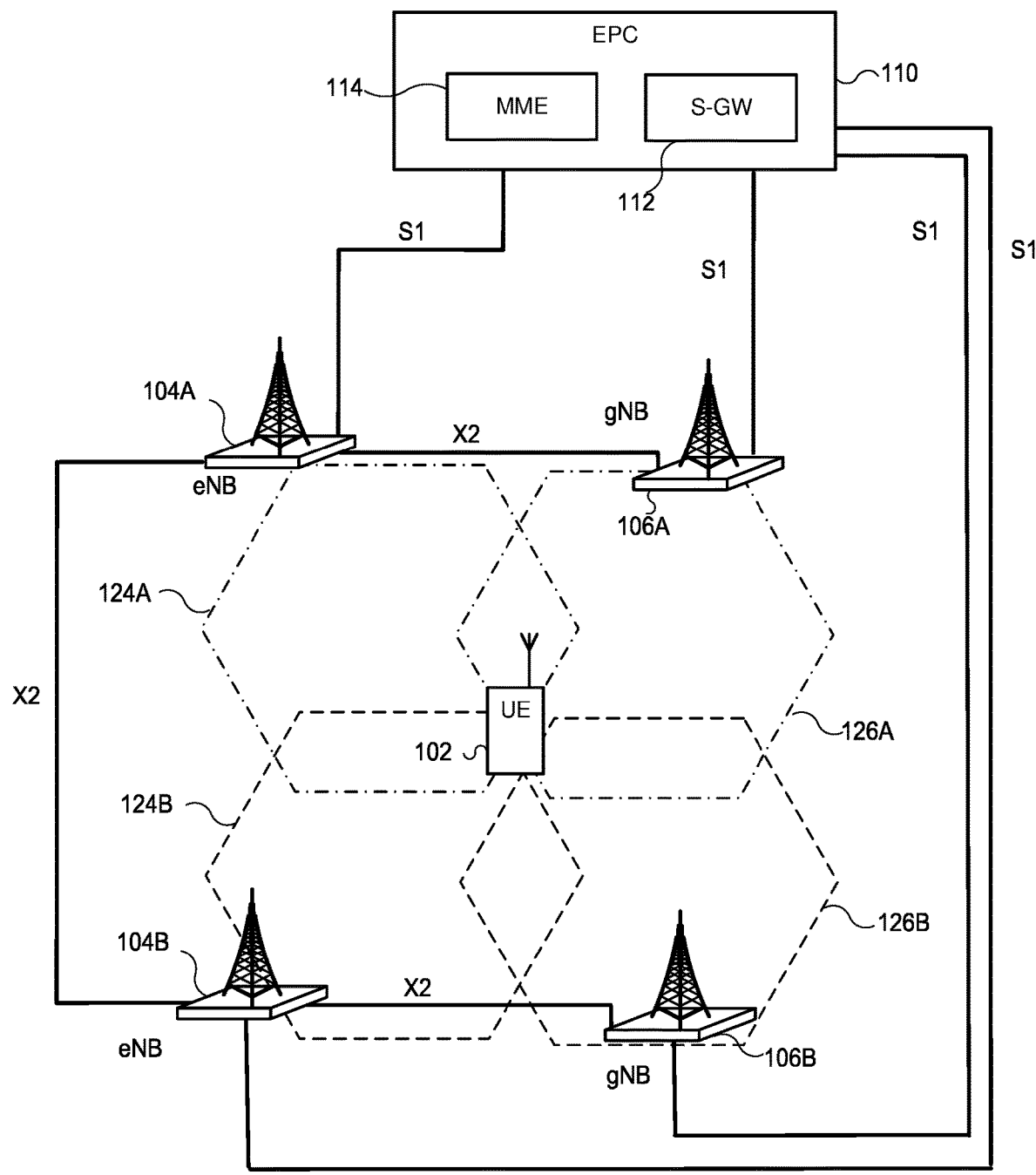
FIG. 1B is a block diagram of another example system in which the MN and/or the SN can implement the SN management techniques during an inter-MN handover.

FIG. 1B illustrates another implementation of the network 100, where the EPC 110 is connects to an eNB 104B and a gNB 106B in addition to the eNB 104A and the gNB 106A. The eNB 104B can be implemented similar to the eNB 104A, and the gNBs 106A and 106B also can have a similar implementation. The eNB 104B supports a EUTRA cell 124B, and the gNB 106B supports an NR cell 126B. As discussed below, the base stations 104A and 104B can support an inter-MN handover, so that the UE can continue operating in DC after release a connection with the eNB 104A and selecting the cell 124B of the eNB 104B, for example.

Figure 2A:
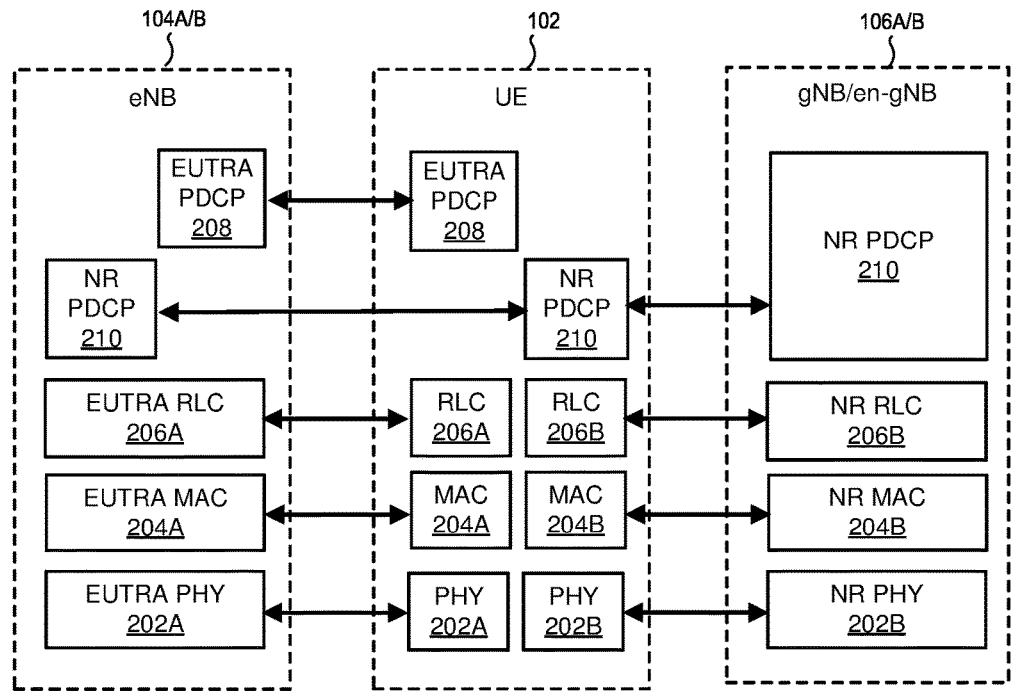
FIG. 2A is a block diagram of a protocol stack according to which the of FIGS. 1A and 1B communicates with an eNB and a gNB.

Next, FIG. 2A illustrates in a simplified manner a radio protocol stack according to which the UE 102 can communicate with the eNBs 104A/104B and the gNBs 106A/106B.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA PDCP sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the eNB 104A operating as a MeNB and the gNB 106A operating as a SgNB, the network can provide the UE 102 with an MN-terminated MCG DRB that uses EUTRA PDCP 208 or MN-terminated MCG radio bearer that uses NR PDCP 210. The network in various scenarios also can provide the UE 102 with SCG bearers and split bearers, which use only NR PDCP 210.

Figure 2B:
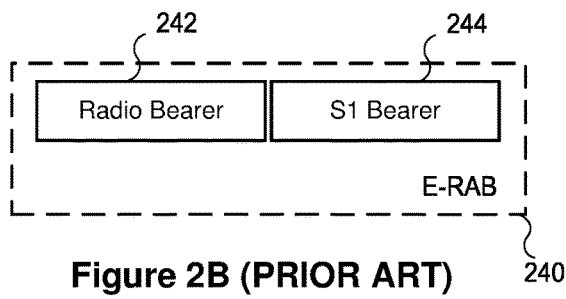
FIG. 2B is a block diagram of a EUTRA network (EU-TRAN) radio access bearer (E-RAB) which the devices of FIGS. 1A and 1B can modify during operation.

As illustrated in FIG. 2B, an E-RAB 240 is a concatenation of a radio bearer 242, such as an SRB or a DRB, and an S1 bearer 244. Referring back to FIG. 1, for example, the UE 102 can obtain a certain E-RAB made up of a DRB terminated at the eNB 104A and S1 bearer on the communication link between the eNB 104A and the EPC 110. The UE 102 thus can exchange packets with the EPC 110 over the E-RAB. In some implementations, the current value of the UL count consists of a PDCN-SN and a HFN associated with the first missing UL PDCP SDU related to the DRB. The current value of the DL count consists of a PDCP-SN and a HFN that the target base station should assign for the next DL PDCP SDU not yet having a sequence number.

In various scenarios discussed below, the base stations and the UE 102 can reconfigure the E-RAB so that the DRB component changes from an MN-terminated to an SN-terminated DRB, and the termination point of the S1 bearer component changes from a source base station to a target base station. The master SN controller 132 and/or the secondary SN controller 142 manage the transfer of the sequence numbers associated with the radio bearer depending on the types of PDCP entities which the source base station and the target base station use. The source base station in some cases transmits to the target base station an SN Status Transfer message that includes an identifier of the E-RAB and/or an identifier of the DRB.

Figure 2C:
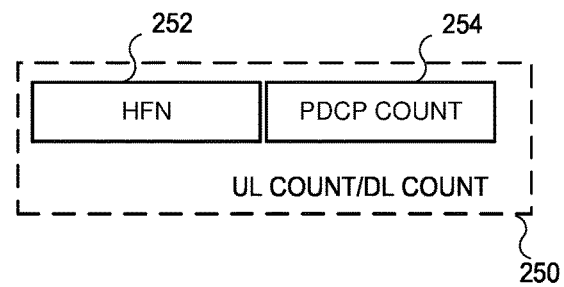
FIG. 2C is a block diagram of a downlink (DL) or uplink (UL) count which the devices of FIGS. 1A and 1B can use to sequence data units.

As discussed in more detail below, the source base station in some cases includes an indication of the current count value for the DRB in the SN Status Transfer message. FIG. 2C illustrates an example format according to which a base station or a UE to can specify the current value of the DL count and/or the UL count. For convenience, this disclosure may refer to the current DL count and the UL count values collectively as a single "current count value" associated with the DRB. The count 250 includes a Hyper Frame Number (HFN) 252 and a PDCP-SN 254. The PDCP-SN can occupy M bits, for example, and the HFN can occupy N bits, to convey the current value of the DL count. The PDCP-SN 252 and the HFN 254 similarly can occupy M and N bits, respectively, to convey the current value of the DL count. In another implementation, the PDCP-SN 252 and the HFN 254 can occupy L and K bits, respectively, to convey the current value of the UL count.

Figure 2D:
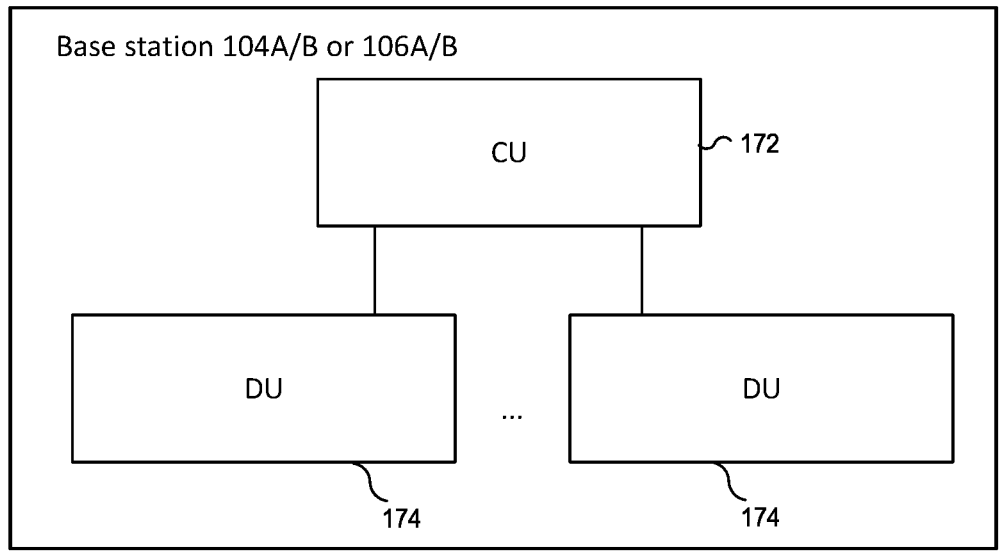
FIG. 2D is a block diagram of a known distributed architecture of a base station that can operate in the system of FIG. 1A or FIG. 1B.

FIG. 2D depicts an example distributed (or "disaggregated") implementation of a base station such as the base station 104A, 104B, 106A, or 106B. The base station in this implementation can include a central unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. The DU 174 is also equipped with processing hardware that can include one or more general-purpose processors such as CPUs and non-transitory computer-readable memory storing machine-readable instructions executable on the one or more general-purpose processors, and/or special-purpose processing units. The CU 172 and the one or more DUs can be connected via an F1 interface.

Figure 2E:
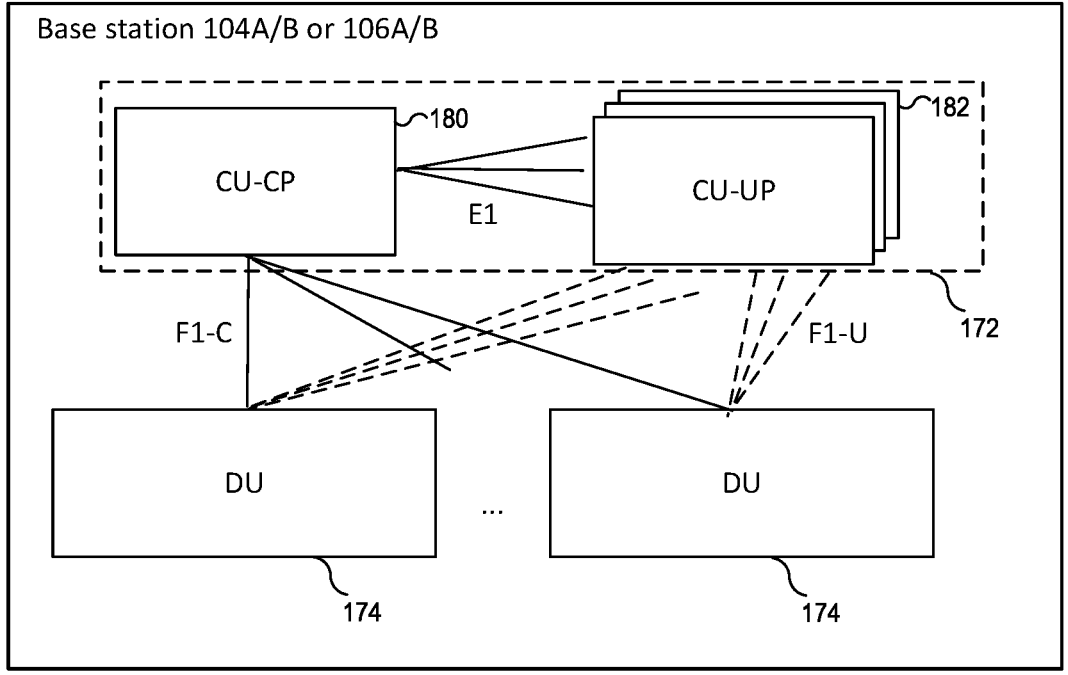
FIG. 2E schematically illustrates interaction between Control Plane (CP) and User Plane (UP) components in the distributed architecture of FIG. 2D.

Now referring to FIG. 2E, the base station 104 A/B or 106A/B can include a CU Control Plane (CP) modules (CU-CP) 180, one or more CU User Plane (UP) modules (CU-UP) 182 and one or more base station DU(s) 174. The CU is a logical node that can support RRC, SDAP and PDCP protocols when the base station is a gNB, or RRC and PDCP protocols when the base station is an en-gNB or an eNB. The DU is a logical node that can support RLC, MAC and PHY layers of the gNB or en-gNB. The CU can partially control the operation of the DU. Each DU can support one or multiple cells.

The base station CU-CP is a logical node that can support the RRC and the control plane part of the PDCP protocol of the gNB-CU for an en-gNB or a gNB. The base station CU-UP is a logical node that can support the user plane part of the PDCP protocol of the base station CU for an en-gNB (or eNB), and the user plane part of the PDCP protocol and the SDAP protocol of the base station CU for a gNB. The CU-UP can be connected to the base station CU-CP via an E1 interface. The CU-CP can select the appropriate CU-UP(s) for the requested services for the UE and manage the bearer using bearer context management functions.

As discussed in more detail below, the CU-CP in some cases initiates the Bearer Context Modification procedure by sending an E1 interface message (e.g., Bearer Context Modification Request as specified in 3GPP TS 38.463), which may include a PDCP SN Status Information IE (e.g. as specified in 3GPP TS 38.463), to request that the CU-UP apply the SN count values. In addition to a change in PDCP version (E-UTRA PDCP or NR PDCP), an EN-DC operation can involve a change in PDCP SN length or RLC mode, performed using a release and add of a DRB or full configuration. An MR-DC with 5GC operation can involve a change in PDCP SN length change or RLC mode change.

Several example scenarios in which the devices operating in the system of FIG. 1A or 1B manage the transfer of the sequence numbers associated with a radio bearer are discussed next with reference to FIGS. 3A-11B.

Figure 3A:
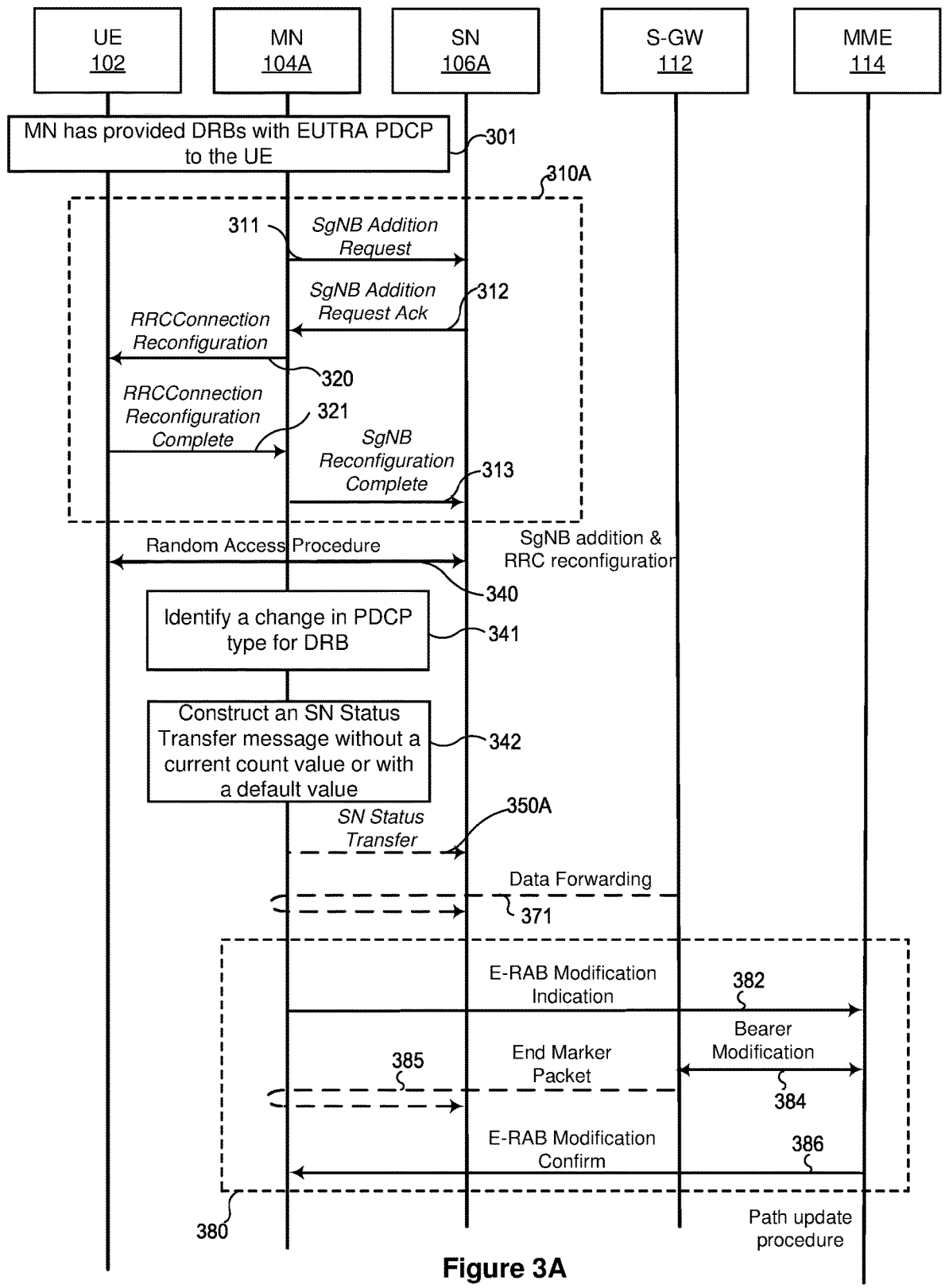
FIG. 3A illustrates a scenario in which an MN, during secondary node addition, determines that an MN-terminated DRB is configured with a EUTRA PDCP and does not provide the current count value for the DRB to the SN.

Referring first to FIG. 3A, the eNB 104A in this scenario operates as an MN. During secondary node addition, the eNB 104A determines that an MN-terminated DRB uses EUTRA PDCP and constructs an SN Status Transfer message without a current count value. More specifically, the eNB 104A initially provides 301 the UE 102 with an DRB $D_A$ terminated at the eNB 104A, i.e., an MN-terminated DRB. The eNB 104A also provides the UE 102 with an RLC acknowledge mode (AM) configuration, which generally requires an acknowledgment for every transmission. The RLC AM (Radio Link Control Acknowledge Mode) configuration also causes the eNB 104A to transmit an SN Status Transfer message, or determine that no such transmission is necessary, and perform data forwarding when the eNB 104A changes the termination point of the DRB $D_A$, as discussed below.

To allow the UE 102 to communicate in DC, the eNB 104A determines to change the termination point of the DRB $D_A$ from the eNB 104A to the gNB 106A. In other words, the eNB 104A offloads the MN-terminated DRB $D_A$ to the gNB 106A and makes the DRB $D_A$ an SN-terminated DRB. The eNB 104A and the gNB 106A then perform 310A an SgNB addition procedure, and the eNB 104A and the UE 102 perform the reconfiguration of the RRC connection at this time.

To this end, the eNB 104A first transmits 311 an SgNB Addition Request message to the gNB 106A. The eNB 104A includes in the SgNB Addition Request message an indication that the gNB 106A should reconfigure the DRB $D_A$ as an SN-terminated DRB. To identify the DRB $D_A$, the eNB 104A can include an identity of the DRB $D_A$ (DRB ID) and/or the identity of the E-RAB EA to which the DRB belongs (E-RAB ID) in the corresponding IE or field of the SgNB Addition Request message. The eNB 104A can indicate that the gNB 106A should set up a PDCP entity by setting the pDCPatSgNB flag to "present" in the SgNB Addition Request message.

The gNB 106A responds 312 with an SgNB Addition Request Acknowledge message. The SgNB Addition Request Acknowledge message includes SCG configuration (e.g., an CG-Config IE), which in turn includes a RadioBearerConfig IE, for configuring the DRB $D_A$ at the UE 102. In some cases, the gNB 106A further includes SCG cell group configuration (e.g., an SCG-CellGroupConfig IE). The SCG-CellGroupConfig IE can include at least one of physical cell group configuration (physicalCellGroupConfig), medium access control cell group configuration (macCellGroupConfig), RLC bearer configuration (RLC-BearerConfig) and special cell configuration (spCellConfig) for a primary secondary cell (PSCell) of the gNB 106A base station.

The eNB 104A transmits 320 an RRCConnectionReconfiguration message with the SCG configuration to UE 102. The RadioBearerConfig IE in the SCG configuration includes an indication that the MN-terminated DRB $D_A$ that used EUTRA PDCP should become an SN-terminated DRB that uses NR PDCP. In some cases, the eNB 104A includes the scg-CellGroupConfig in the RRCConnectionReconfiguration message.

The UE 102 connects to the SN 106A in accordance with the SCG information in the RRCConnectionReconfiguration message. In particular, the UE 102 reconfigures the DRB $D_A$ in accordance with the information in the RadioBearerConfig IE. As part of the reconfiguration, the UE 102 establishes an NR PDCP entity for the SN-terminated DRB $D_A$. The UE 102 then expects to receive downlink PDCP packets with sequence numbers starting at zero and, conversely, when the UE 102 has uplink PDCP packets to transmit, the UE 102 assigns sequence numbers to the packets starting at zero.

In response to the RRCConnectionReconfiguration message, the UE 102 transmits 321 an RCConnectionReconfigurationComplete message to the eNB 104A. The eNB 104A then transmits 313 an SgNB Reconfiguration Complete message to the gNB 106A. Upon completing 310A the SgNB addition procedure and RRC reconfiguration procedure, the eNB 104A and the gNB 106A operate as an MN and an SN, and accordingly are referred to below as an MN 104A and an SN 106A.

In some cases, the RRCConnectionReconfiguration message the UE 102 receives 320 from the MN 104A includes an indication that the UE 102 should perform a random access procedure. The indication can be a flag or field in the spCellConfig IE, for example. The UE 102 accordingly performs 340 a random access procedure during which the UE 102 transmits a random access preamble to the SN 106A and receives a random access response in response, for example. After the random access procedure completes, the SN 106A can begin to communicate downlink and uplink data with the UE 102 using the DRB $D_A$, which now is an SN-terminated DRB as discussed above. The data can include PDCP SDUs and PDCP PDUs.

The MN 104A determines 341 whether the change in the termination point of the DRB $D_A$ results in a change in the PDCP version the DRB $D_A$ uses (e.g., EUTRA PDCP, NR PDCP). In the scenario of FIG. 3A, the MN 104A determines that the MN-terminated DRB $D_A$ (which the MN 104A is transforming into an SN-terminated DRB) was configured to use EUTRA PDCP, but the new termination point SN 106A uses NR PDCP because the SN 106A is a gNB. The SN 106A therefore will configure the SN-terminated DRB $D_A$ with NR PDCP and RLC AM. Thus, the MN 104A determines that changing the termination point of the DRB $D_A$ also causes a change in the PDCP version for the DRB $D_A$.

For the reasons discussed above, a change in the PDCP version, such as the change from EUTRA to NR, causes the UE 102 to rely on a different PDCP entity and effectively reset data unit sequencing. For example, the MN 104A may have sent 200 PDUs in the downlink direction over the DRB $D_A$, and the current count value for the DRB $D_A$ for the downlink direction (i.e., the DL count) accordingly is 200 in accordance with the EUTRA PDCP data unit sequencing. However, because the UE 102 will reconfigure the DRB $D_A$ using NR PDCP 210, the UE 102 expects the DL count to be zero.

Because the MN 104A has determined that the PDCP version of the DRB $D_A$ will change as a result of the change in the termination point, the MN 104A constructs 342 an SN Status Transfer message without a current count value. As a more specific example, the MN 104A can construct an SN Status Transfer message and not include any information related to the DRB $D_A$, such as the E-RAB ID, UL count value, or a DL count value. The MN 104A then transmits 350A the SN Status Transfer message to the SN 106A via the X2 interface.

Further, the MN 104A in some scenarios can determine to not transmit an SN Status Transfer message to the SN 106A at all. The MN 104 generally can identify multiple DRBs that change their termination points within a RAN. When one or more of these DRBs use the same PDCP version at the prior termination point and the new termination point, the MN 104A includes at least an identifier of the DRB or the E-RAB to which the corresponding DRB belongs, the current DL count of the DRB, and the current UL count value in the SN Status Transfer message. The MN 104A does not include this formation for any of the DRBs for which the PDCP version changes change due to a change in the termination point. When the PDCP version changes for each of the DRBs, the MN 104A does not construct or transmit an SN Status Transfer message at all.

In another example implementation, if the MN 104A has determined that the PDCP version of the DRB $D_A$ will change as a result of the change in the termination point, the MN 104A constructs an SN Status Transfer message, sets the UL count value to a default UL count value (e.g., zero), sets the DL count value to a default DL count value (e.g., zero), and includes the E-RAB ID, the UL count value and the DL count value for the DRB $D_A$ in the SN Status Transfer message. The MN 104A then transmits 350A the SN Status Transfer message to the SN 106A via the X2 interface. The SN 106A applies the UL count value and the DL count value respectively to a UL count and a DL count for the DRB $D_A$.

In these cases, the SN 106A can determine that each of the DRBs with a change in the termination point will have a change in the PDCP version based on the information in the SgNB Addition Request message. For example, the SN 106A can process the mcg-RB-Config field of the CG-ConfigInfo IE. The SN 106A accordingly can determine that the MN 104A will not send an SN Status Transfer message. In this manner, the SN 106A can avoid waiting for the SN Status Transfer message and using a timer to avoid waiting more than a certain predetermined amount of time.

With continued reference to FIG. 3A, because the SN 106A does not receive the current count value for the DRB $D_A$, the SN 106A applies a default value such as zero to the UL count and the DL count for the DRB $D_A$. The SN 106A modifies the DRB $D_A$ to establish an SN-terminated DRB, using NR PDCP and according to the information in the SgNB Addition Request message (see event 311) related to the DRB $D_A$. The SN 106A begins to assign sequence numbers starting with zero to downlink packets. In the uplink direction, the SN 106A expects packets from the UE 102 to have sequence numbers staring with zero.

In another scenario, however, the eNB 104A can determine that there is no change in the PDCP version due to the change in the termination point of the DRB $D_A$. The eNB 104A in this case generates an SN Status Transfer message and includes the current value for the DRB $D_A$. An example format 250 according to which the eNB 104A can specify the DL count value and/or the UL count value is discussed above with reference to FIG. 2C. The gNB 106A receives the SN Status Transfer message and assigns the PDCP-SN to the first downlink PDCP packet the gNB 106A transmits the PDCP packet using the SN-terminated DRB. The gNB 106A also encrypts the first downlink PDCP packet, to generated an encrypted downlink PDCP packet, using the HFN and the PDCP-SN. The gNB 106A generates a PDCP packet including the PDCP-SN and the first encrypted downlink packet SDU and transmits the PDCP packet over the SN-terminated DRB to the UE.

As a more specific example, the eNB 104A operating as a source base station can modify the termination point of a DRB $D_A$ when the current value of the DL count is X, determine that the PDCP version does not change for the DRB $D_A$, and provide the current value X to the target base station (e.g., the gNB 106A) in an SN Status Transfer message. The target base station begins to assign sequence numbers X, X+1, X+2, etc. to PDCP SDUs and transmit the corresponding packets in the downlink direction to the UE. In some implementations, the target base station compresses the PDCP SDUs sequentially by header compression or data compression, when the SN-terminated DRB includes header compression or data compression in its configuration. Further, in some implementations, the target base station can perform integrity protection for the PDCP SDUs with PDCP sequence numbers X, X+1, X+2, . . . using the DL count value, DL count value+1, DL count value+2, etc., respectively, when the SN-terminated DRB includes integrity protection in its configuration. Still further, the target base station can encrypt the PDCP SDUs with PDCP sequence numbers X, X+1, X+2, . . . using the DL count value, DL count value+1, DL count value+2, etc., respectively, when the SN-terminated DRB includes encryption in its configuration. For each of the PDCP SDUs, the target base station can generate a PDCP PDU including a PDCP sequence number corresponding to the PDCP SDU and the processed (compressed and/or integrity-protected and/or encrypted) PDCP SDU and transmit the PDCP PDU to the UE via the radio interface.

As a further example, when the SN Status Transfer message specifies a UL count value for a certain SN-terminated DRB, the target base station can use the UL count value to process PDCP PDUs or SDUs received over the SN-terminated DRB. The format according to which the SN Status Transfer message can convey the UL count can be similar to the format of DL count, as discussed above with reference to FIG. 2C. When the current value of the UL count is Y, the target base station expects the UE 102 to transmit the first PDCP SDU with PDCP sequence number set to Y, followed by PDCP SDUs with sequence numbers Y, Y+1, Y+2, etc. In some implementations, the target base station decrypts the received PDCP SDUs sequentially using the UL count value, UL count value+1, UL count value+2, etc., when the SN-terminated DRB includes encryption n in its configuration. The target base station can perform integrity protection for the PDCP SDUs with PDCP sequence numbers Y, Y+1, Y+2, . . . using the UL count value, UL count value+1, UL count value+2, etc., respectively, when the SN-terminated DRB includes integrity protection in its configuration. Still further, the target base station can decompress the PDCP SDUs that passed integrity checking with PDCP sequence numbers Y, Y+1, Y+2, . . . using the UL count value, UL count value+1, UL count value+2, etc., respectively, when the SN-terminated DRB includes header decompression and/or data decompression in its configuration.

In contrast to the scenarios in which the target base station applies the current value of DL count and UL count in encryption and decryption, integrity protection and checking, compression and decompression, etc., the SN 106A performs these procedures by using a default number such as zero as the value of the DL count and UL count. More particularly, the SN 106A can assign zeros to the PDCP-SN and HFN fields of the DL count and zeros to the PDCP-SN and HFN fields of the UL count, and perform encryption, decryption, integrity protection, etc. as discussed above.

Still referring to FIG. 3A, while the MN 104A, the SN 106A, and the UE 102 transform the DRB $D_A$ from an MN-terminated DRB to an SN-terminated DRB, the MN 104A performs 371 data forwarding between the SGW 112 and the SN 106A for the E-RAB that includes the DRB $D_A$. The MN 104A, the S-GW 112, and the MME 114 then perform 380 a path update procedure. In particular, the MN 104A first transmits 382 an E-RAB Modification Indication message to the MME 114. The MME 114 then transmits 384 bearer modification information to the S-GW 112. The S-GW 112 in turn indicates the completion of data forwarding 371 by transmitting 385 an end marker packet to the MN 104A, which in turn transmits the end marker packet to the SN 106A. Finally, the MME 114 transmits 386 an RAB Modification Indication Confirm message to the MN 104A.

According to another implementation, the MN 104A provides the current count value associated with the DRB $D_A$ to the SN 106A, but the SN 106A can determine to not apply the current count value to the DRB $D_A$ when the termination point of the DRB $D_A$ changes (i.e., ignore or discard the received current count value).

Figure 3B:
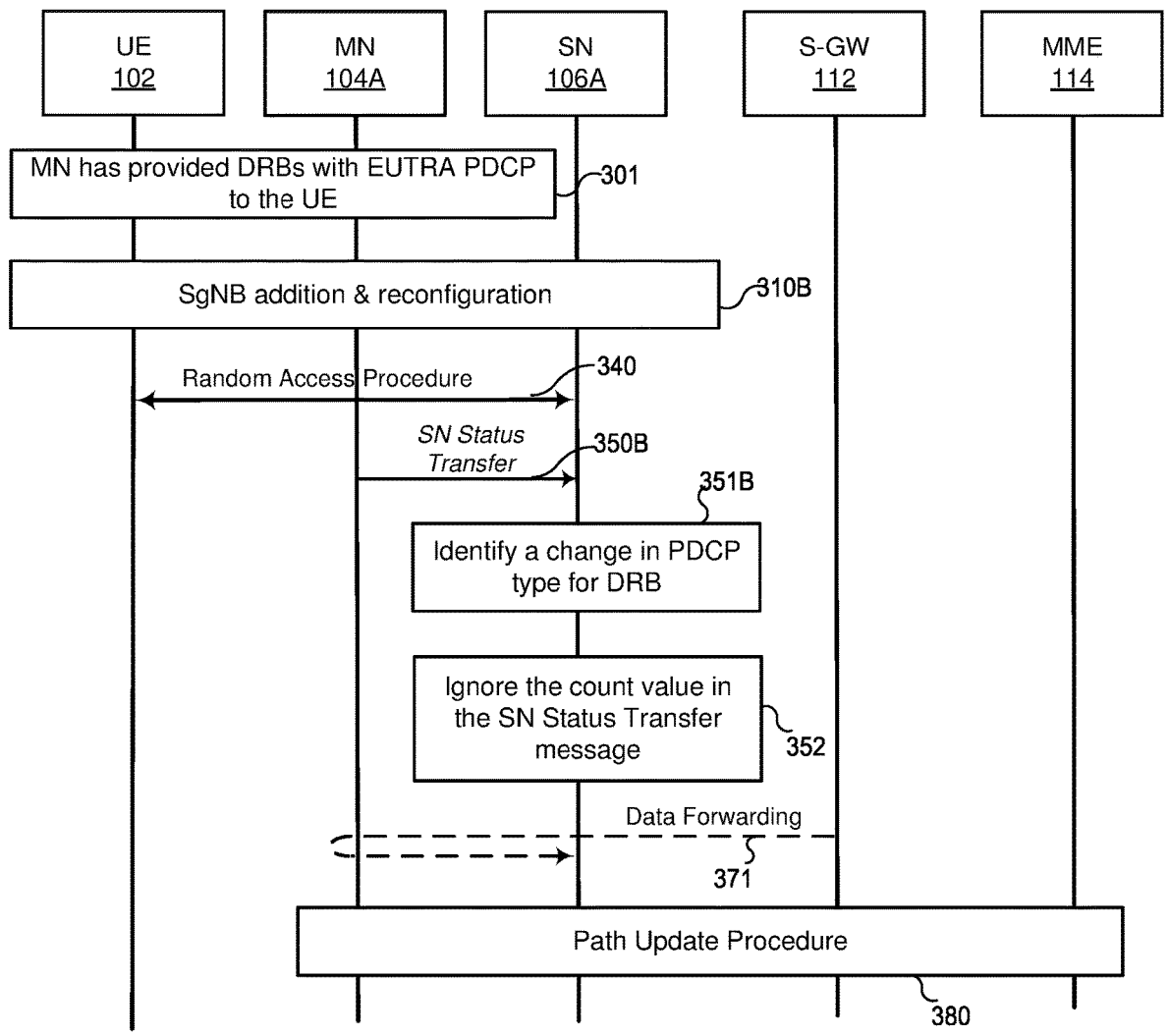
FIG. 3B illustrates a scenario in which an SN, during secondary node addition, determines that an MN-terminated DRB is configured with a EUTRA PDCP and ignores the count value in the SN status transfer message from the MN.

In particular, FIG. 3B illustrates an example scenario in which the MN 104A, after performing 310B an SgNB addition procedure (similar to procedure 310A of FIG. 3A), constructs an SN Status Transfer message and transmits 350B the SN Status Transfer message to the SN 106A. The MN 104A includes the current count value in the SN Status Transfer message regardless of whether the change in the termination point of the DRB $D_A$ results in a change in the PDCP version the DRB $D_A$ uses.

However, after the SN 106A receives 350B the SN Status Transfer message, the SN 106A determines 351B whether the change in the termination point of the DRB $D_A$ results in a change in the PDCP version the DRB $D_A$ used (e.g., EUTRA PDCP, NR PDCP). As discussed above, the SN 106A can make this determination using the mcg-RB-Config field of the CG-ConfigInfo IE included in the SgNB Addition Request message, which the SN 106A received during the procedure 310B.

The SN 106A in this scenario determines that the PDCP version of the DRB $D_A$ will change as a result of the change in the termination point and ignores 352 the current value included in the SN Status Transfer message. The SN 106A then applies a default value such as zero to the UL count and the DL count for the DRB $D_A$, as discussed above. On the other hand, if the SN 106 determines that there is no change in the PDCP version due to the change in the termination point of the DRB, the SN 106A applies the current count value, which can include the UL count and the DL count, to the subsequent packets as discussed above. The scenario then proceeds similar to the scenario of FIG. 3A.

Figure 3C:
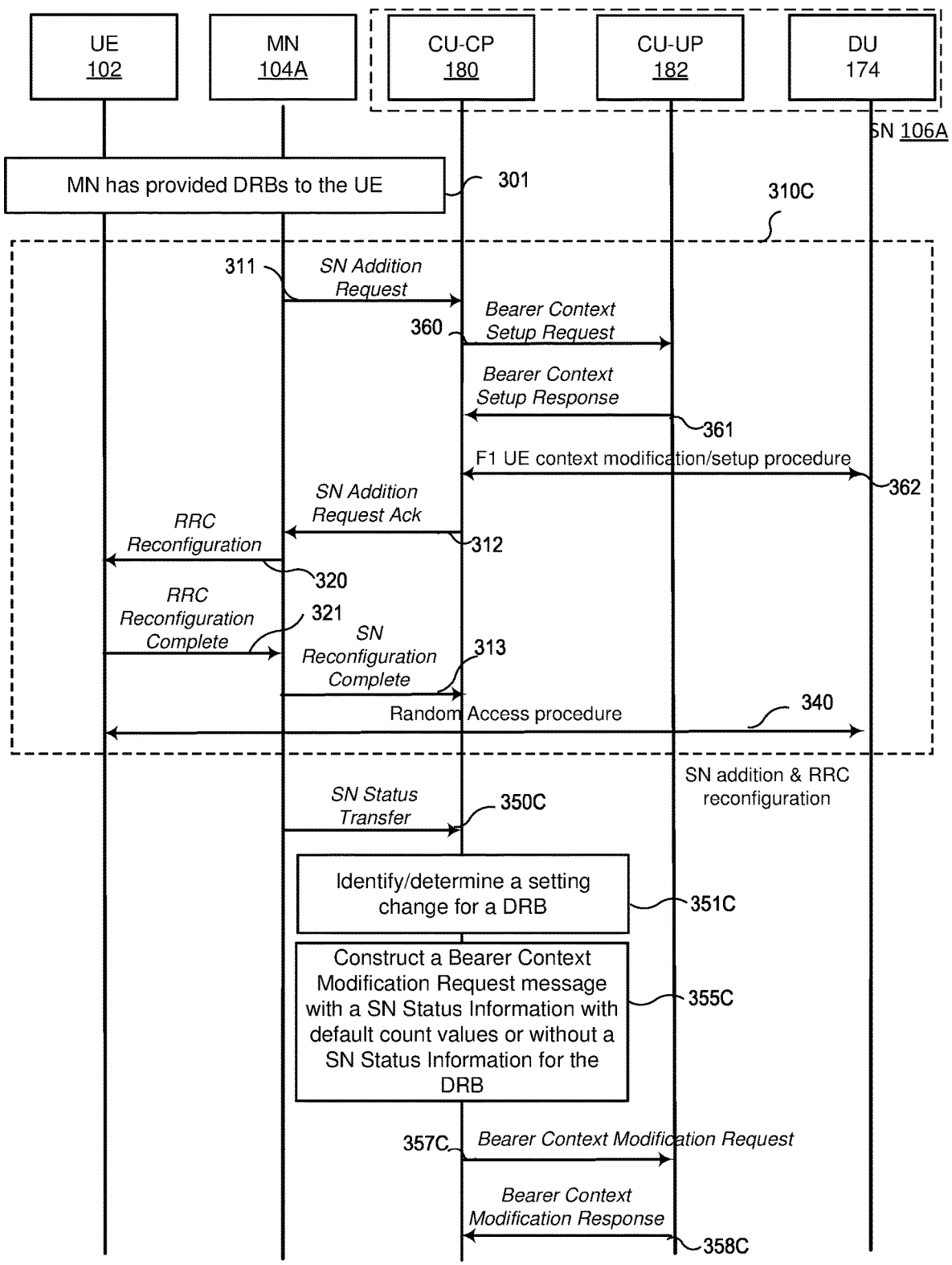
FIG. 3C illustrates a scenario in which a control-plane component of a central unit (CU-CP), operating in an SN, receives an SN status transfer message from the MN but does not provide the current value for a DRB to the user-plane component (CU-UP) during secondary node addition.
Figure 3D:
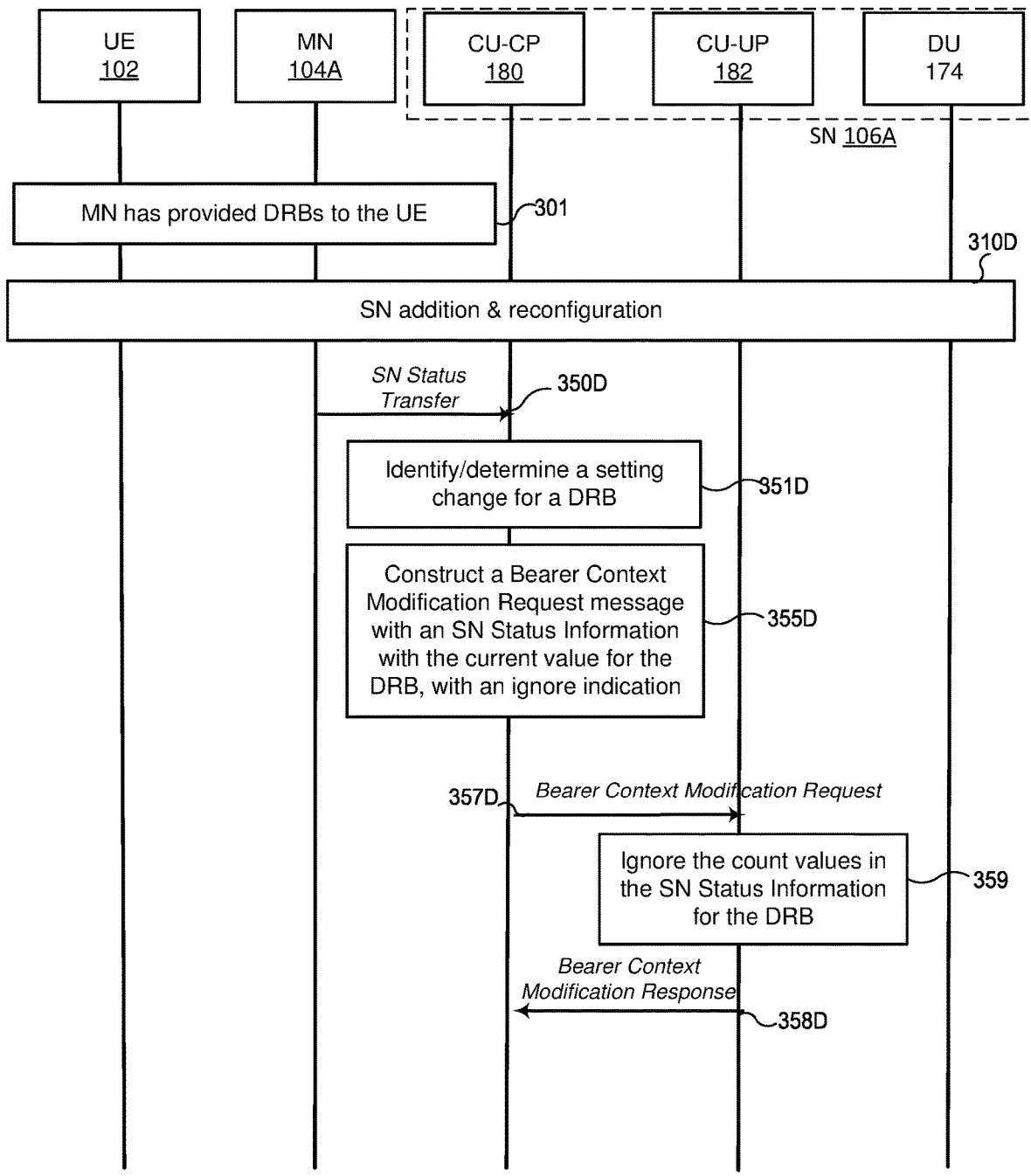
FIG. 3D illustrates a scenario in which a control-plane component of a distributed unit (CU-UP), operating in an SN, ignores the count value for a DRB received from a CU-CP.

In the scenarios of FIGS. 3C and 3D, the SN 106A is implemented as a distributed base station including an SN CU-CP 180, an (SN) CU-UP 182, and an SN-DU 174. The SN CU-CP 180 and SN CU-UP 182 exchange information regarding the current count value for a DRB.

In particular, in the scenario of FIG. 3C, the MN 104A initially provides 301 the UE 102 with one or more DRBs including a DRB $D_C$. The MN 104A begins an SN Addition procedure 310C by transmitting 311 an SN Addition Request message to the SN CU-CP 180 and modifies the termination point of the DRB $D_C$, from the MN 104A to the SN 106A. The SN CU-CP 180 transmits 360 a Bearer Context Setup Request message to the SN CU-UP 182, which then responds 461 with Bearer Context Setup Response message to the SN CU-CP 180. The SN CU-CP 180 initiates an UE context modification or setup procedure by transmitting 462 an F1 UE context setup or modification message to the SN-DU 174. The events 360 and 462 need not always occur in the order illustrated in FIG. 3C.

The SN CU-CP 180 then transmits 312 an SN Addition Request Acknowledge message to the MN 104A. Next, the MN 104A transmits 320 an RRC reconfiguration (e.g. RRC-ConnectionReconfiguration or RRCReconfiguration) message with the SCG configuration to UE 102. The UE 102 replies 322 with an RRC reconfiguration complete (e.g. RRCConnectionReconfigurationComplete or RRCReconfigurationComplete) message to the MN 104A. The MN 104A in turn transmits 313 an SN Reconfiguration Complete message to the SN CU-CP 180. The UE 102 initiates 340 a Random Access procedure with the SN-DU 174. The events 322 and 340 need not always occur in the order illustrated in FIG. 3C. The events 311, 360, 461, 462, 312, 320, 321, and 313 collectively can define an SN addition and RRC reconfiguration procedure 310C.

The MN 104A transmits 350C an SN Status Transfer message with the current count values for one or more DBRs to the SN CU-CP 180. The SN CU-CP 180 determines 351C whether the termination point change of the DRB $D_C$ results in a setting change for the DRB $D_C$. The setting change can include a change in the PDCP version the DRB $D_C$ uses (e.g., EUTRA PDCP, NR PDCP), a change in the PDCP SN length, a change in RLC mode, or a full configuration. In this example scenario, the SN CU-CP 180 determines 351C that the DRB $D_C$ requires a setting change. The SN CU-CP 180 accordingly constructs 355C a Bearer Context Modification Request message without a PDCP SN Status Information IE for the DRB $D_C$; or, in another implementation, with a PDCP SN Status Information IE that includes a default DL count value (e.g., zero) and the default UL count value (e.g., zero) for the DRB $D_C$. In another scenario, however, the SN CU-CP 180 determines that the DRB $D_C$ does not require a setting change and includes the current count values (as received at event 350C) in the PDCP SN Status Information IE of the Bearer Context Modification Request message. The SN CU-CP 180 then transmits 357C the Bearer Context Modification Request message to the SN CU-UP 182. The SN CU-UP 182 applies the count values received in the PDCP SN Status Information IE and transmits 358C a Bearer Context Modification Response message.

The scenario of FIG. 3D is generally similar to the scenario of FIG. 3C, but here the CU-UP receives and then ignores the current count value from the CU-CP. Similar events are labeled using same reference numbers in FIGS. 3C and 3D, and the differences between these two scenarios are discussed below.

After the SN CU-CP 180 determines 351D that a setting change is required for a DRB $D_D$, the SN CU-CP 180 constructs 355D a Bearer Context Modification Request message with a PDCP SN Status Information IE for the DRB with a current count value, but also includes in the Bearer Context Modification Request message an indication for the recipient to ignore the received count values. In another scenario, the SN CU-CP 180 determines that the DRB $D_D$ does not require a setting change and includes the current count values in the PDCP SN Status Information IE in the Bearer Context Modification Request message, without an indication for the recipient to ignore the received count values.

In one implementation, the ignore indication is a binary indicator so that the SN CU-UP 182 takes the appropriate action when the indication is set to a certain value or option, e.g., "true." In another implementation, the SN CU-UP 182 does not need to determine whether the ignore indication has any specific value, and takes the appropriate action when the ignore indication is included in the message. The SN CU-CP 180 then transmits 357D the Bearer Context Modification Request message to the SN CU-UP 182. The SN CU-UP 182 in this example scenario checks the indication and ignores 359 the count values received in the PDCP SN Status Information IE. The SN CU-UP 182 then transmits 358D a Bearer Context Modification Response message to the SN CU-CP 180.

Figure 4A:
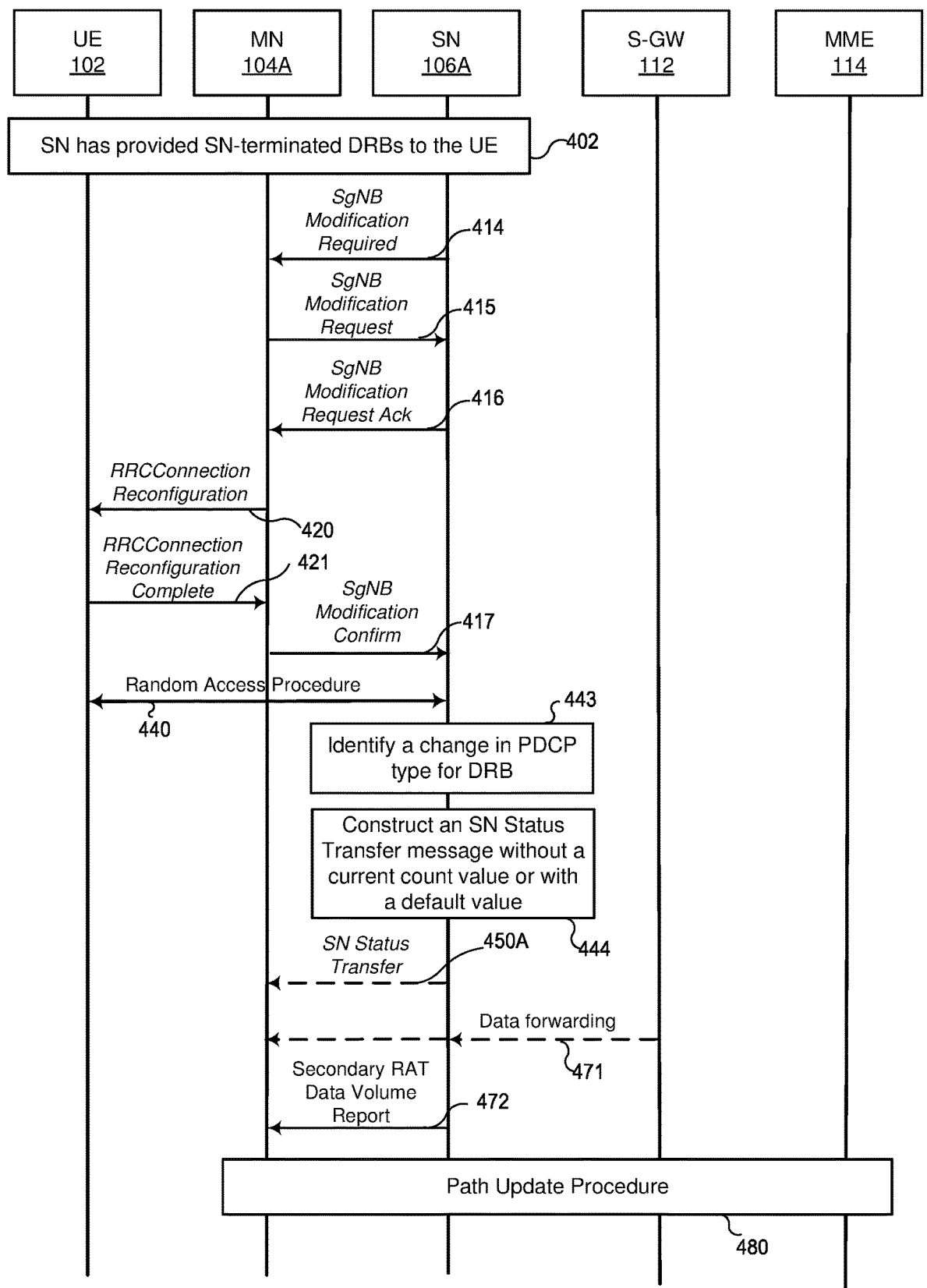
FIG. 4A illustrates a scenario in which an SN, during a secondary node modification procedure, determines that an SN-terminated DRB is configured with an NR PDCP and does not provide the current count value to the MN.

In the scenario of FIG. 4A, the gNB 106A operating as an SN initially provides 402 the UE 102 with an DRB $D_B$ terminated at the gNB 106A, i.e., an SN-terminated DRB. The configuration of the DRB $D_B$ also includes RLC AM. Similar to the scenarios of FIGS. 3A and 3B, the eNB 104A operates as an MN, and the base stations 104A and 106B thus support $D_C$ at the UE 102.

After the SN 106A determines to transform the SN-terminated DRB $D_B$ into an MN-terminated DRB $D_B$, the SN 106A first transmits 414 an SgNB Modification Required message to the MN 104A. The SgNB Modification Required message includes an indication that the MN 104A should change the DRB $D_B$ to an MN-terminated DRB. To identify the DRB $D_B$, the SN 106A can include the identity of the DRB $D_B$ (DRB ID) and/or the identity of the E-RAB $E_B$ to which the DRB $D_B$ belongs (E-RAB ID) in the SgNB Modification Required message.

The MN 104A responds 415 with an SgNB Modification Request message. The MN 104A can indicate that SN 106A should set up a PDCP entity by setting the pDCPatSgNB flag to "present" in the SgNB Modification Request message. In other scenarios, however, the MN 104A may be unable to respond with an SgNB Modification Request message.

The SN 106A transmits 416 an SgNB Modification Request Acknowledge message to the MN 104A after receiving 415 the SgNB Modification Request message. Similar to the SgNB Addition Request Acknowledge message discussed with reference to FIGS. 3A and 3B, the SgNB Modification Request Acknowledge message can include an SCG configuration (e.g., an CG-Config IE), which in turn can include a RadioBearerConfig IE. The SgNB Modification Request Acknowledge message in some cases also includes SCG cell group configuration with a physicalCellGroupConfig IE, a mac-CellGroupConfig IE, and RLC-BearerConfig IE, spCellConfig IE, etc.

The MN 104A then transmits 420 an RRCConnectionReconfiguration message with the SCG configuration to the UE 102. The RadioBearerConfig IE in the SCG configuration includes an indication that the SN-terminated DRB $D_B$ that used NR PDCP should become an MN-terminated DRB that uses EUTRA PDCP. In some cases, the MN 104A includes the scg-CellGroupConfig in the RRCConnectionReconfiguration message. The UE 102 reconfigures the resources including the DRB $D_B$ and transmits 421 an RCConnectionReconfigurationComplete message to the MN 104A. The MN 104A in turn transmits 417 an SgNB Modification Confirm message to the SN 106A.

Similar to the scenarios of FIGS. 3A and 3B, the RRC-ConnectionReconfiguration message the UE 102 receives 420 from the MN 104A can include an indication that the UE 102 should perform 440 a random access procedure.

The SN 106A determines 443 whether the change in the termination point of the DRB $D_B$ results in a change in the PDCP version the DRB $D_B$ uses (e.g., EUTRA PDCP, NR PDCP). In the scenario of FIG. 4A, the MN 104A determines that the SN-terminated DRB $D_B$ (which the SN 104A is transforming into an MN-terminated DRB) is configured to use NR PDCP, but the new termination point MN 104A uses NR EUTRA because the MN 104A is an eNB. The SN 106A therefore expects the MN 104A to configure the MN-terminated DRB $D_B$ with EUTRA PDCP and RLC AM. Thus, the SN 106A determines that changing the termination point of the DRB $D_B$ also causes a change in the PDCP version for the DRB $D_B$.

According to one implementation, when the SN 106A determines that the MN 104A (which is an eNB) does not support NR PDCP, the SN 106A infers that the MN 104A configures the DRB $D_B$ using EUTRA PDCP. Conversely, when the SN 106A determines that the MN 104A supports NR PDCP, the SN 106A infers that the MN 104A configures the DRB $D_B$ using NR PDCP. Thus, the SN 106A in this implementation determines 443 whether there is a change in the PDCP version for the DRB $D_B$ based on the capability of the MN 104A.

Depending on the implementation, the MN 104A indicates its EUTRA PDCP and NR PDCP capabilities or MCG-RB configurations in a message the MN 104A transmits to the SN 106A over the X2 interface, such as SgNB Modification Request, SgNB Addition Request (see FIGS. 3A an 3B), or another suitable message.

According to another implementation, when the SN 106A determines that the UE 102 does not support NR PDCP over the EUTRA radio interface, the SN 106A infers that the MN 104A configures the DRB $D_B$ using EUTRA PDCP. Conversely, when the SN 106A determines that the UE 102 supports NR PDCP over the EUTRA radio interface, the SN 106A infers that the MN 104A configures the DRB $D_B$ using NR PDCP. Thus, the SN 106A in this implementation determines 443 whether there is a change in the PDCP version for the DRB $D_B$ based on the capability of the UE 102.

Because the SN 106A in this scenario has determined that the PDCP version of the DRB $D_B$ will change as a result of the change in the termination point, the SN 106A constructs 444 an SN Status Transfer message without a current count value for the DRB $D_B$. The SN 106A for example can construct an SN Status Transfer message and not include any information related to the DRB $D_B$, such as the E-RAB ID, UL count value, or a DL count value. The SN 106A then transmits 450A the SN Status Transfer message to the MN 104A via the X2 interface. The SN 106A also can check whether the PDCP version changes for each of the DRBs (configured with RLC AM, for example) and not construct or transmit an SN Status Transfer message at all when the PDCP version changes in each instance, similar to how the MN 104A can construct or determine to not construct an SN Status Transfer message in the scenario of FIG. 3A.

Similar to the SN 104A receiving and processing 350A the SN Status Transfer message in the scenario of FIG. 3A, the MN 104A in the scenario of FIG. 4 receives the SN Status Transfer message and, because the message does not indicate the current count value for the DRB $D_B$, the MN 104A applies a default value such as zero to the UL count and the DL count for the DRB $D_B$. The MN 104A modifies the DRB $D_B$ to establish an MN-terminated, using EUTRA PDCP and according to the information in the SgNB Modification Required message. The MN 104A begins to assign sequence numbers starting with zero to downlink packets. In the uplink direction, the MN 104A expects packets from the UE 102 to have sequence numbers staring with zero. However, when the SN 106A in another scenario determines that there is no change in the PDCP version for the DRB $D_B$, the SN 106A includes the current count value in the SN Status Transfer message. The MN 104A in this case assigns the next number after the specified value of DL count to packets in the downlink direction and expects a packet with the sequence number immediately after the specified value of UL count.

In another implementation, if the SN 106A has determined that the PDCP version of the DRB $D_B$ will change as a result of the change in the termination point, the SN 106A constructs an SN Status Transfer message, set a UL count value to a default UL count value (e.g., zero) and set a DL count value to a default DL count value (e.g., zero) for the DRB $D_B$, and include the E-RAB ID, the UL count value and the DL count value in the SN Status Transfer message. The SN 106A then transmits 450A the SN Status Transfer message to the MN 104A via the X2 interface. The SN 106A also can check whether the PDCP version changes for each of the DRBs (e.g., configured with RLC AM). If the PDCP version changes in each instance, the SN 106A sets a UL count value to a default UL count value, sets a DL count value to a default DL count value for each DRB, and includes the E-RAB ID, the UL count value, and the DL count value for each DRB in the SN Status Transfer message. The MN 104A applies the received UL count value to the UL count and applies the received DL count value to the DL count for the DRB $D_B$ (or, when the SN Status Transfer message references multiple DRBs, for each of the DRBs).

After transmitting 450A the SN Status Transfer message to the MN 104A, the SN 106A forwards 471 data between the S-GW 112 to the UE 102. The SN 106A then transmits 472 to the MN 104 a Secondary RAT Volume Report message to indicate how much data the UE 102 received over the NR radio for the E-RAB. The MN 104A, the S-GW 112, and the MME 114 then perform 480 a path update procedure, similar to the path update procedure 380 discussed above. The path update procedure includes the S-GW 112 transmitting an end marker packet to indicate the completion of the data forwarding 471.

Figure 4B:
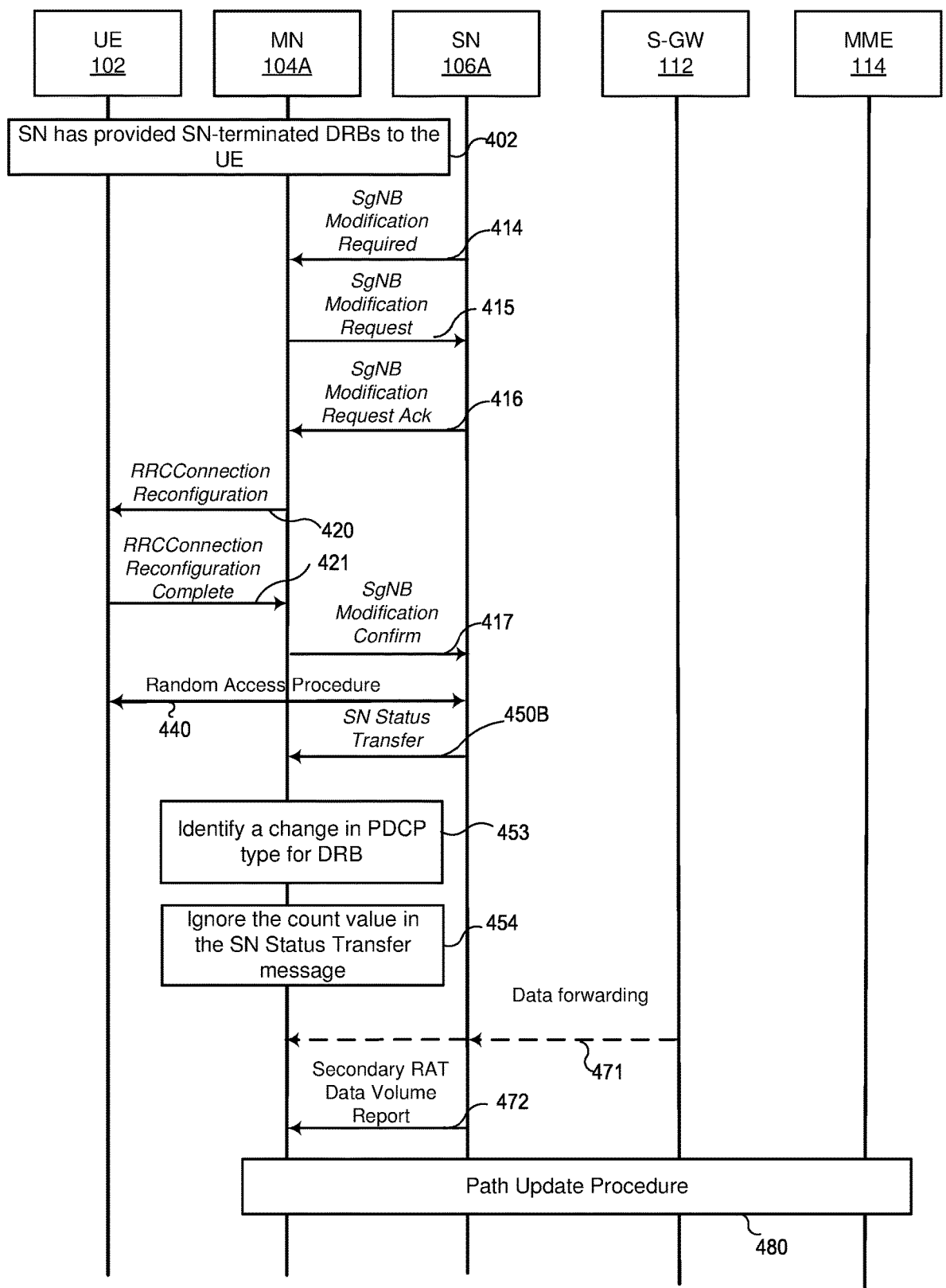
FIG. 4B illustrates a scenario in which an MN, during a secondary node modification procedure, determines that an SN-terminated DRB is configured with an NR PDCP and ignores the count value in the SN status transfer message from the SN.

In the scenario of FIG. 4B, the SN 106A transmits 450B an SN Status Transfer message to the MN 104A and includes the current count value, regardless of whether the PDCP version changes for the DRB $D_B$ as a result of the termination point of the DRB $D_B$ changing. However, the MN 104A determines 453 whether the change in the termination point of the DRB $D_B$ results in a change in the PDCP version the DRB $D_B$ uses (e.g., EUTRA PDCP, NR PDCP). The MN 104A can make this determination using the information included in the SgNB Modification Required message, for example. The MN 104A then ignores 454 the count value received in the SN Status Transfer message due to the change in the PDCP version. In another scenario, the MN 104A determines that there is no change in the PDCP version due to the change in the termination point of the DRB $D_B$ and applies the current count value, which can include the UL count and the DL count, to the subsequent packets.

Figure 4C:
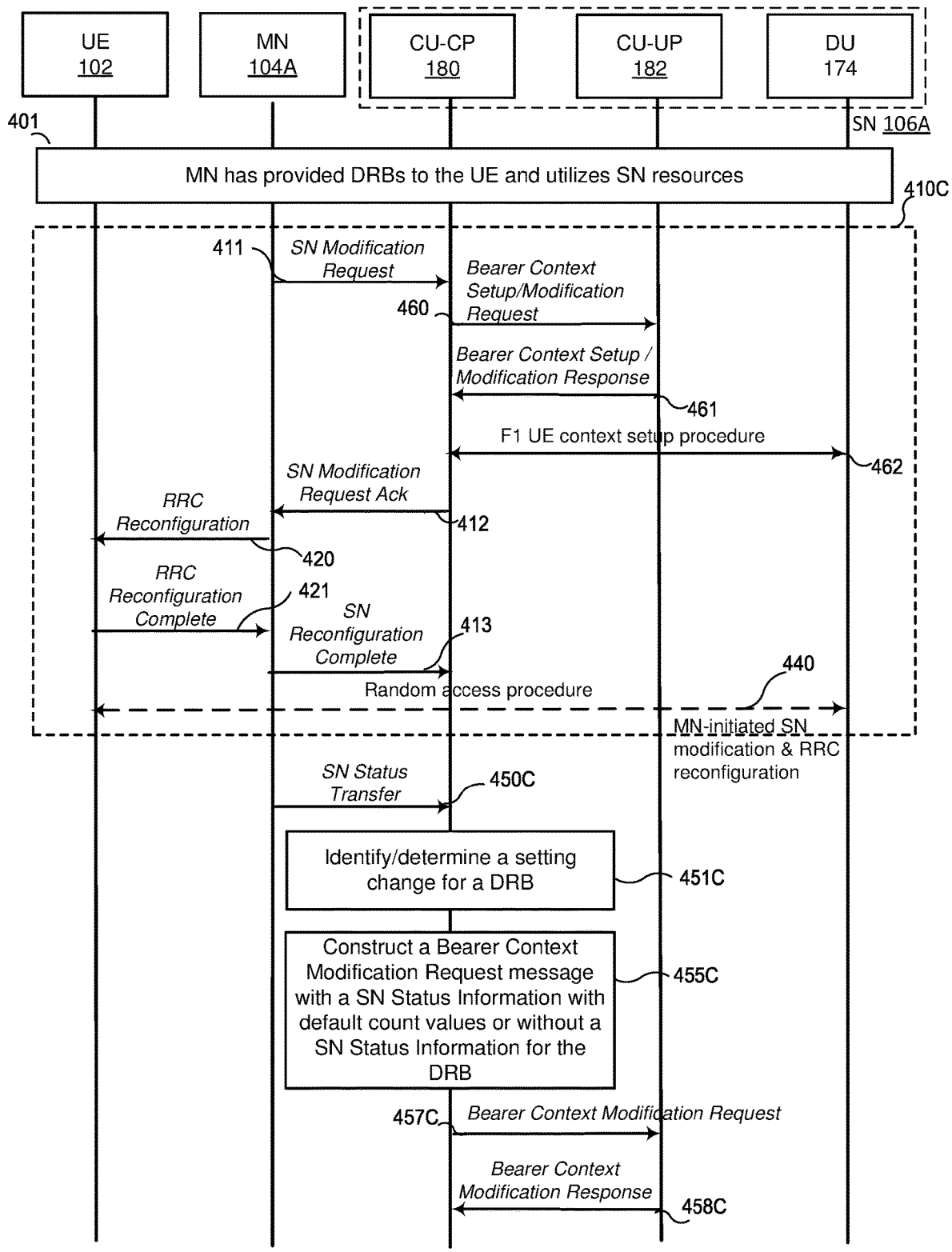
FIG. 4C illustrates a scenario in which a CU-CP, operating in an SN, receives an SN status transfer message from the MN but does not provide the current value for a DRB to the CU-UP during an MN-initiated a secondary node modification procedure.

In the scenario of FIG. 4C, the MN 104A initially provides 401 the UE 102 with one or more DRBs including a DRB $D_C$ and also utilizes SN resources in the SN 106A. The MN 104A begins an MN-initiated SN Modification procedure 410C by transmitting 415 an SN Modification Request message to the SN CU-CP 180 and modifies the termination point of the DRB $D_C$, from the MN 104A to the SN 106A.

The SN CU-CP 180 transmits 460 a Bearer Context Setup Request message to the SN CU-UP 182, which then responds 461 with Bearer Context Setup Response message to the SN CU-CP 180. The SN CU-CP 180 initiates an UE context setup procedure by transmitting 462 an F1 UE context setup message to the SN-DU 174. The events 460 and 462 need not always occur in the order illustrated in FIG. 3C.

The SN CU-CP 180 then transmits 416 an SN Addition Request Acknowledge message to the MN 104A. Next, the MN 104A transmits 420 an RRC reconfiguration (e.g. RRC-ConnectionReconfiguration or RRCReconfiguration) message with the SCG configuration to UE 102. The UE 102 replies 422 with an RRC reconfiguration complete (e.g. RRCConnectionReconfigurationComplete or RRCReconfigurationComplete) message to the MN 104A. The MN 104A in turn transmits 417 an SN Reconfiguration Complete message to the SN CU-CP 180. The UE 102 initiates 440 a Random Access procedure with the SN-DU 174. The events 421 and 440 need not always occur in the order illustrated in FIG. 4C. The events 415, 460, 461, 462, 420, 421, 417, and 440 collectively can define an MN-initiated SN Modification and RRC reconfiguration procedure 410C.

The MN 104A transmits 450C an SN Status Transfer message with the current count values for one or more DBRs to the SN CU-CP 180. The SN CU-CP 180 determines 451C whether the termination point change of the DRB $D_C$ results in a setting change for the DRB $D_C$. The setting change can include a change in the PDCP version the DRB $D_C$ uses (e.g., EUTRA PDCP, NR PDCP), a change in the PDCP SN length, a change in RLC mode, or a full configuration. In this example scenario, the SN CU-CP 180 determines 451C that the DRB $D_C$ requires a setting change. The SN CU-CP 180 accordingly constructs 455C a Bearer Context Modification Request message without a PDCP SN Status Information IE for the DRB $D_C$; or, in another implementation, with a PDCP SN Status Information IE that includes a default DL count value (e.g., zero) and the default UL count value (e.g., zero) for the DRB $D_C$. In another scenario, however, the SN CU-CP 180 determines that the DRB $D_C$ does not require a setting change and includes the current count values (as received at event 450C) in the PDCP SN Status Information IE of the Bearer Context Modification Request message. The SN CU-CP 180 then transmits 457C the Bearer Context Modification Request message to the SN CU-UP 182. The SN CU-UP 182 applies the count values received in the PDCP SN Status Information IE and transmits 458C a Bearer Context Modification Response message.

Figure 4D:
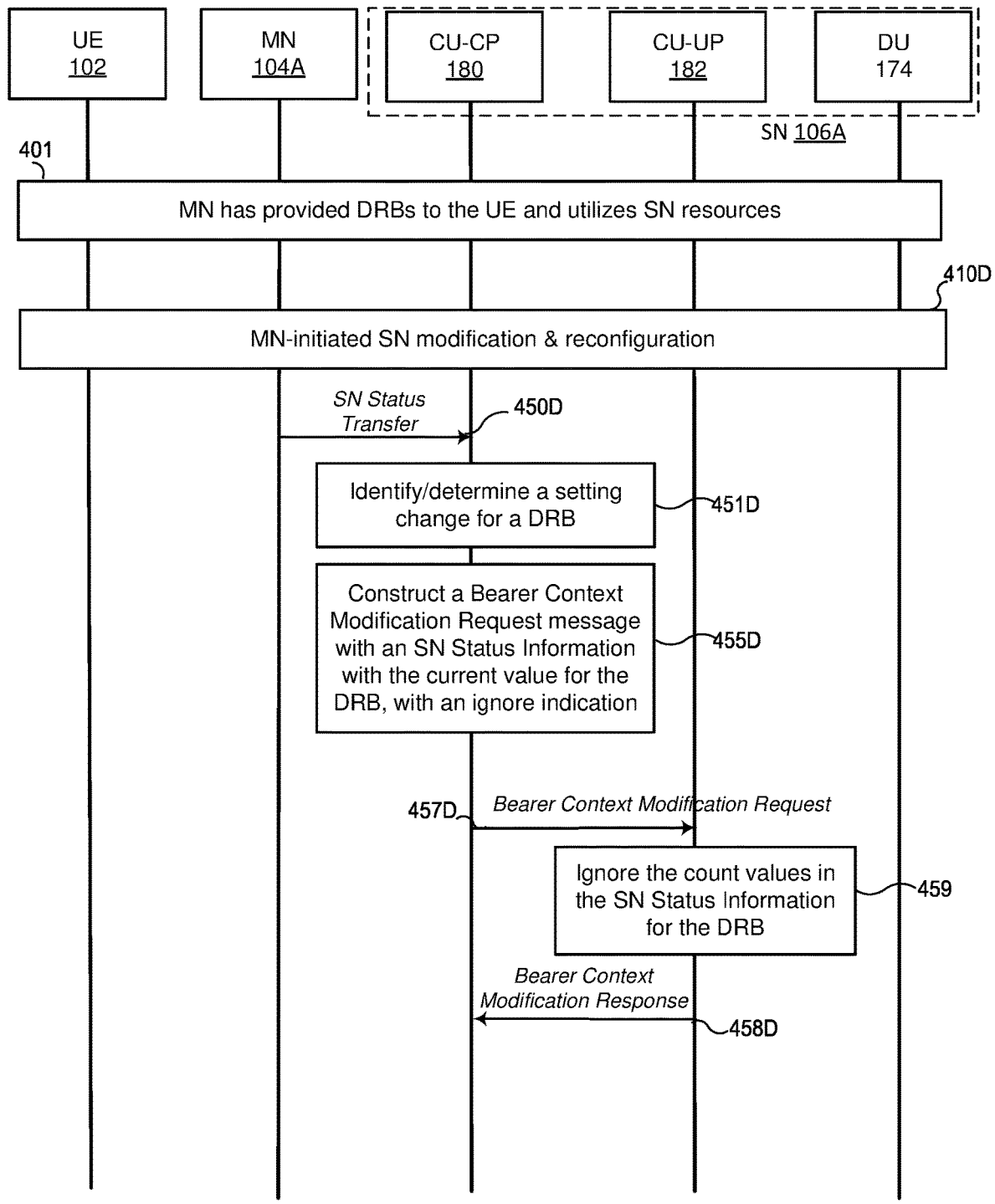
FIG. 4D illustrates a scenario in which a CU-UP, operating in an SN, ignores the count value for a DRB received from a CU-CP.

The scenario of FIG. 4D is generally similar to the scenario of FIG. 4C, but here the CU-UP receives and then ignores the current count value from the CU-CP. Similar events are labeled using same reference numbers in FIGS. 4C and 4D, and the differences between these two scenarios are discussed below.

After the SN CU-CP 180 determines 451D that a setting change is required for a DRB $D_D$, the SN CU-CP 180 constructs 455D a Bearer Context Modification Request message with a PDCP SN Status Information IE for the DRB with a current count value, but also includes in the Bearer Context Modification Request message an indication for the recipient to ignore the received count values. In another scenario, the SN CU-CP 180 determines that the DRB $D_D$ does not require a setting change and includes the current count values in the PDCP SN Status Information IE in the Bearer Context Modification Request message, without an indication for the recipient to ignore the received count values.

In one implementation, the ignore indication is a binary indicator so that the SN CU-UP 182 takes the appropriate action when the indication is set to a certain value or option, e.g., "true." In another implementation, the SN CU-UP 182 does not need to determine whether the ignore indication has any specific value, and takes the appropriate action when the ignore indication is included in the message. The SN CU-CP 180 then transmits 457D the Bearer Context Modification Request message to the SN CU-UP 182. The SN CU-UP 182 in this example scenario checks the indication and ignores 459 the count values received in the PDCP SN Status Information IE. The SN CU-UP 182 then transmits 458D a Bearer Context Modification Response message to the SN CU-CP 180.

Figure 4E:
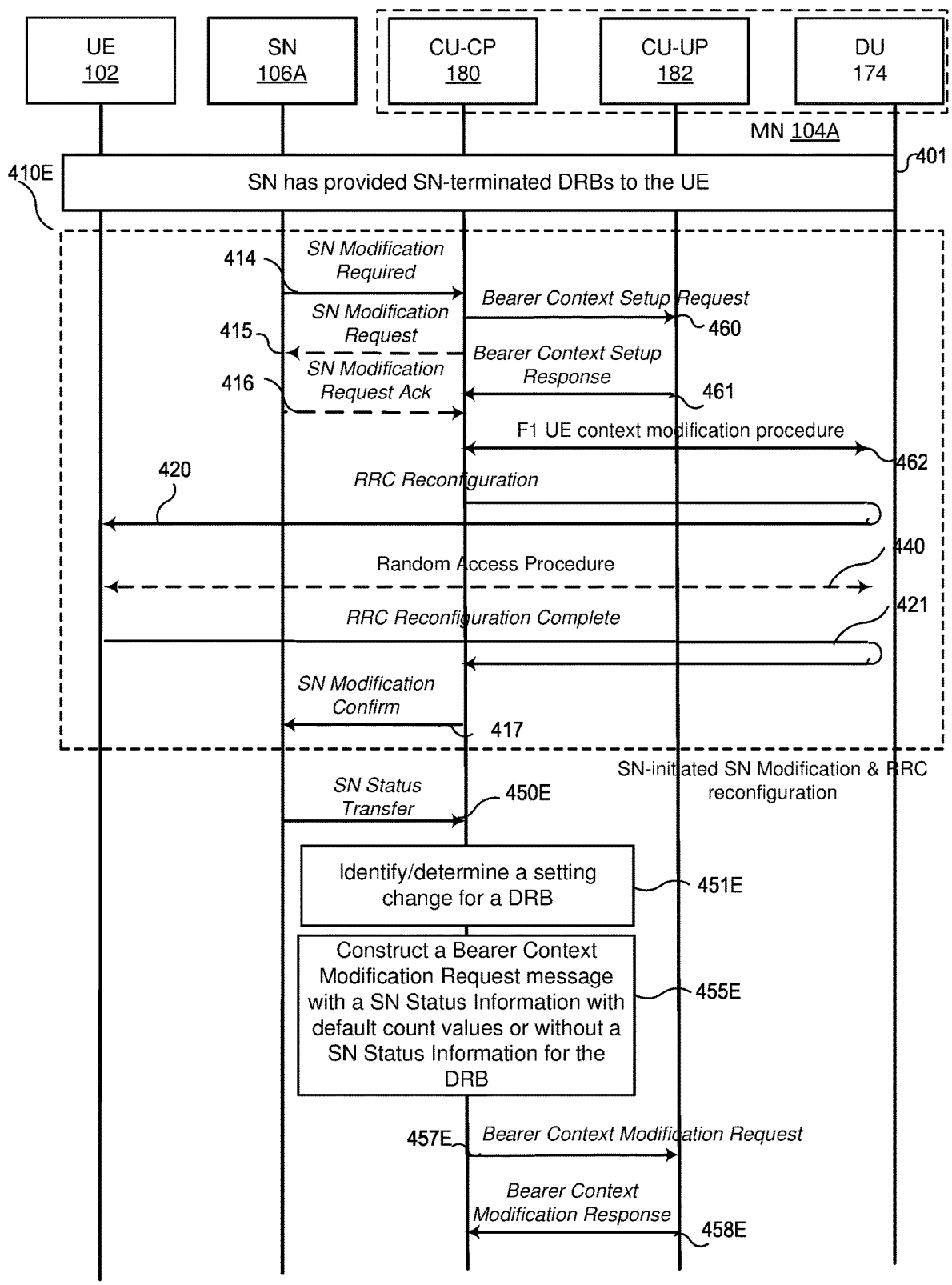
FIG. 4E illustrates a scenario in which a CU-CP, operating in an SN, receives an SN status transfer message from the MN but does not provide the current value for a DRB to the CU-UP during an SN-initiated secondary node modification procedure.

Now referring to FIG. 4E, the MN 104A can include an MN CU-CP 180, an MN CU-UP 182, and an MN-DU 174. The SN 106A initially provides one or more DRBs including a DRB $D_E$ to the UE 102 and also utilizes MN resources of the MN 104A. The SN 106A, operating as a secondary base station, begins an SN-initiated SN Modification procedure 410E by transmitting 414 an SN Modification Required message to the MN CU-CP 180 to release the DRB $D_E$, for example. The MN CU-CP 180 can decide to resume the DRB $D_E$ at the MN side, and the MN CU-CP 180 transmits 460 a Bearer Context Setup Request message to the MN CU-UP 182, which then responds 461 with Bearer Context Setup Response message to the MN CU-CP 180.

The MN CU-CP 180 initiates a UE context setup or modification procedure by transmitting 462 an F1 UE Context Modification/Setup procedure to the MN-DU 174. The MN CU-CP 180 may transmit 415 an SN Modification Request message to the SN 106A and the SN 106A transmits 416 an SN Modification Request Acknowledge message to the MN CU-CP 180 in response. The order of 415-417 and 460, 461 may be different from the one illustrated in FIG. 4E. The MN CU-CP 180 next transmits 420 an RRC reconfiguration (e.g. RRCConnectionReconfiguration or RRCReconfiguration) message to UE 102 via the MN-DU 174. The UE 102 replies 421 with an RRC reconfiguration complete (e.g. RRCConnectionReconfigurationComplete or RRCReconfigurationComplete) message to the MN CU-CP 180, also via the MN-DU 174. The UE 102 then may initiate 440 a Random Access procedure with the MN-DU 174. The MN CU-CP 180 transmits 417 an SN Modification Confirm message to the SN 106A. The events 421 and 317 may occur in a different order in other scenarios. The events 414-417, 460-462, and 440 together define an SN-initiated SN Modification and RRC reconfiguration procedure 410E.

The SN 106A transmits 450E an SN Status Transfer message with the current count values to the MN CU-CP 180. The MN CU-CP 180 determines 451E whether the change in the termination point of the DRB $D_E$ results in a setting change for the DRB. Similar to the examples above, the setting change for the DRB can include a change in the PDCP version the DRB $D_E$ uses (e.g., EUTRA PDCP, NR PDCP), a change in the PDCP SN length, a change in RLC mode, or a full configuration. In this example scenario, the MN CU-CP 180 determines 451E that the DRB $D_E$ needs a setting change. The MN CU-CP 180 constructs 455E a Bearer Context Modification Request message without a PDCP SN Status Information IE for the DRB, or, in another implementation, with a PDCP SN Status Information IE with the default DL count value (e.g., zero) and the default UL count value (e.g., zero) for the DRB $D_E$. In another scenario, the MN CU-CP 180 determines that the DRB $D_E$ does not require a setting change and includes the current count values as received in the 450E in the PDCP SN Status Information IE in the Bearer Context Modification Request message. The MN CU-CP 180 then transmits 457E the Bearer Context Modification Request message to the MN CU-UP 182. The MN CU-UP 182 applies the count values received in the PDCP SN Status Information IE and transmits 458E a Bearer Context Modification Response message to the MN CU-CP 180.

Figure 4F:
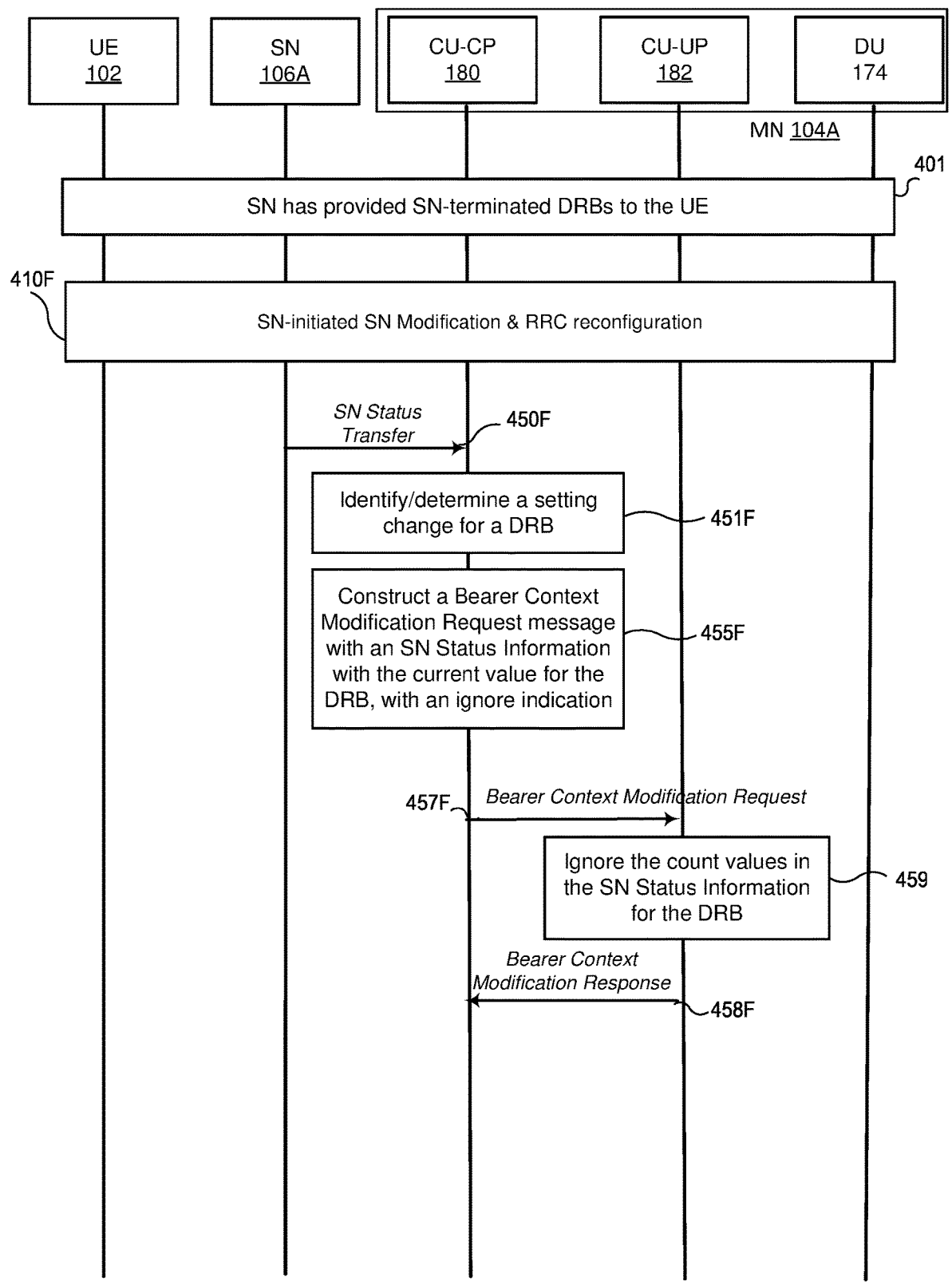
FIG. 4F illustrates another scenario in which a CU-UP, operating in an SN, ignores the count value for a DRB received from a CU-CP.

Now referring to FIG. 4F, this scenario also involves an SN-initiated SN modification procedure, but here the MN CU-UP 182 ignores the current count value(s) received from the MN CU-CP 180. The differences between FIG. 4E and FIG. 4F are discussed below.

After the MN CU-CP 180 determines 451F that a setting change is required for a DRB $D_F$, the SN CU-CP 180 constructs 455F a Bearer Context Modification Request message with a PDCP SN Status Information IE for the DRB with a current count value, but also includes in the Bearer Context Modification Request message an indication for the recipient to ignore the received count value. In another scenario, the MN CU-CP 180 determines that the DRB $D_F$ does not require a setting change and includes the current count values in the PDCP SN Status Information IE in the Bearer Context Modification Request message, without an indication for the recipient to ignore the received count values. The MN CU-CP 180 then transmits 457F the Bearer Context Modification Request message to the MN CU-UP 182. The MN CU-UP 182 in this example scenario checks the indication and ignores 459 the count values received in the PDCP SN Status Information IE. The MN CU-UP 182 then transmits 458F a Bearer Context Modification Response message to the SN CU-CP 180.

Figure 5A:
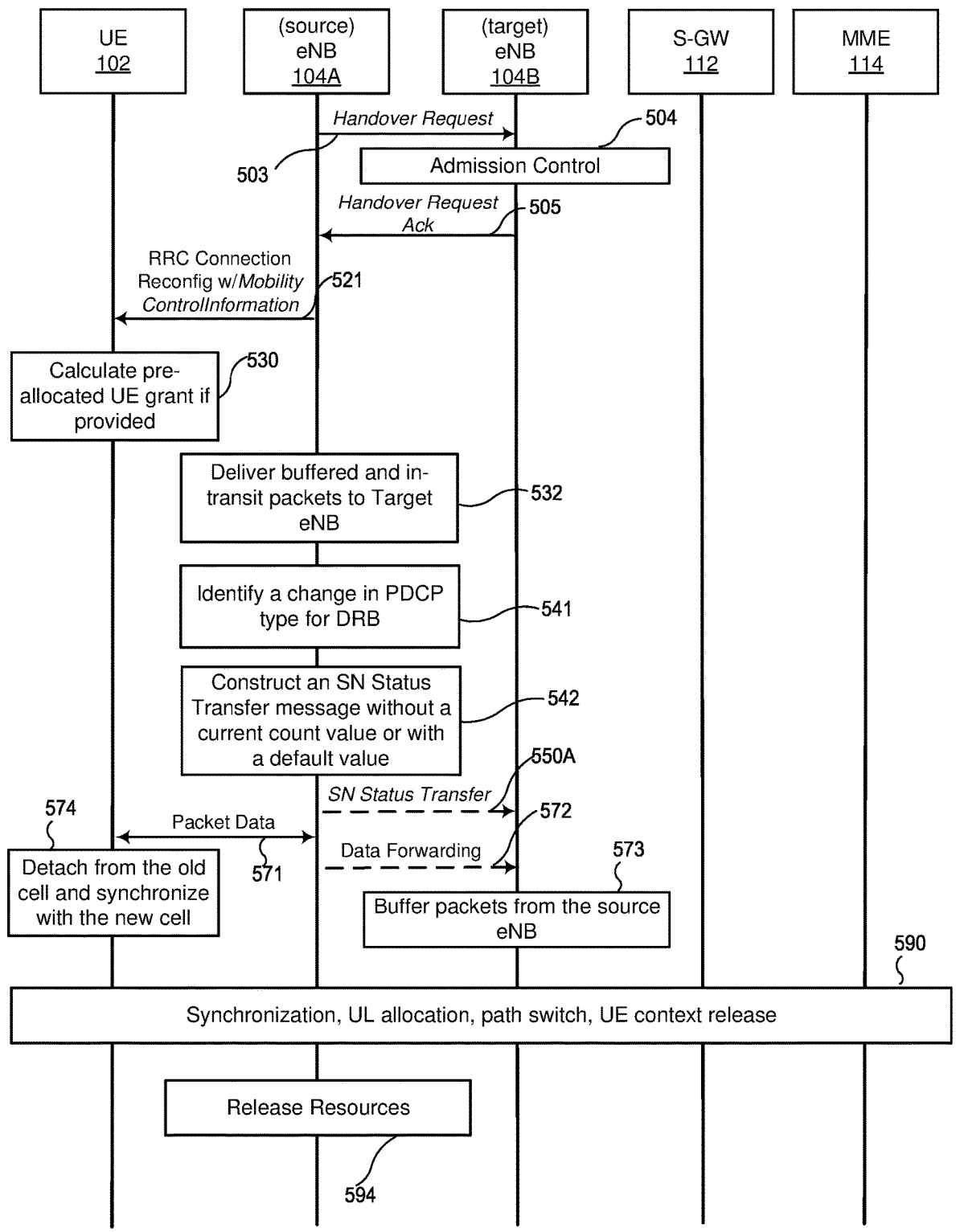
FIG. 5A illustrates a scenario in which a source base station, during an intra-MME/SGW handover, determines that an MN-terminated DRB is configured with a EUTRA PDCP or NR PDCP and does not include a count value in the SN status transfer message.
Figure 5B:
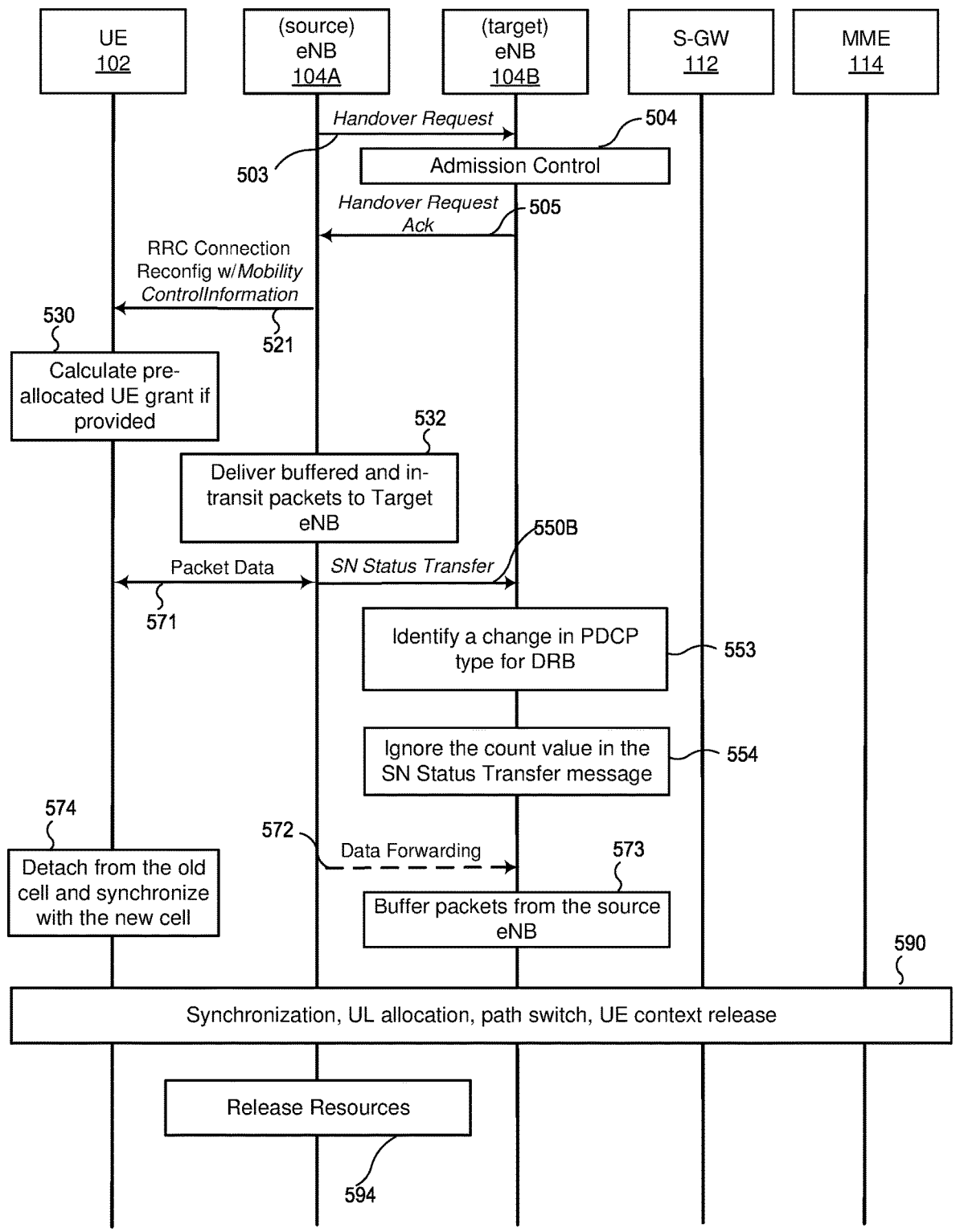
FIG. 5B illustrates a scenario in which a target base station, during an intra-MME/SGW handover, determines that an MN-terminated DRB is configured with a EUTRA PDCP or NR PDCP and ignores the count value in the SN status transfer message.

Next, FIGS. 5A and 5B illustrate an example intra-MME/SGW handover scenario in which the base stations manage the count values so as to prevent loss of packets due to a change in the PDCP version of a DRB. Unlike the scenarios of FIGS. 3A-4B, the UE 102 in these scenarios need not operate in $D_C$.

At the beginning of this scenario, the eNB 104A operates as a source eNB for the purposes of a handover procedure. When the UE 102 and the eNB 104 communicate using a DRB $D_C$, the eNB 104A can determine that the UE 102 should hand over from the cell 124A to the cell 124B of the eNB 104B (see FIG. 1B) based on measurement reports from the UE 102 or another suitable event. The eNB 104A then transmits 503 a Handover Request message to the eNB 104B, which now operates as a target eNB for the purposes of the handover procedure.

In some implementations, the Handover Request message indicates whether the DRB $D_L$ uses EUTRA PDCP or NR PDCP. In the scenario of FIG. 5A, the Handover Request message can include a EUTRA PDCP configuration to indicate that the DRB $D_C$ currently uses EUTRA PDCP. In other words, prior to the handover, the source eNB 104A configured the DRB $D_C$ using EUTRA PDCP, and provided this configuration of the DRB $D_C$ to the UE 102. In another scenario, the Handover Request message can include an NR PDCP configuration to indicate that the DRB $D_C$ currently uses NR PDCP. The target eNB 104B accordingly can determine, based on the information in the Handover Request message, whether the PDCP version the target eNB 104B will apply to the DRB $D_C$ is different from the PDCP version with which the source eNB 104A previously configured the DRB $D_C$.

In some cases, the Handover Request message contains a RadioBearerConfig IE or another suitable IE that includes the identifier and the NR PDCP configuration of the DRB $D_C$, when the DRB $D_C$ uses NR PDCP. In other cases, when the DRB $D_C$ uses EUTRA PDCP, the Handover Request message contains a DRB-ToAddModList IE or another suitable IE that includes the identifier and the EUTRA PDCP configuration of the DRB $D_C$.

The target eNB 104B performs 504 an admission control procedure and transmits 505 a Handover Request Acknowledge message to the source eNB 104A. The source eNB 104A then transmits 521 to the UE 102 an RRCConnectionReconfiguration message including an mobilityControlInformation IE. The source eNB 104 then delivers 532 buffered and in-transit packets to the target eNB 104B.

The source eNB 104A determines 541 whether the change in the termination point of the DRB $D_C$ from the eNB 104A to the eNB 104B results in a change in the PDCP version the DRB $D_C$ uses. In this example scenario, the source eNB 104A determines that the DRB $D_C$ is configured to use EUTRA PDCP, but the new termination point eNB 104B uses NR PDCP over EUTRA.

In some implementations, the source eNB 104A constructs 542 an SN Status Transfer message without a current count value. Similar to the example scenarios above, the source eNB 104A in other cases can determine to not transmit an SN Status Transfer message to the SN 106A at all, if the PDCP version changes for every DRB to which the SN Status Transfer message would refer. The source eNB 104A then transmits 550A the SN Status Transfer message to the eNB 104B via the X2 interface. The eNB 104B can receive 550A and process the SN Status Transfer message similar to the SN 104A receiving and processing 350A the SN Status Transfer message in the scenario of FIG. 3A. For example, the eNB 104B applies zero or another suitable default value to the UL count and the DL count for the DRB $D_C$.

In other implementations, the source eNB 104A constructs an SN Status Transfer message, sets a UL count value to a default UL count value (e.g., zero) and sets a DL count value to a default DL count value (e.g., zero) for the DRB $D_C$, and includes the E-RAB ID associated with the DRB $D_C$, the UL count value and the DL count value in the SN Status Transfer message. The eNB 104A then transmits 350A the SN Status Transfer message to the eNB 104B via the X2 interface. The eNB 104B applies the UL count value and the DL count value respectively to a UL count and a DL count for the DRB $D_C$.

In another scenario, the eNB 104A determines that there is no change in the PDCP version resulting from the change in the termination point of the DRB $D_C$. The eNB 104A then transmits an SN Status Transfer message with the current count value to the eNB 104B, and the eNB 104B uses the current count value (the DL count and the UL count) in the SN Status Transfer message to process subsequent inbound and outbound packets.

The UE 102 and the source eNB 104A can continue exchanging 571 data packets, the source eNB 104A can forward 572 these data packets to the target eNB 104B, which in turn can buffer 573 the packets from the source eNB 104A. The UE 102 can detach 574 from the old cell 124A and synchronize the radio link in the new cell 124B. The UE 102, the eNBs 104A and 104B, the S-GW 112, and the MME 114 then can perform 590 several procedures, not shown in detail in FIG. 5A to avoid clutter, including synchronization and UL allocation between the UE 102 and the target eNB 104B, a path switch (e.g., the target eNB 104B can transmit a Path Switch Request to the MME 114, the MME 114 can transmit a Modify Bearer Request to the S-GW 112 and receive a Modify Bearer Response from the S-GW 112, and the MME 114 can transmit a Path Switch Request Acknowledge to the target eNB 104B), and release the old UE context (e.g., the target eNB 104B can transmit a UE Context Release message to the source eNB 104A. The source eNB 104A then releases 594 the resources.

In the scenario of FIG. 5B, the source eNB 104A transmits 550B an SN Status Transfer message to the target eNB 104B and includes the current count value, regardless of whether the PDCP version changes for the DRB $D_C$ as a result of the termination point of the DRB $D_C$ changing. However, the target eNB 104B determines 553 whether the change in the termination point of the DRB $D_C$ results in a change in the PDCP version the DRB $D_C$ uses (e.g., EUTRA PDCP, NR PDCP). The target eNB 104B then ignores 554 the count value received in the SN Status Transfer message due to the change in the PDCP version. In another scenario, the target eNB 104B determines that there is no change in the PDCP version resulting from the change in the termination point of the DRB $D_C$ and applies the current count value, which can include the UL count and the DL count, to the subsequent packets.

Figure 5C:
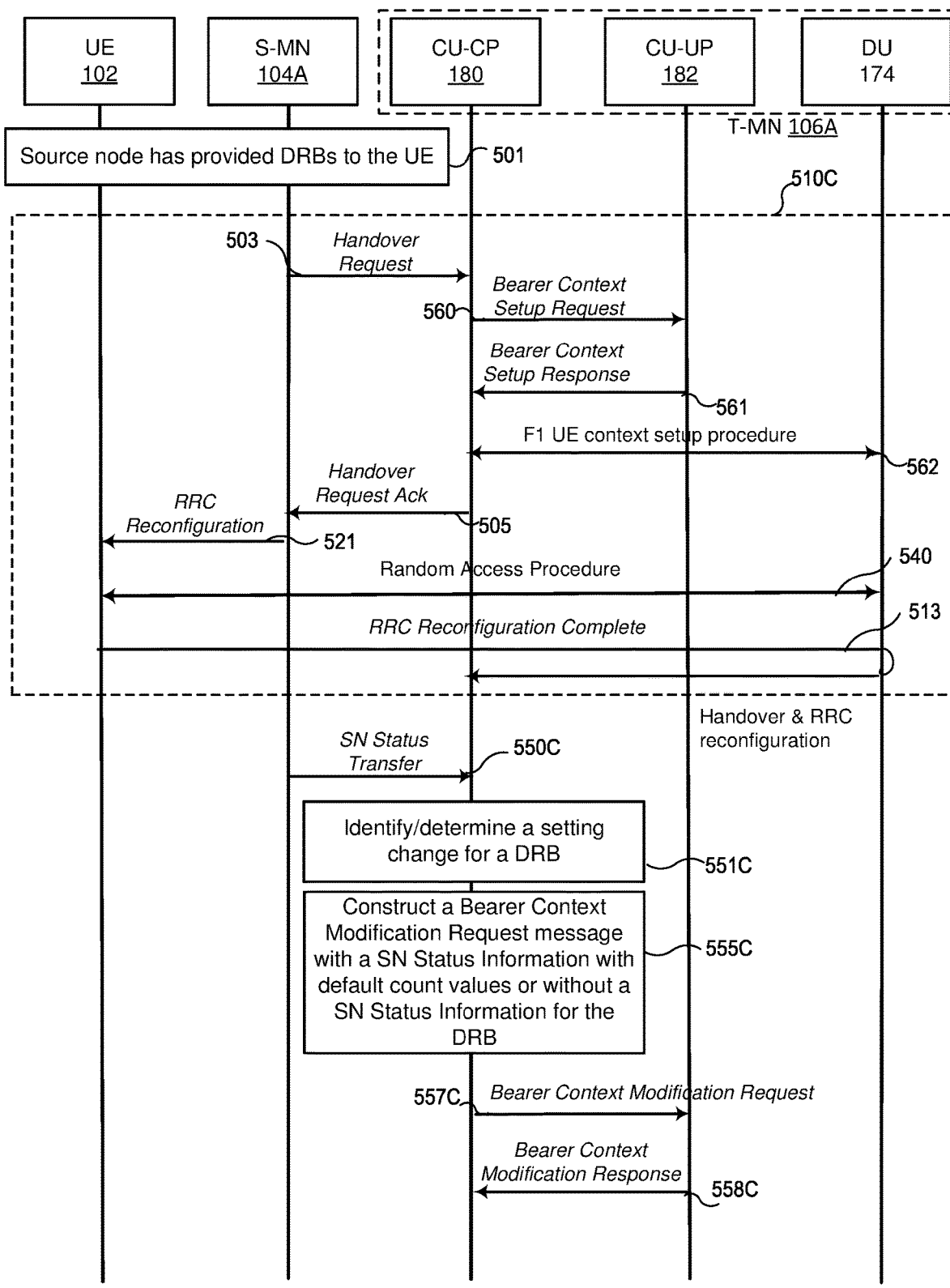
FIG. 5C illustrates a scenario in a CU-CP, operating in a target base station, receives an SN status transfer message from a source base station but does not provide the current value for a DRB to the CU-UP during a handover scenario.

In the scenario of FIG. 5C, the source base station S-MN 104A initially provides one or more DRBs including a DRB $D_C$ to the UE 102. T-MN 106A includes a T-MN CU-CP 180, a T-MN CU-UP 182 and T-MN-DU 174. The S-MN 104A begins a handover procedure by transmitting 503 a Handover Request message to the T-MN CU-CP 180 to change the termination point of the DRB $D_C$ to the T-MN 106A. The CU-CP 180 transmits 560 a Bearer Context Setup Request message to the T-MN CU-UP 182, which then responds 561 with Bearer Context Setup Response message to the T-MN CU-CP 180. The T-MN CU-CP 180 initiates 562 an F1 UE Context Modification/Setup procedure to the T-MN DU 174. The order of the events 560 and 562 may be different from what is illustrated in FIG. 5C.

The T-MN CU-CP 180 then transmits 505 a Handover Request Acknowledge message to the S-MN 104A. Next, the S-MN 104A transmits 521 an RRC reconfiguration (e.g. RRCConnectionReconfiguration or RRCReconfiguration) message generated by the T-MN 106A to UE 102. The UE 102 initiates 540 a Random Access procedure with the T-MN DU 174. The UE 102 transmits 513 an RRC reconfiguration complete (e.g. RRCConnectionReconfigurationComplete or RRCReconfigurationComplete) message to the T-MN CU-CP 180 via the T-MN DU 174. The order of the events 540 and 513 can be reversed in some cases. The events 503, 560-562, 505, 521, 540, and 513 can be grouped as a Handover and RRC reconfiguration procedure 510C.

The S-MN 104A transmits 550C an SN Status Transfer message with the current count values to the T-MN CU-CP 180. The T-MN CU-CP 180 determines 551C whether the handover of the DRB $D_C$ results in a setting change, which can include a change in the PDCP version (e.g., EUTRA PDCP, NR PDCP), a change in the PDCP SN length, a change in the RLC mode, or a full configuration. In this example scenario, the T-MN CU-CP 180 determines that the DRB $D_C$ needs a setting change. The T-MN CU-CP 180 constructs 555C a Bearer Context Modification Request message without a PDCP SN Status Information IE for the DR, or, in another implementation, with a PDCP SN Status Information IE for the DRB with a default DL count value (e.g., zero) and the default UL count value (e.g., zero). In another scenario, the T-MN CU-CP 180 determines that the DRB $D_C$ does not require a setting change and includes the current count values as received in the 550C in the PDCP SN Status Information IE in the Bearer Context Modification Request message. The T-MN CU-CP 180 then transmits 557C the Bearer Context Modification Request message to the T-MN CU-UP 182. The T-MN CU-UP 182 applies the count values received in the PDCP SN Status Information IE and transmits 558C a Bearer Context Modification Response message.

Figure 5D:
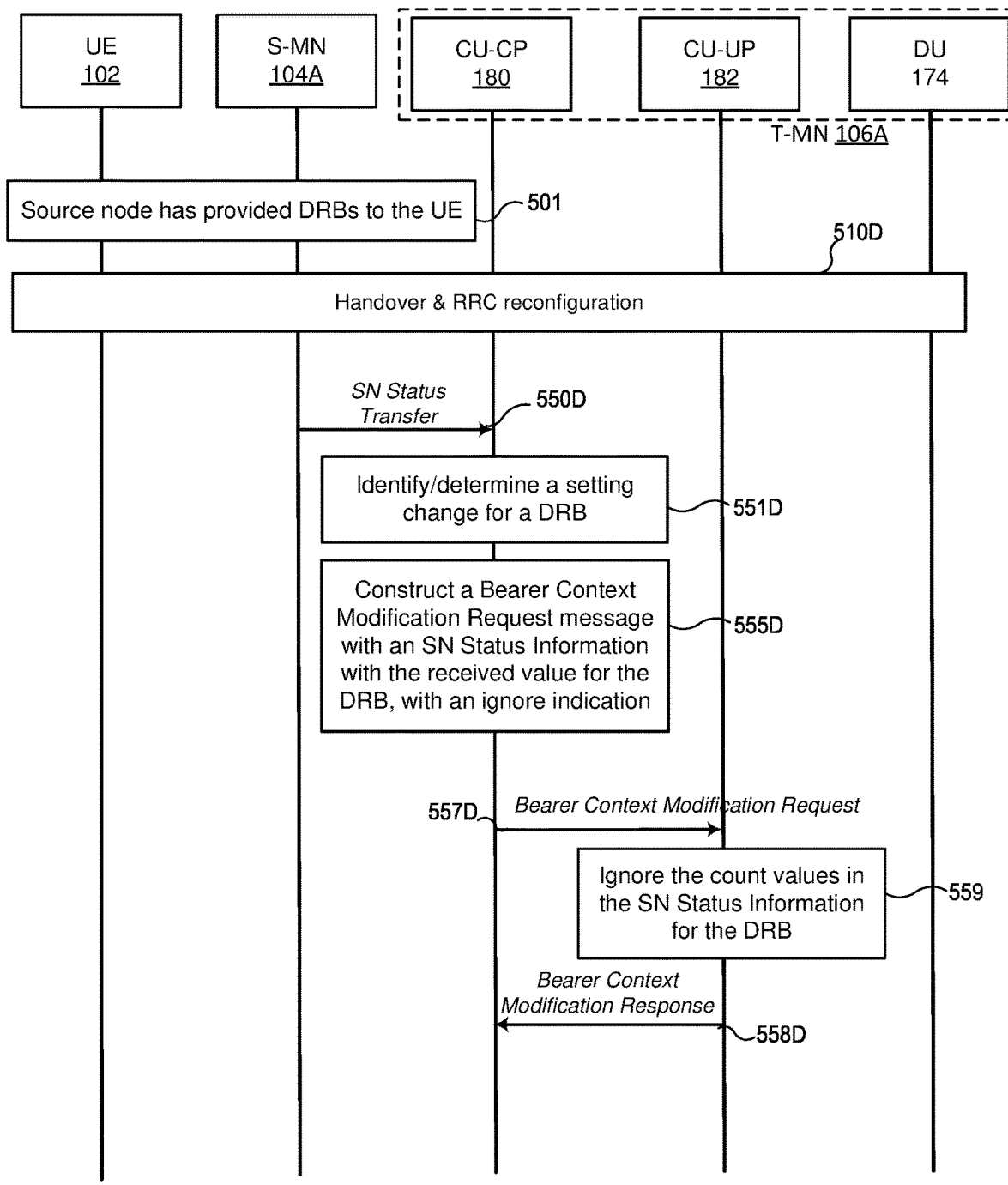
FIG. 5D illustrates a scenario in which a CU-UP, operating in a target base station, ignores the count value for a DRB received from a CU-CP, during a handover scenario.

The scenario of FIG. 5D is generally similar to the scenario of FIG. 5C, but here the T-MN CU-UP receives and then ignores the current count value from the T-MN CU-CP. Similar events are labeled using same reference numbers in FIGS. 5C and 5D, and the differences between these two scenarios are discussed below.

After the T-MN CU-CP 180 determines 555CD that a setting change is required for a DRB $D_D$, the T-MN CU-CP 180 constructs 555D a Bearer Context Modification Request message with a PDCP SN Status Information IE for the DRB with a current count value, but also includes in the Bearer Context Modification Request message an indication for the recipient to ignore the received count values. In another scenario, the T-MN CU-CP 180 determines that the DRB $D_D$ does not require a setting change and includes the current count values in the PDCP SN Status Information IE in the Bearer Context Modification Request message, without an indication for the recipient to ignore the received count values.

In one implementation, the ignore indication is a binary indicator so that the T-MN CU-UP 182 takes the appropriate action when the indication is set to a certain value or option, e.g., "true." In another implementation, the T-MN CU-UP 182 does not need to determine whether the ignore indication has any specific value, and takes the appropriate action when the ignore indication is included in the message. The T-MN CU-CP 180 then transmits 557D the Bearer Context Modification Request message to the T-MN CU-UP 182. The T-MN CU-UP 182 in this example scenario checks the indication and ignores 559 the count values received in the PDCP SN Status Information IE. The T-MN CU-UP 182 then transmits 558D a Bearer Context Modification Response message to the T-MN CU-CP 180.

Figure 6A:
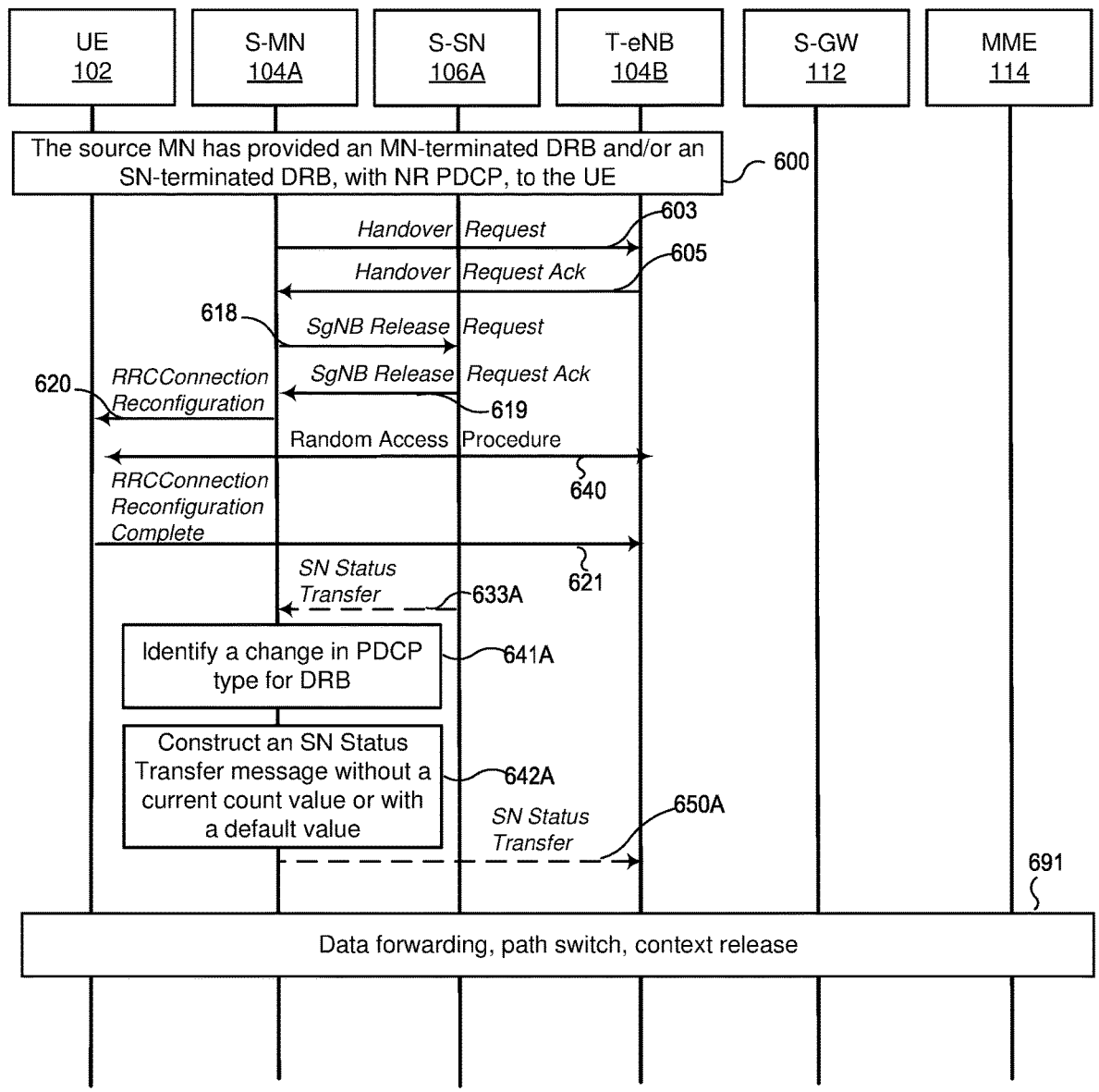
FIG. 6A illustrates a scenario in which a source base station, during an MN-to-eNB change, receives a first SN status transfer message, determines that an MN-terminated DRB is configured with a EUTRA PDCP or NR PDCP, and does not include a count value in the second SN status transfer message.
Figure 6B:
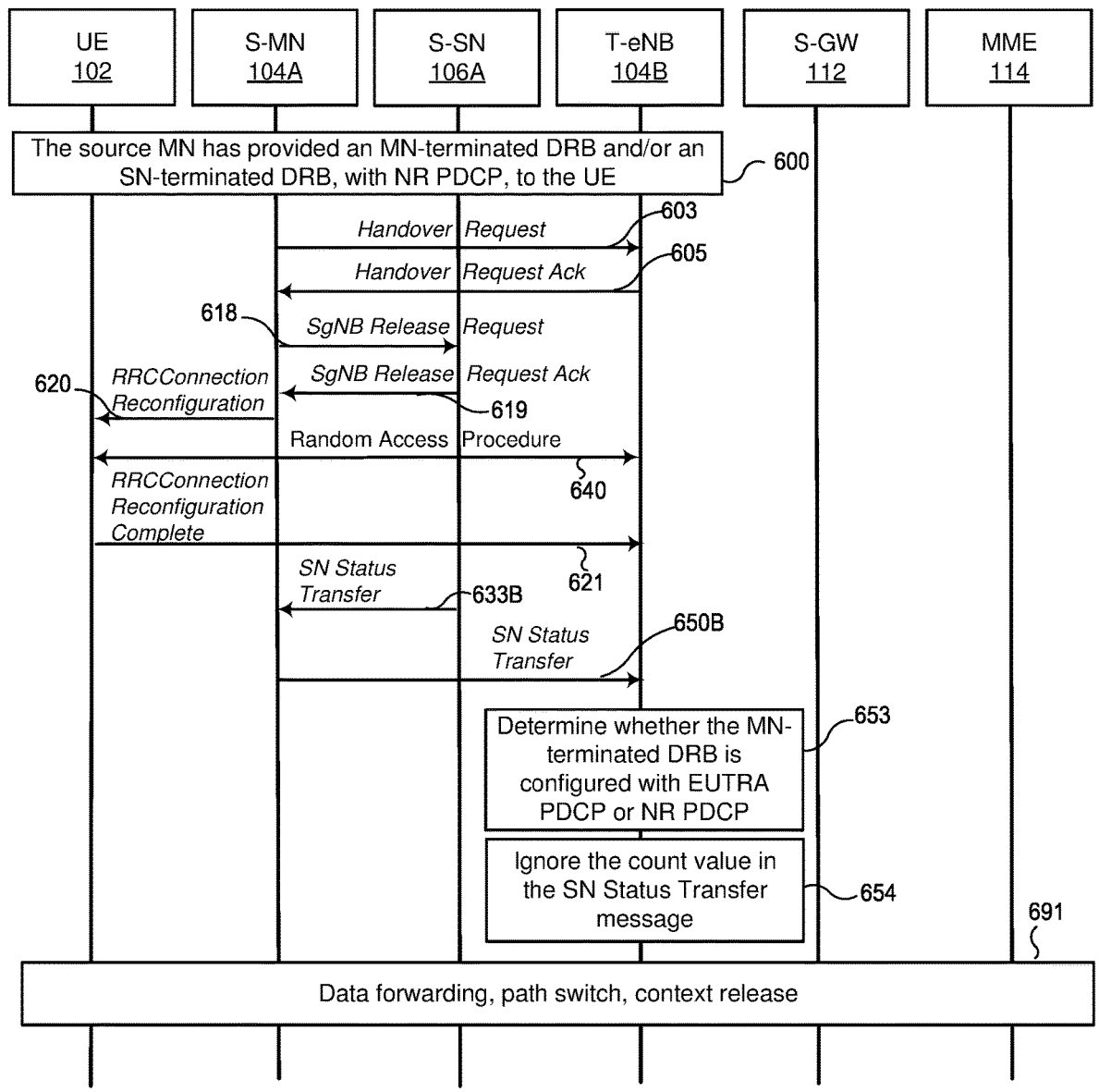
FIG. 6B illustrates a scenario in which a target base station, during an MN-to-eNB change, determines that an MN-terminated DRB is configured with a EUTRA PDCP or NR PDCP and ignores the count value in the SN status transfer message.
Figure 6C:
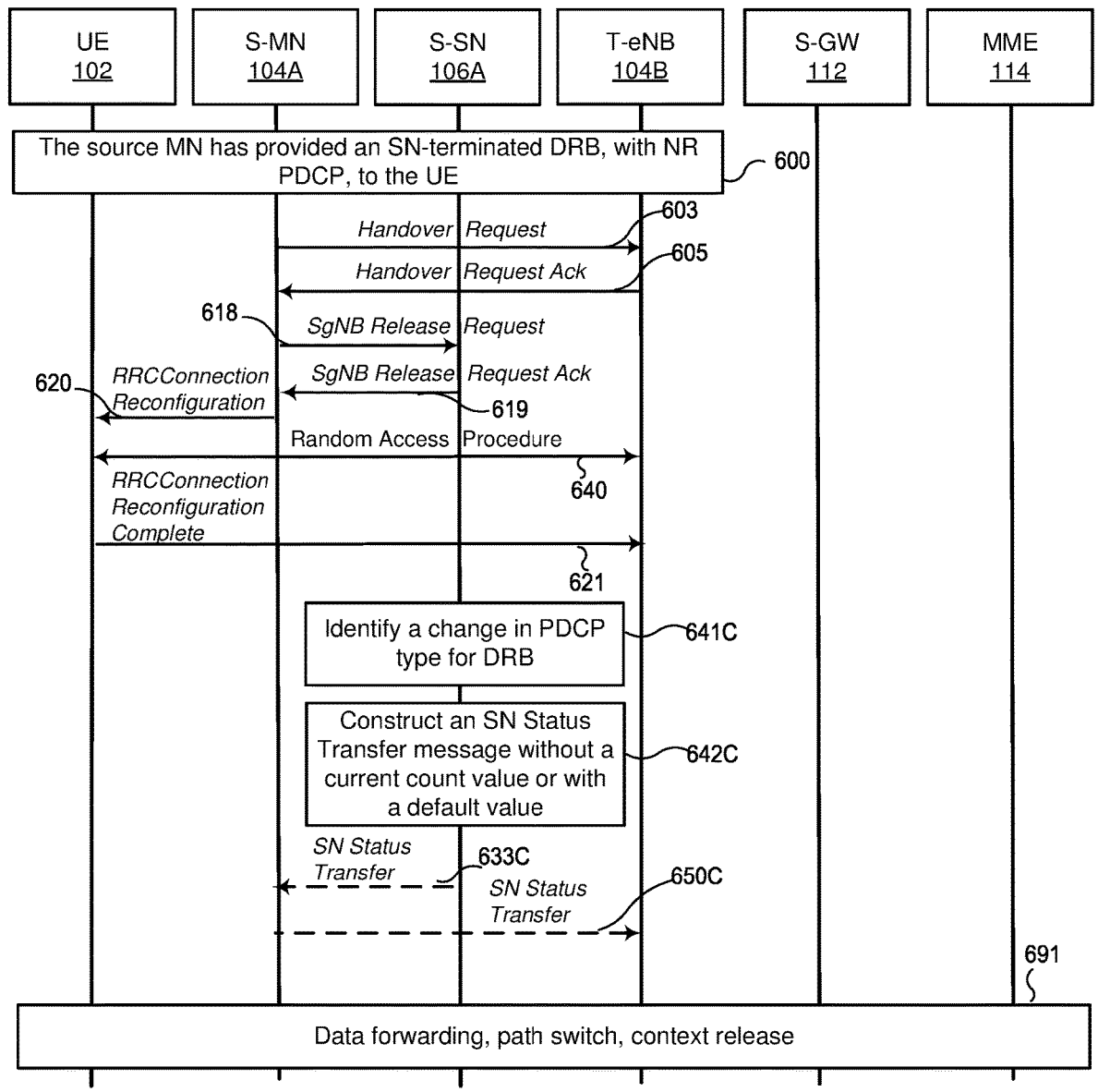
FIG. 6C illustrates a scenario in which a source second node station, during an MN-to-eNB change, determines that an MN-terminated DRB is configured with a EUTRA PDCP or NR PDCP and does not include a count value in the first SN status transfer message.

FIGS. 6A, 6B, and 6C illustrate example scenarios that involve an MN-to-eNB change, which generally speaking is a procedure by which an MN and an SN transfer context data to a target eNB for single-connectivity operation. In these scenarios, the UE 102 initially operates in $D_C$ with the eNB 104A and the gNB 106A operating as an MN and an SN, respectively. The MN 104A has provided 600 the UE 102 with one or more MN-terminated DRBs that use NR PDCP configuration, and/or one or more SN-terminated DRBs that use NR PDCP configuration. The MN 104A configures these DRBs with RLC AM.

The MN 104A determines to hand over the UE 102 to the eNB 104B based on measurement reports from the UE 102, for example. The MN 104A thus can be referred to as a source MN (S-MN) 104A, the SN 106A as a source SN (S-SN) 106A, and the eNB 104B as a target eNB (T-eNB) 104B. The S-MN 104A transmits 603 a Handover Request message to the T-eNB 104B, which chooses to not configure EN-$D_C$ or other type of $D_C$, and thus the T-eNB 104B reconfigures the one or more DRBs, e.g., an SN-terminated DRB $D_D$, to use EUTRA PDCP instead of NR PDCP. The T-eNB 104B transmits 605 a Handover Request Acknowledge message to the S-MN 104A. The Handover Request Acknowledge message can include an RRCConnectionReconfiguration IE that in turn includes a RadioResourceConfigDedicated IE with PDCP configuration.

The S-MN 104A terminates the $D_C$ operation by sending 618 an SgNB Release Request message to the S-SN 106A and receiving 619 an SgNB Release Request Acknowledge message in response. Further, the S-MN 104A transmits 620 the RRCConnectionReconfiguration received from the T-eNB 104B to the UE 102, and the UE 102 accordingly reconfigures the DRB $D_D$ to use EUTRA PDCP, in accordance with the information in the RadioResourceConfigDedicated IE. The UE 102 and the T-eNB 104B then perform a random access procedure, and the UE 102 transmits 621 to the T-eNB 104B an RRCConnectionReconfigurationComplete message.

The S-SN 106A transmits 633A a first, SN-to-MN SN Status Transfer message to the S-MN 104A and includes the current count value (the UL count and the DL count) for the DRB $D_D$. The S-MN 104A then determines 641A whether the change in the termination point of the DRB $D_D$ from the S-SN 106A to the T-eNB 104B results in a changes the PDCP version the DRB $D_D$ uses. In this example scenario, the S-MN 104A determines that the DRB $D_D$ is configured to use NR PDCP, but the new termination point T-eNB 104B uses EUTRA PDCP. The S-MN 104A accordingly constructs 642 a second, MN-to-eNB SN Status Transfer message without a current count value. The S-MN 104A then transmits 650A the second SN Status Transfer message to the T-eNB 104B via the X2 interface. Similar to the example scenarios above, the S-MN 104A in other cases can determine to not transmit the second SN Status Transfer message to the T-eNB 104B at all, if PDCP version changes for every DRB to which the SN Status Transfer message would refer.

In other implementations, the S-MN 104A constructs a second SN Status Transfer message, sets a UL count value to a default UL count value (e.g., zero) and sets a DL count value to a default DL count value (e.g., zero) for the DRB $D_D$, and includes the E-RAB ID associated with the DRB $D_D$, the UL count value and the DL count value in the second SN Status Transfer message. The S-MN 104A then transmits 650A the second SN Status Transfer message to the eNB 104B via the X2 interface. The T-eNB 104B applies the UL count value and the DL count value respectively to a UL count and a DL count for the DRB $D_D$. In these implementations, the S-MN 104A may ignore the UL count value and the DL count value for the DRB $D_D$ in the first SN-to-MN SN Status Transfer message if the S-MN 104A receives the first, SN-to-MN SN Status Transfer message.

In the scenario of FIG. 6C, the S-SN 106A determines 641C whether the change in the termination point of the DRB $D_D$ from the S-SN 106A to the T-eNB 104B results in a change in the PDCP version the DRB $D_D$ uses (similar to the event 641A) and formats the first, SN-to-MN SN Status Transfer message (event 642C) accordingly (similar to the event 642A or by setting the current count value to a default value such as zero). For example, the S-MN 104A can indicate a change in the PDCP version in the SgNB Release Request message. In another implementation, the S-SN 106A is configured to recognize that this scenario results in a change in PDCP version. If the PDCP version changes (e.g., according to the indication or pre-configuration, the S-SN 106A then determines to include the current count value for the DRB $D_D$ in the first, SN-to-MN SN Status Transfer message, or determines to set the current count value to a default value such as zero and include the current the value in the first, SN-to-MN SN Status Transfer message, or determines to not transmit the first, SN-to-MN SN Status Transfer message to the T-eNB 104B at all. In this implementation, the S-SN 106A transmits 633C a first, SN-to-MN SN Status Transfer message to the S-MN 104A, and the S-MN 104A need not perform the operations 641A or 642A in the scenario of FIG. 6A to modify the count value in the second SN Status Transfer message, and the S-MN 104A can simply use the current count value received in the first SN Status Transfer message when constructing the second SN Status Transfer message The S-MN 104A, the S-SN 106A, the T-eNB 104B, the S-GW 112, and the MME 114 then can perform 691 several procedures, not shown in detail in FIG. 6A to avoid clutter, including data forwarding (from the S-GW 112 to the T-eNB 104B via the S-SN 106A and the S-MN 104A), a secondary RAT data volume report (from the S-SN 106A to the S-MN 104A) followed by a secondary RAT report (from the S-MN 104A to the MME 114), a path switch (involving messages between the T-eNB 104B at one end, and the MME 114 the S-GW 112 at the other end), and UE context release by the T-eNB 104B and the S-MN 104A.

In the scenario of FIG. 6B, the S-SN 106A transmits 633B the SN Status Transfer message to the S-MN 104A and includes the current count value, regardless of whether the PDCP version changes for the DRB $D_D$ as a result of the termination point of the DRB $D_D$ changing. The S-MN 104A also transmits 650B the SN Status Transfer message to the S-MN 104A and includes the current count value, regardless of whether the PDCP version changes for the DRB $D_D$ as a result of the termination point of the DRB $D_D$ changing. However, the T-eNB 104B determines 653 whether the change in the termination point of the DRB $D_D$ results in a changes the PDCP version the DRB $D_D$ uses. The target T-eNB 104B then ignores 654 the count value received in the SN Status Transfer message due to the change in the PDCP version. In another scenario, the T-eNB 104B determines that there is no change in the PDCP version resulting from the change in the termination point of the DRB $D_D$ and applies the current count value, which can include the UL count and the DL count, to the subsequent packets.

Figure 7A:
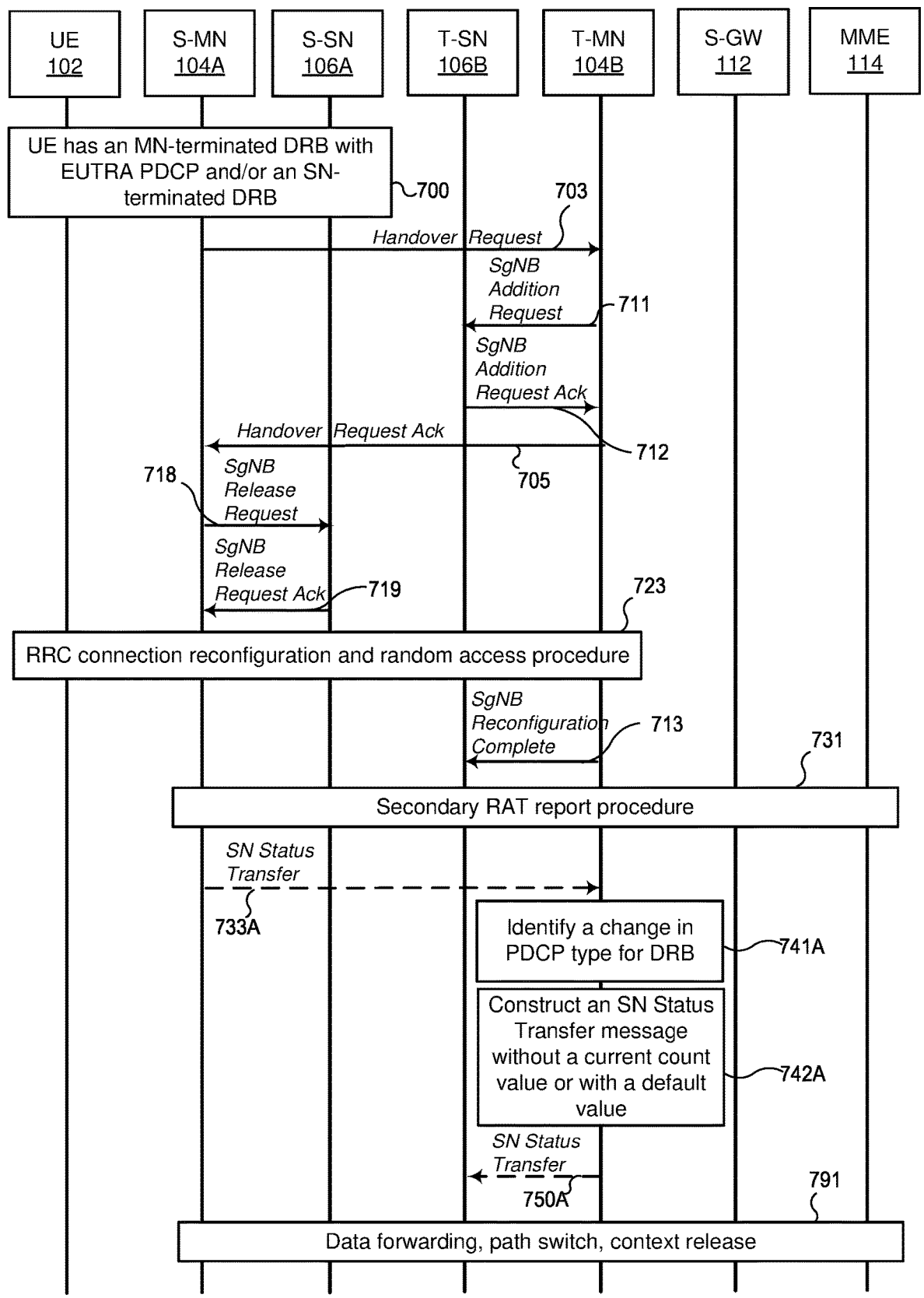
FIG. 7A illustrates a scenario in which a target master node receives a first SN status transfer message, during an inter-MN handover with an MN-initiated SN change, determines that an MN-terminated DRB is configured with a EUTRA PDCP or NR PDCP and does not include a current count value in the second SN status transfer message.
Figure 7B:
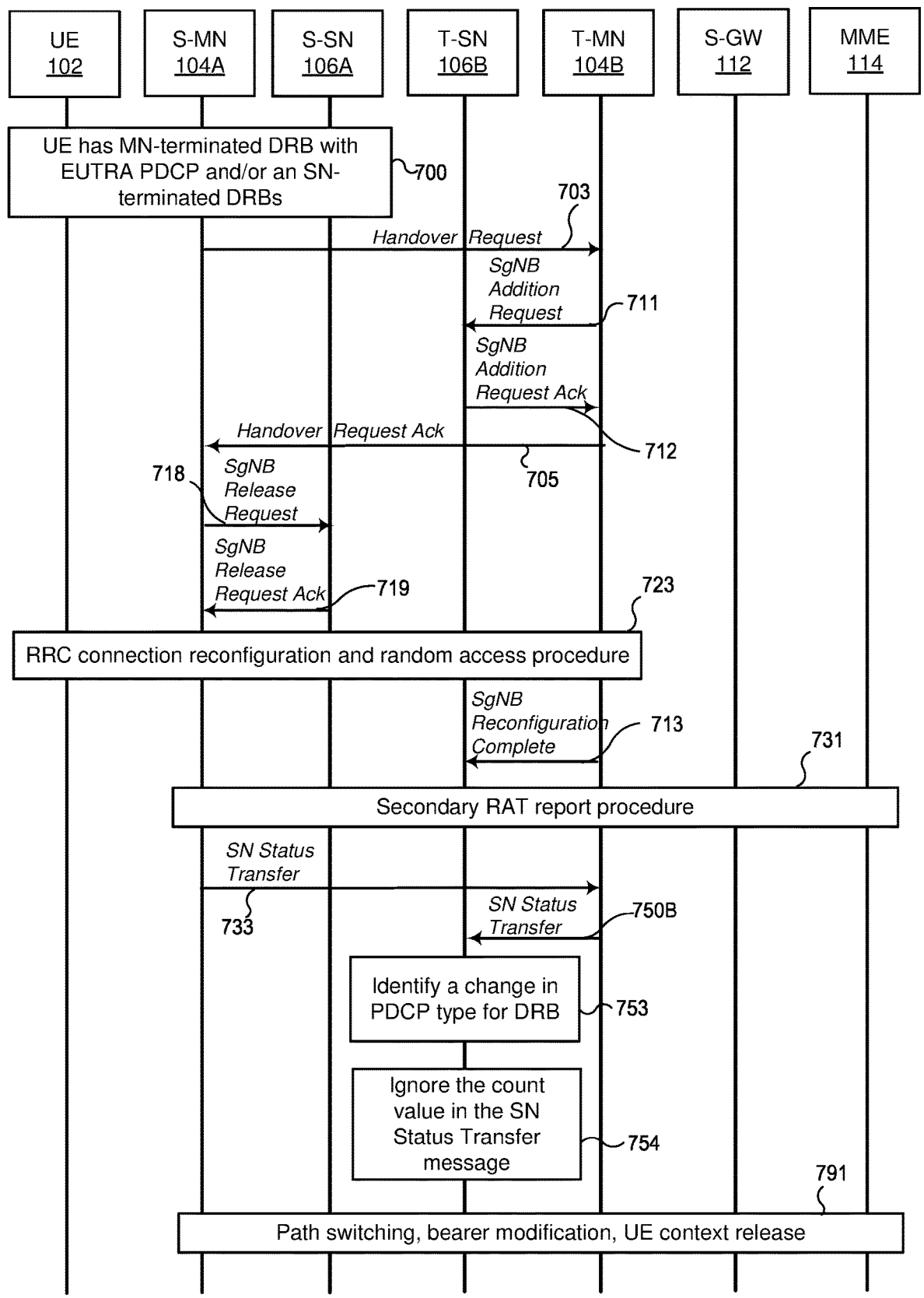
FIG. 7B illustrates a scenario in which a target secondary node, during an inter-MN handover with an MN-initiated SN change, determines that an MN-terminated DRB is configured with a EUTRA PDCP or NR PDCP and ignores the count value in the SN status transfer message.
Figure 7C:
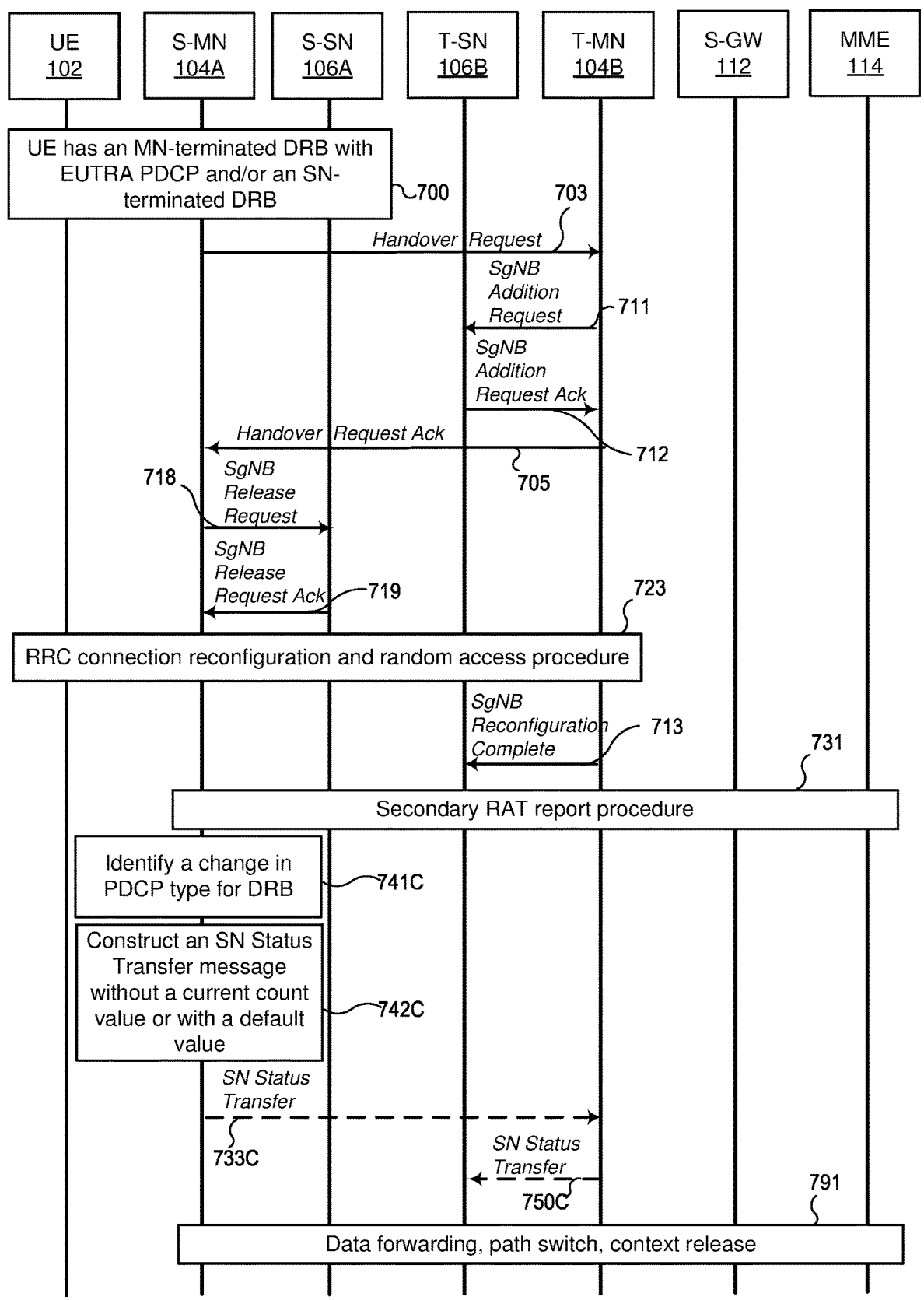
FIG. 7C illustrates a scenario in which source master node, during an inter-MN handover with an MN-initiated SN change, determines that an MN-terminated DRB is configured with a EUTRA PDCP or NR PDCP and does not include a current count value in the first SN status transfer message.

In the scenarios of FIG. 7A, 7B, or 7C, the UE 102 operating in $D_C$ performs a handover procedure from the eNB 104A, operating as the S-MN relative to the gNB 104B, operating as an S-SN. The target of the handover is another MN that can connect to another SN, so that the UE can continue operating in $D_C$. In this scenario, an MN (in particular, the T-MN) initiates a change in the secondary node.

In particular, the T-MN 104A initially provides 700 the UE with one or more DRBs including an MN-terminated DRB $D_E$ using EUTRA PDCP. The T-MN 104A transmits 703 a Handover Request message to the T-MN 104B. The T-MN 104B however determines it should offload the MN-terminated DRB $D_E$ to the gNB 106B, which will operate as a T-SN.

The eNB 104B transmits 711 to the gNB 106B an SgNB Addition Request message including an indication that the DRB $D_E$ should become an SN-terminated DRB. The gNB 106B transmits 712 an SgNB Addition Request Acknowledge message in response. The SgNB Addition Request Acknowledge message includes an SCG configuration (e.g., an RRCReconfiguration IE) in the SgNB Addition Request Acknowledge message, and the SCG configuration in turn includes a radio bearer configuration (e.g., a RadioBearerConfig IE) for the DRB $D_E$. Next, the eNB 104B begins to operate as an T-MN. The T-MN 104B includes the SCG configuration in an RRCConnectionReconfiguration IE for the handover and transmits 705 a Handover Request Acknowledge message including the RRCConnectionReconfiguration IE to the S-MN 104A. The S-MN 104A then terminates the $D_C$ operation by sending 718 an SgNB Release Request message to the S-SN 106A and receiving 719 an SgNB Release Request Acknowledge message in response. The UE 102 reconfigures 723 the MN-terminated DRB $D_E$ to be an SN-terminated DRB $D_E$ (more particularly, a DRB terminated at an SgNB) according to the RadioBearerConfig the UE 102 obtains during the RRC connection reconfiguration procedure. In accordance with the RadioBearerConfig IE, the UE 102 applies NR PDCP to the SN-terminated DRB $D_E$. After the UE 102, the S-MN 104A, and the T-MN 104B complete an RRC connection reconfiguration procedure and a random access procedure, the T-MN 104B transmits 713 an SgNB Reconfiguration Complete message to the T-SN 106B. As a part of performing 731 a secondary RAT report procedure, the S-SN 106A transmits a secondary RAT data volume report to the S-MN 104A, and the S-MN 104A transmits a secondary RAT report to the MME 114. The second RAT report procedure is optional.

The S-MN 104A transmits 733A a first, MN-to-MN SN Status Transfer message to the T-MN 104B and includes the current count value (the UL count and the DL count) for the MN-terminated DRB $D_E$. The T-MN 104B then determines 741A whether the change in the termination point of the DRB $D_E$ from the S-MN 104A to the T-SN 106B results in a change in the PDCP version the DRB $D_E$ uses. In this example scenario, the T-MN 104B determines 741A that the DRB $D_E$ is configured to use EUTRA PDCP, but the new termination point T-SN 106B uses NR PDCP. The T-MN 104B accordingly constructs 742A a second SN Status Transfer message without a current count value.

In other implementations, the T-MN 104B constructs a second SN Status Transfer message, sets a UL count value to a default UL count value (e.g., zero) and sets a DL count value to a default DL count value (e.g., zero) for the DRB $D_E$, and includes the E-RAB ID associated with the DRB $D_E$, the UL count value and the DL count value in the second SN Status Transfer message. The T-MN 104B then transmits 750A the second SN Status Transfer message to the T-SN 106B via the X2 interface. The T-SN 106B applies the UL count value and the DL count value respectively to a UL count and a DL count for the DRB $D_E$. In these implementations, the T-MN 104B can ignore the UL count value and the DL count value for the DRB $D_E$ in the first MN-to-MN SN Status Transfer message if the T-MN 104B receives the first, MN-to-MN SN Status Transfer message.

Similar to the example scenarios above, the T-MN 104B in other cases can determine to not transmit the second SN Status Transfer message to the T-SN 106B at all, if PDCP version changes for every DRB to which the SN Status Transfer message would refer. The T-MN 104B then transmits 750A the second SN Status Transfer message to the T-SN 106B via the X2 interface. Further, the T-MN 104B in other cases can determine that the change in the termination point of the DRB $D_E$ from the S-MN 104A to the T-SN 106B does not change the PDCP version the DRB $D_E$ uses, and include the current count value in the SN Status Transfer message.

After the T-SN 106B processes 750A the second SN Status Transfer message, the base stations, the S-GW 112, and the MME 114 perform 791 data forwarding, path switching, etc. procedures similar to those discussed above.

In the scenario of FIG. 7B, the T-MN 104B transmits 750B the second SN Status Transfer message to the T-SN 106B and includes the current count value, regardless of whether the PDCP version changes for the DRB $D_E$ as a result of the termination point of the DRB $D_E$ changing. Similar to the examples discussed above, the T-SN 106B determines 753 whether the change in the termination point of the DRB $D_E$ results in a change in the PDCP version the DRB $D_E$ uses (e.g., EUTRA PDCP, NR PDCP). The target T-SN 106B then ignores 754 the count value received in the SN Status Transfer message due to the change in the PDCP version. In another scenario, the target T-SN 106B determines that there is no change in the PDCP version as a result of the change in the termination point of the DRB $D_E$ and applies the current count value, which can include the UL count and the DL count, to the subsequent packets.

In the scenario of FIG. 7C, the S-MN 104A determines 741C whether the change in the termination point of the DRB $D_E$ from the S-MN 104A to the T-SN 106B results in a change in the PDCP version the DRB $D_E$ uses (similar to the event 741A) and formats the first, MN-to-MN SN Status Transfer message (event 742C) accordingly (similar to the event 742A or by setting the current count value to a default value such as zero). For example, the T-MN 104B can indicate a change in the PDCP version in the Handover Request Acknowledge message. In another example, the S-MN 104A can be configured to recognize that this scenario results in a change in PDCP version. If the PDCP version changes (e.g., according to the indication or pre-configuration, the S-MN 104A then determines whether to include the current count value for the DRB $D_E$ in the first, MN-to-MN SN Status Transfer message, determines to whether to set the current count value to a default value such as zero and include the current the value in the first, MN-to-MN SN Status Transfer message, or determines to not transmit the first, MN-to-MN SN Status Transfer message to the T-MN 104B at all. In this implementation, the T-MN 104B need not perform the operations 741A or 742A of FIG. 7A to modify the count value in the second SN Status Transfer message, and the T-MN 104B can simply use the current count value received in the first, MN-to-MN SN Status Transfer message when constructing and subsequently transmitting 750C the second SN Status Transfer message.

Figure 8A:
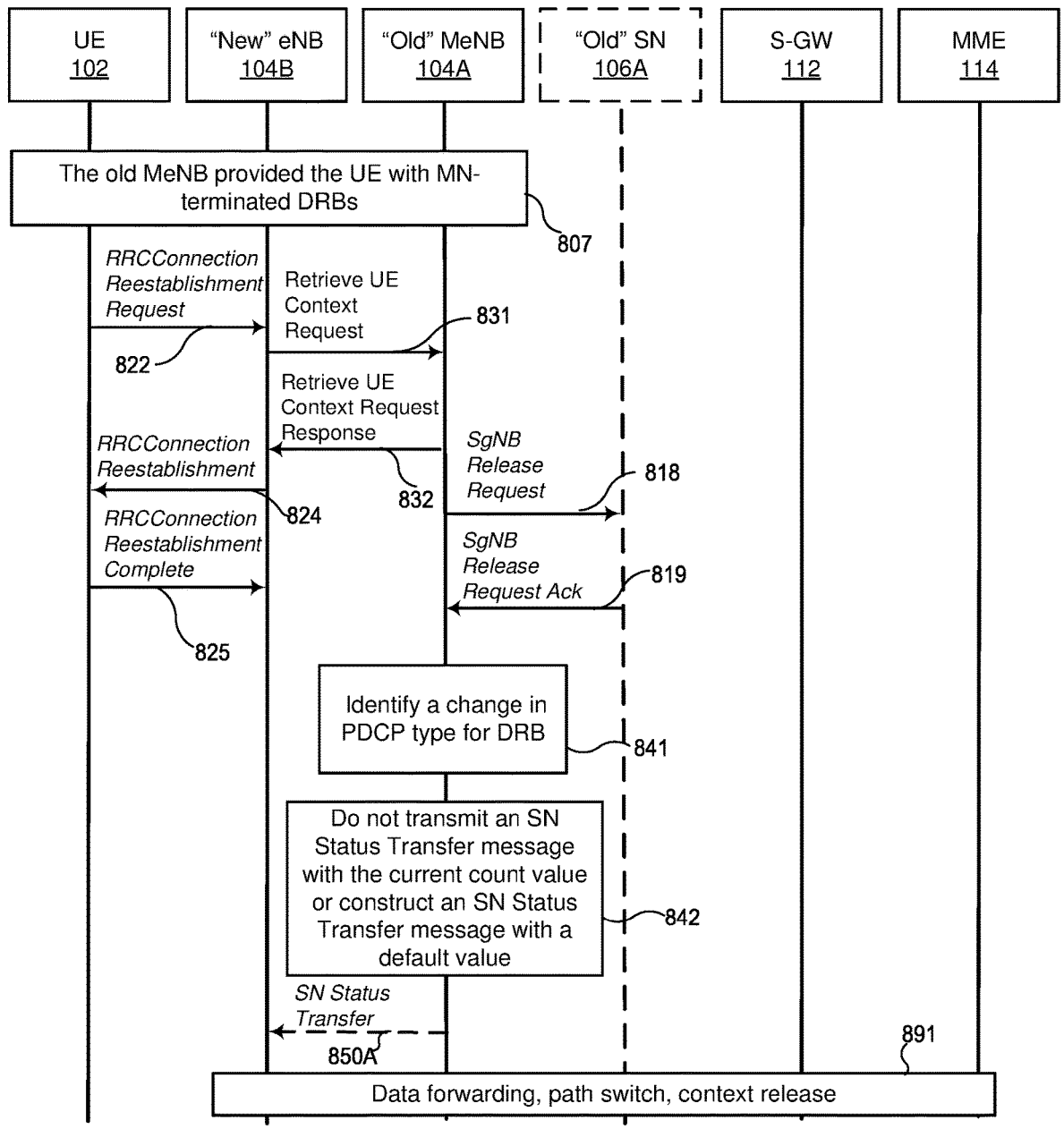
FIG. 8A illustrates a scenario in which an "old" MeNB, during a connection re-establishment procedure, determines that each of the one or more MN-terminated DRBs the old MeNB configured use a different type of PDCP than what the "new" eNB uses, and accordingly does not provide a data unit count to the new eNB.
Figure 8B:
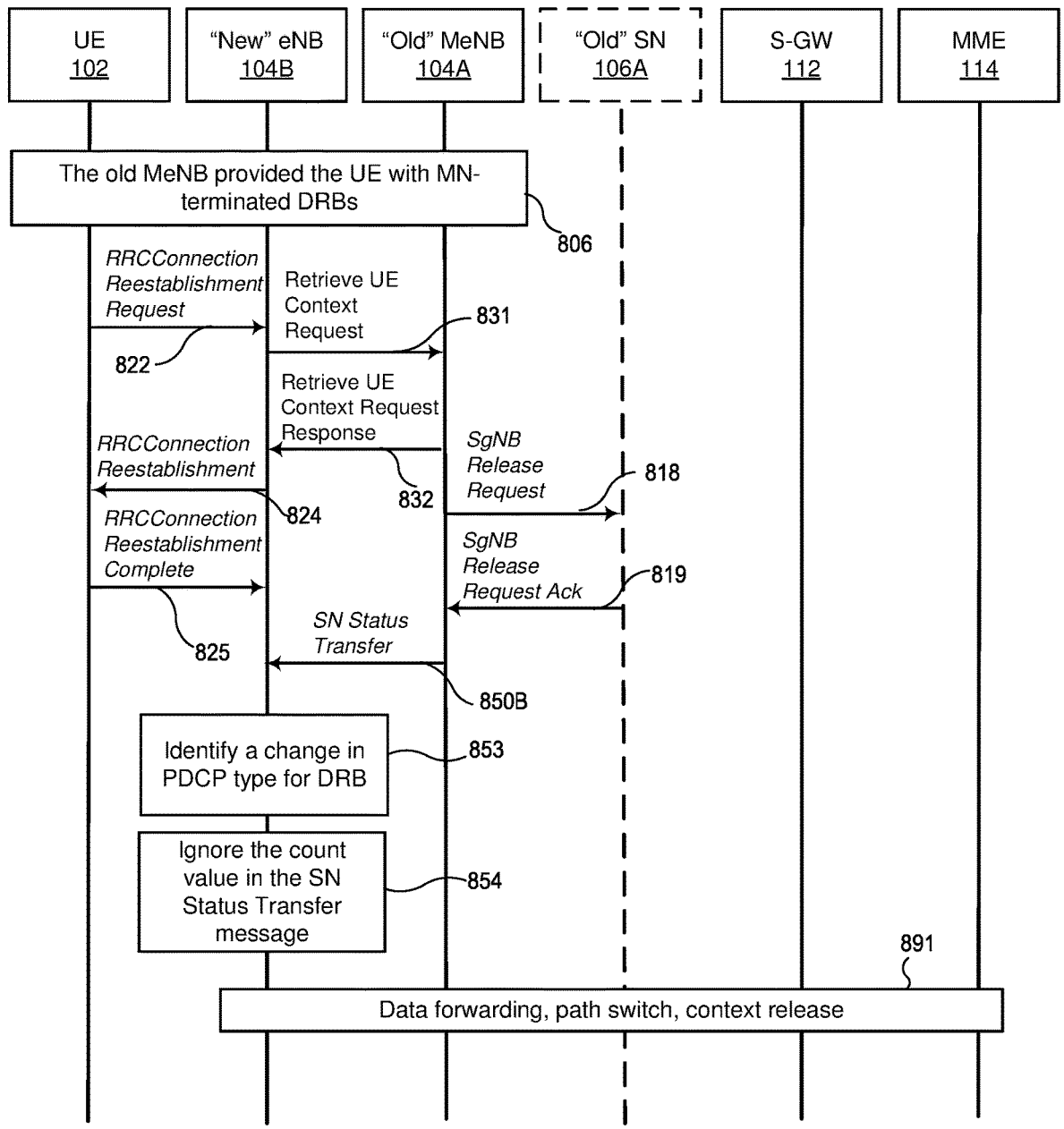
FIG. 8B illustrates a scenario in which the new MeNB, during a connection re-establishment procedure, determines that each of the one or more MN-terminated DRBs the old MeNB configured use a different type of PDCP than what the new eNB uses, and accordingly ignores data unit count received from the new eNB.

Next, FIGS. 8A and 8B illustrate a scenario in which the MeNB 104A initially provides 807 the UE 102 with an MN-terminated DRB $D_F$. Alternatively, the eNB 104A can operate as a standalone eNB, without the SN node 106A. The UE 102 then initiates a connection re-establishment procedure by transmitting 822 an RRCConnectionReestablishmentRequest message to a different eNB 104B, which operates as a "new" eNB relative to the "old" eNB 104A. The new eNB 104B transmits 831 a Retrieve UE Context Request message to the old eNB 104A, receives 832 a Retrieve UE Context Request Response message from the old eNB 104A in response, and transmits 824 an RRCConnectionReestablishment message to the UE 102. The UE in response transmits 825 an RRCConnectionReestablishmetComplete message to the new eNB 104B. When operating as an MeNB, the eNB 104A, upon receiving 831 the Retrieve UE Context Request message, terminates the $D_C$ operation by sending 818 an SgNB Release Request message to the old SN 106A and receiving 819 an SgNB Release Request Acknowledge message from the old SN 106A in response.

The eNB 104A determines 841 whether the change in the termination point of the DRB $D_F$ from the old eNB 104A to the new eNB 104B results in a changes the PDCP version the DRB $D_F$ uses. In this example scenario, the source eNB 104A determines that the DRB $D_F$ is configured to use NR PDCP, but the new termination point eNB 104B uses EUTRA PDCP. In another example scenario, the source eNB 104A determines that the DRB $D_F$ is configured to use EUTRA PDCP, but the new termination point eNB 104B uses NR PDCP over EUTRA. In either case, the eNB 104A determines that all the DRBs which change their termination point from the eNB 104A to the eNB 104B in this scenario also change PDCP version, and determines 842 to not transmit SN Status Transfer message to the eNB 104B. As a result, the eNB 104B applies the default value to the count value, thereby ensuring that the data unit sequencing between the UE 102 and the eNB 104B matches. In another implementation, the eNB 104A transmits to the eNB 104B an SN Status Transfer message but includes the default DL count value (e.g., zero) and the default UL count value (e.g., zero) in the message, similar to the examples discussed above. The base stations, the S-GW 112, and the MME 114 then perform 891 data forwarding, path switching, etc. procedures similar to those discussed above.

Also similar to the example scenarios above, the eNB 104A in another scenario can determine that one or more other DRBs do not change PDCP version upon changing the termination point, and constructs an SN Status Transfer message without a current value for the DRB $D_F$. In yet another scenario, the eNB 104A determines that there is no change in the PDCP version for the DRB $D_F$ and transmits an SN Status Transfer message with the current count value to the eNB 106A, which then uses this value (the DL count and the UL count) to process subsequent inbound and outbound packets.

As illustrated in FIG. 8B, the old eNB 104A alternatively can transmit 850B an SN Status Transfer message to the new eNB 104B and include the current count value, regardless of whether the PDCP version changes for the DRB $D_F$ as a result of the termination point of the DRB $D_F$ changing. The new eNB 104B then determines 853 whether the change in the termination point of the DRB $D_F$ results in a change in the PDCP version the DRB $D_F$ uses. The new eNB 106B then ignores 854 the count value received in the SN Status Transfer message due to the change in the PDCP version. In another scenario, the target new eNB 106B determines that there is no change in the PDCP version due to the change in the termination point of the DRB $D_F$ and applies the current count value, which can include the UL count and the DL count, to the subsequent packets.

Figure 9A:
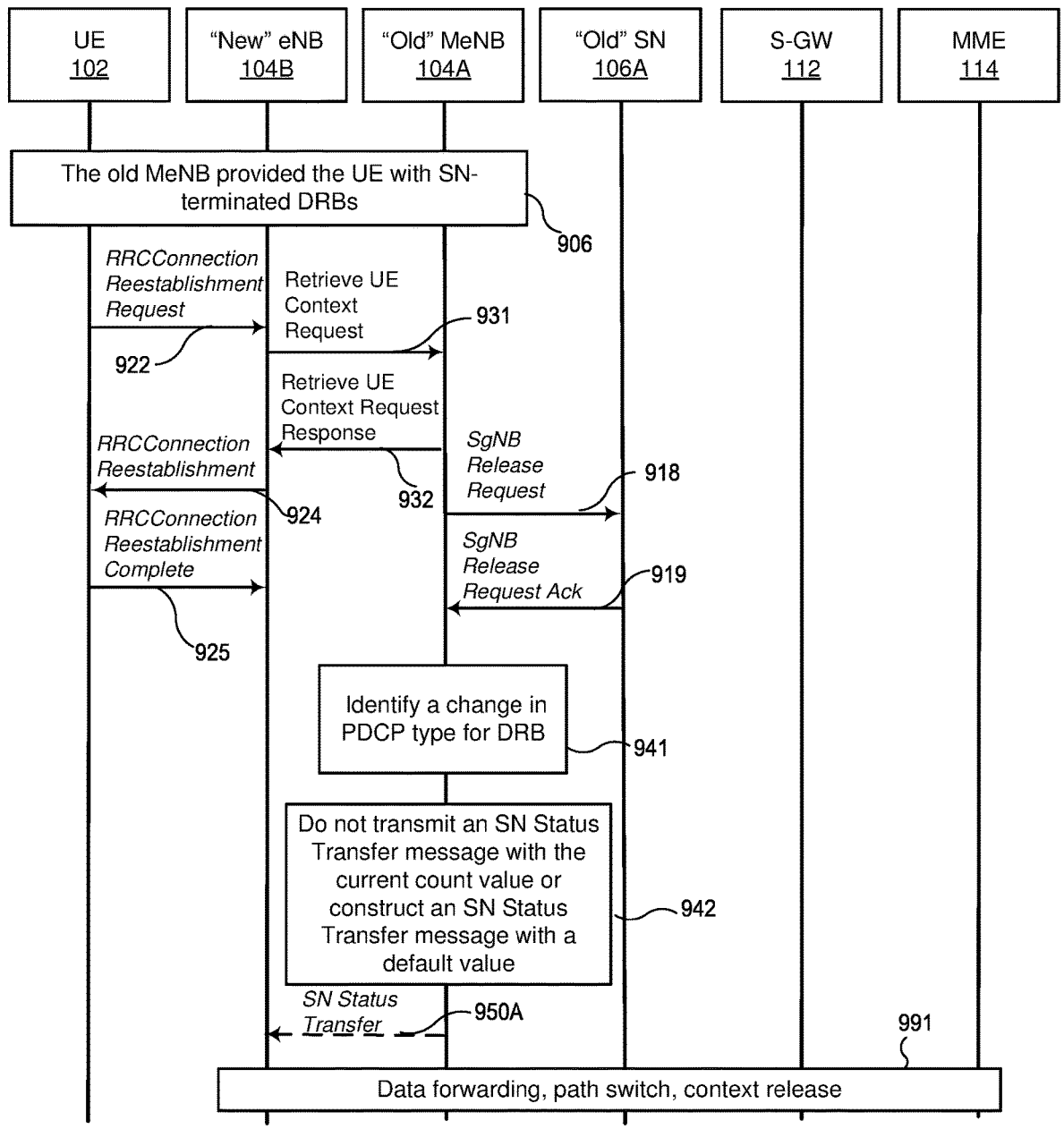
FIG. 9A illustrates a scenario in which an old MeNB, during a connection re-establishment procedure, determines that each of the one or more SN-terminated DRBs the old MeNB configured use a different type of PDCP than what the new eNB uses, and accordingly does not provide a data unit count to the new eNB.
Figure 9B:
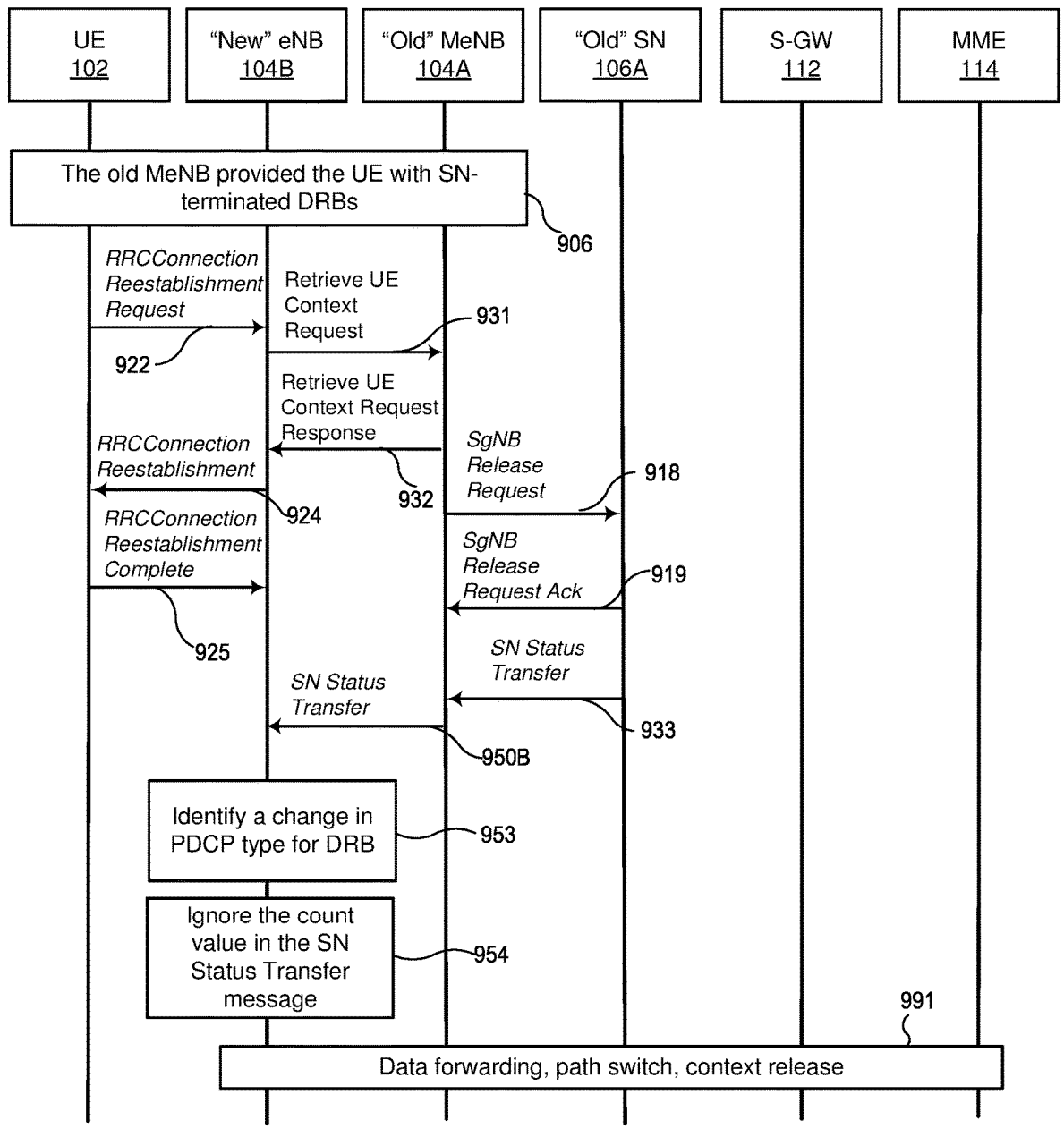
FIG. 9B illustrates a scenario in which the new MeNB, during a connection re-establishment procedure, determines that each of the one or more SN-terminated DRBs the old MeNB configured use a different type of PDCP than what the new eNB uses, and accordingly ignores the data unit count received from the new eNB.

The scenarios of FIGS. 9A and 9B are generally similar to the scenarios of FIGS. 8A and 8B, but the MeNB 104A in this case provides 906 the UE 102 with an SN-terminated DRB $D_G$ rather than an MN-terminated DRB. The events

918, 919, 922, 924, 925, 931, and 932 are similar to the events 818, 819, 822, 824, 825, 831, and 832, respectively, discussed above.

After receiving 919 an SgNB Release Request Acknowledge message, the eNB 104A determines 941 whether the change in the termination point of the DRB $D_G$ from the old SN 106A, which is a gNB, to the new eNB 104B results in a change in the PDCP version the DRB $D_G$ uses. In this example scenario, the source eNB 104A determines that the DRB $D_G$ is configured to use NR PDCP, but the new termination point eNB 104B uses EUTRA PDCP. The eNB 104A determines that all the DRBs which change their termination point from the eNB 104A to the eNB 104B in this scenario also change PDCP version, and determines 942 to not transmit SN Status Transfer message to the eNB 104B. As a result, the eNB 104B applies the default value to the count value, thereby ensuring that the data unit sequencing between the UE 102 and the eNB 104B matches. In another implementation, the eNB 104A transmits to the eNB 104B an SN Status Transfer message but includes the default DL count value (e.g., zero) and the default UL count value (e.g., zero) in the message, similar to the examples discussed above. The base stations, the S-GW 112, and the MME 114 then perform 991 data forwarding, path switching, etc. procedures similar to those discussed above.

Alternatively, in the scenario of FIG. 9B, the old SN 106A transmit 933 a first SN Status Transfer message to the old eNB 104A and includes the current count value. The old eNB 104A in turn transmits 950B a second SN Status Transfer message to the new eNB 104B, regardless of whether the PDCP version changes for the DRB $D_G$ as a result of the termination point of the DRB $D_G$ changing. The new eNB 104B then determines 953 whether the change in the termination point of the DRB $D_G$ results in a change in the PDCP version the DRB $D_G$ uses. The new eNB 106B then ignores 954 the count value received in the SN Status Transfer message due to the change in the PDCP version. In another scenario, the target new eNB 106B determines that there is no change in the PDCP version due to the change in the termination point of the DRB $D_G$ and applies the current count value, which can include the UL count and the DL count, to the subsequent packets.

Figure 10A:
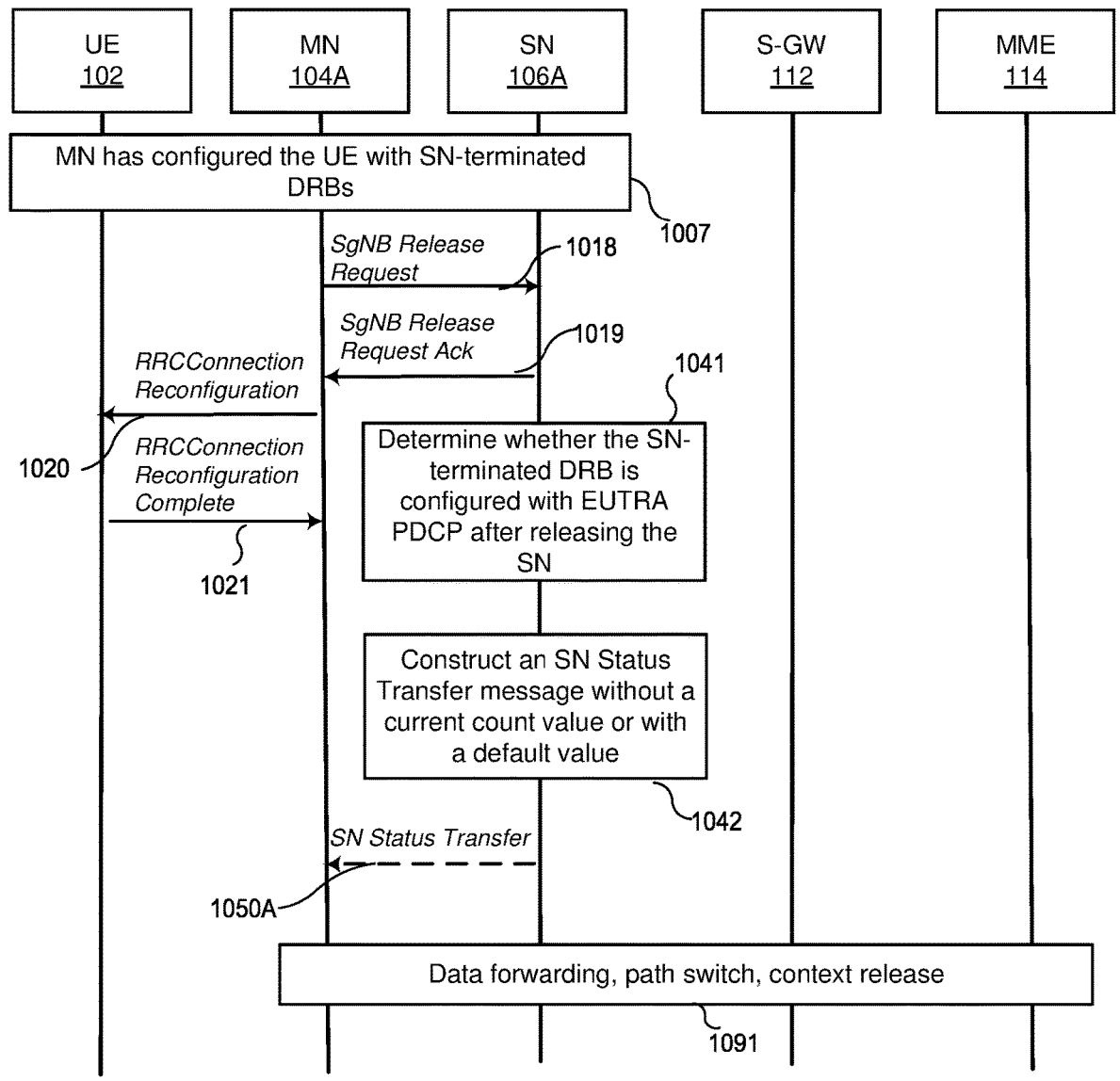
FIG. 10A illustrates a scenario in which an MN, during an MN-initiated SN release procedure, determines that each of the one or more SN-terminated DRBs is configured with a EUTRA PDCP after releasing the SN and does not include a count value in the SN status transfer message.
Figure 10B:
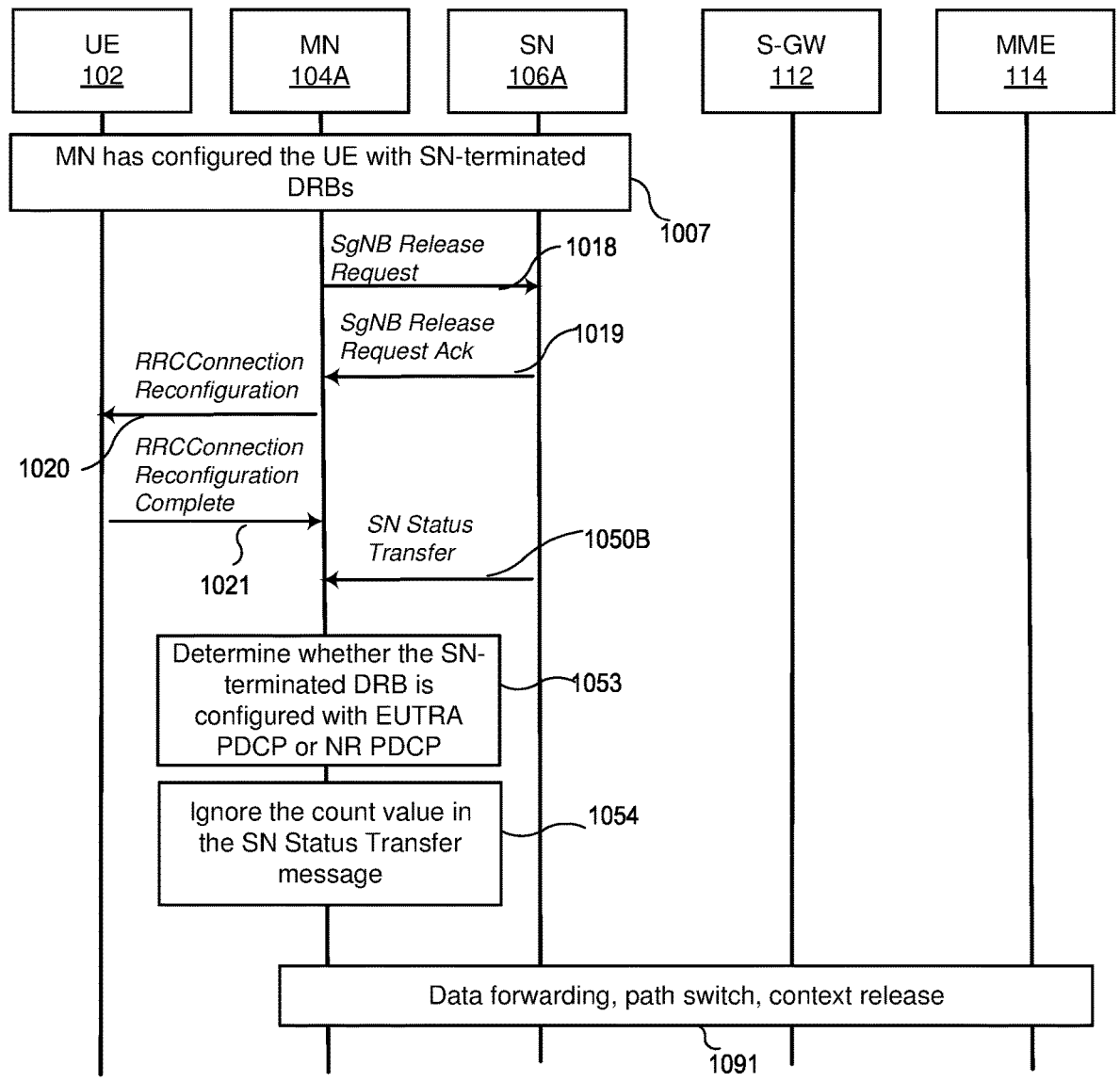
FIG. 10B illustrates a scenario in which an SN, during an MN-initiated secondary node release procedure, determines that an SN-terminated DRB is configured with a EUTRA PDCP and ignores the count value in the SN status transfer message.

Referring to FIGS. 10A and 10B, the eNB 104A in this scenario operates as an MN relative to the gNB 106A, which accordingly operates as an SN, and provides 1007 the UE 102 with one or more SN-terminated DRBs including a DRB $D_H$. The MN 104A initiates a procedure for releasing the secondary node and transmits 1018 an SgNB Release Request message to the SN 106A. The MN 104A then receives 1019 an SgNB Release Request Acknowledge message in response. The MN 104A then transmits 1020 an RRCConnectionReconfiguration message to the UE 102 and receives 1021 an RRCConnectionReconfigurationComplete message in response.

The SN 106A determines 1041 whether the change in the termination point of the DRB $D_H$ from the SN 106A to the MN 104A results in a change in the PDCP version the DRB $D_H$ uses. In this example scenario, the SN 106A determines 1041 that the DRB $D_H$ is configured to use NR PDCP, but the new termination point MN 104A uses EUTRA PDCP. The SN 104A accordingly constructs 1042 an SN Status Transfer message without a current count value. The SN 106A then transmits 1050A the SN Status Transfer message to the MN 104A via the X2 interface. As a result, the MN 104A applies the default value to the count value, thereby ensuring that the data unit sequencing between the UE 102 and the eNB 104A properly matches. In some cases, the SN 104A determines that the PDCP version changes for every DRB, and does not transmit an SN Status Transfer message at all. In another implementation, the gNB 106A transmits to the eNB 104A an SN Status Transfer message but includes the default DL count value (e.g., zero) and the default UL count value (e.g., zero) in the message, similar to the examples discussed above. The base stations 104A and 106A, the S-GW 112, and the MME 114 then perform 1091 data forwarding, path switching, etc. procedures similar to those discussed above.

In the scenario of FIG. 10B, the SN 106A transmits 1050B an SN Status Transfer message to the MN 104A and includes the current count value, regardless of whether the PDCP version changes for the DRB $D_H$ as a result of the termination point of the DRB $D_H$ changing. Similar to the examples discussed above, the MN 104A determines 1053 whether the change in the termination point of the DRB $D_H$ results in a changechanges the PDCP version the DRB $D_H$ uses. The target MN 104A then ignores 1054 the count value received in the SN Status Transfer message due to the change in the PDCP version. In another scenario, the MN 104A determines that there is no change in the PDCP version due to the change in the termination point of the DRB $D_H$ and applies the current count value, which can include the UL count and the DL count, to the subsequent packets.

Figure 11A:
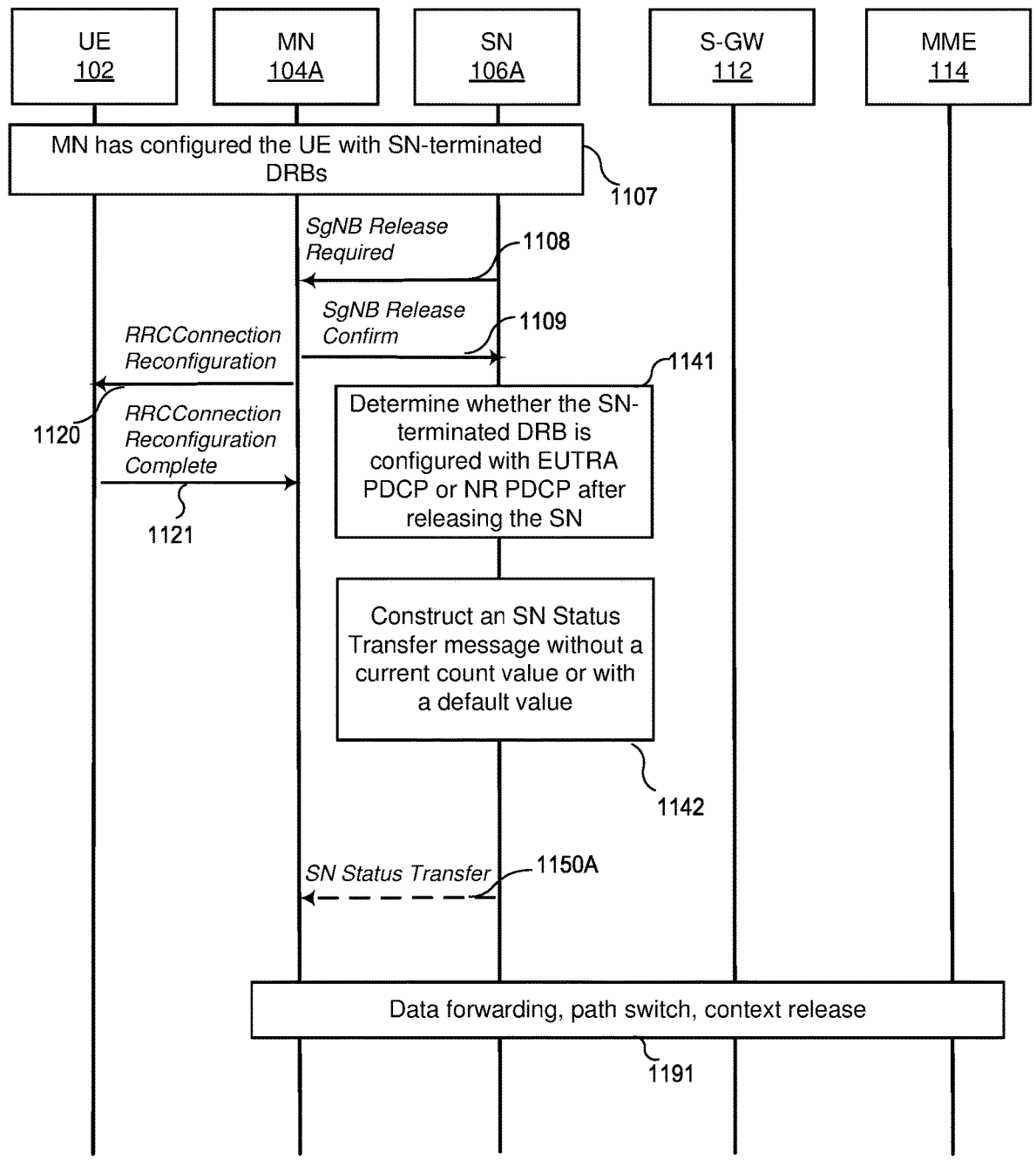
FIG. 11A illustrates a scenario in which an MN, during an MN-initiated SN release procedure, determines that each of the one or more SN-terminated DRBs is configured with a EUTRA PDCP after releasing the SN and does not include a count value in the SN status transfer message.
Figure 11B:
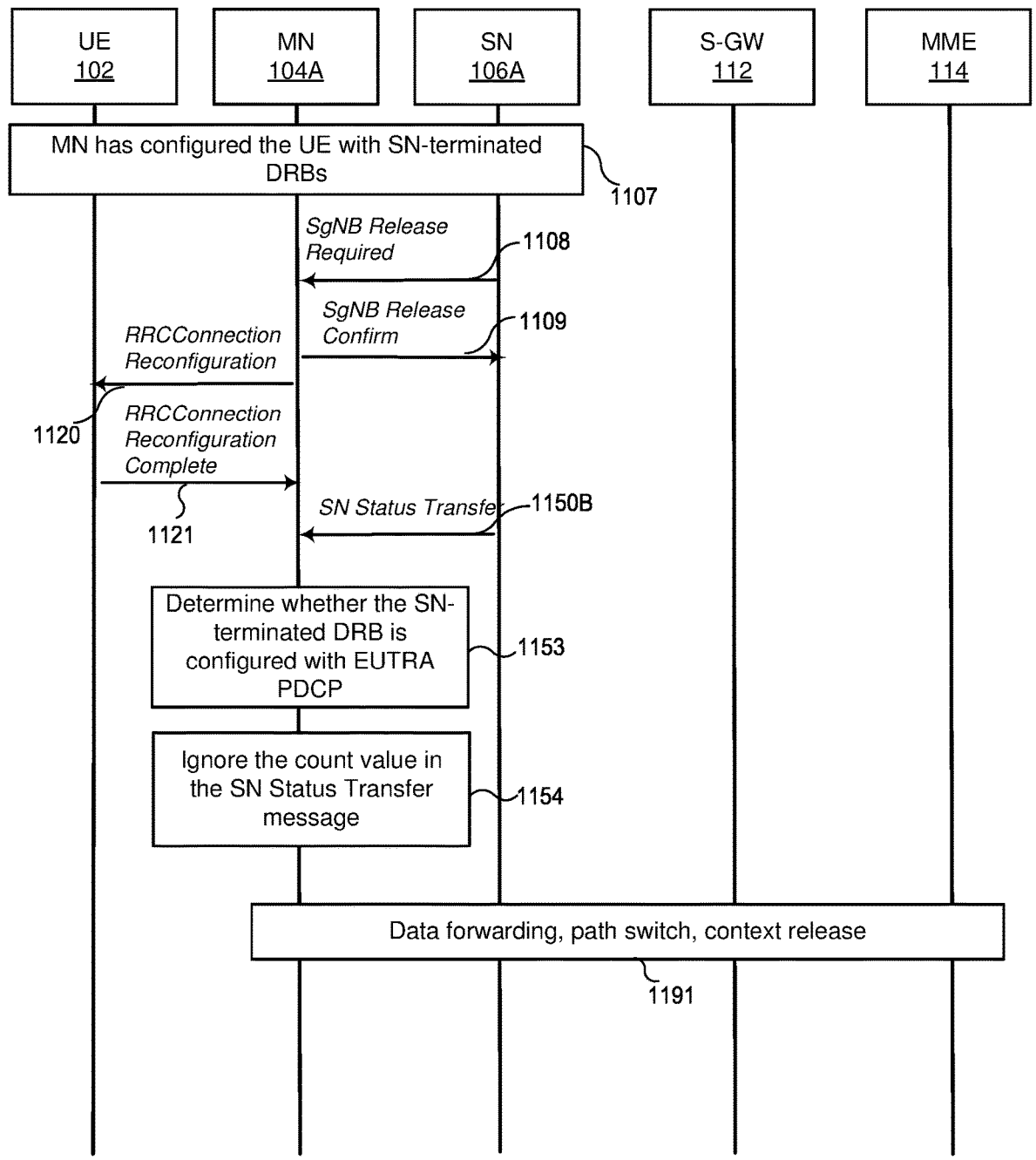
FIG. 11B illustrates a scenario in which an SN, during an MN-initiated secondary node release procedure, determines that an SN-terminated DRB is configured with a EUTRA PDCP after releasing the SN and ignores the count value in the SN status transfer message.

The scenarios of FIGS. 11A and 11B are generally similar to the scenarios of FIGS. 10A and 10B, but in this case the SN 106A initiates a procedure for releasing the secondary node. In particular, the MN 104A initially provides 1107 the UE 102 with one or more SN-terminated DRBs including a DRB $D_I$. The SN 106A transmits 1108 an SgNB Release Required message to the MN 104A. The SN 106A then receives 1109 an SgNB Release Request Confirm message in response. Events 1141, 1142, 1150A (FIG. 11A), 1150B, 1153, 1154 (FIG. 11B), and 1191 are similar to the events 1041, 1042, 1050A, 1050B, 1053, 1054, and 1091, respectively, discussed above.

Figure 12A:
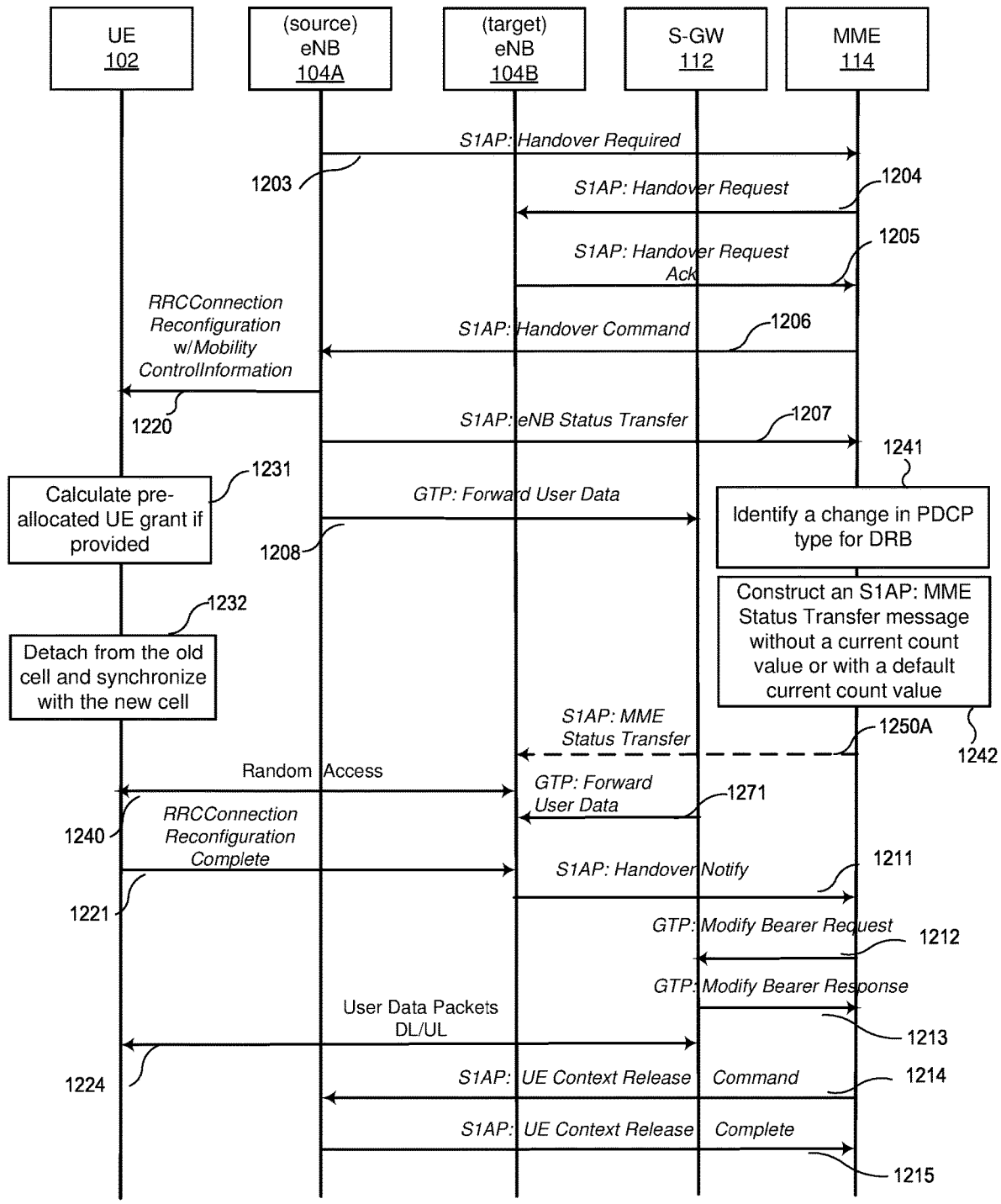
FIG. 12A illustrates a scenario in which an MME, during an indirect handover procedure, identifies a change in PDCP version for a radio bearer and does not include a count value in an MME status transfer message for the target base station.

In the scenario of FIG. 12A, the eNB 104A initially provides the UE 102 with one or more DRBs including a DRB $D_J$. The eNB 104A, operating as a source base station, begins an indirect handover procedure by transmitting 1203 an S1AP: Handover Required message to the MME 114. The MME 114 transmits 1204 an S1AP: Handover Request message to the target eNB 104B, which then responds 1205 with S1AP: Handover Request Acknowledge message to the MME 114. The MME 114 then transmits 1206 an S1AP: Handover Command message to the source eNB 104A. Next, the source eNB 104A transmits 1220 an RRCConnectionReconfiguration message with the SCG configuration to UE 102. The source eNB 104A transmits 1207 an S1AP: eNB Status Transfer message to the MME 114. The source eNB 104A also transmits 1208 an GTP: Forward User Data message to the S-GW 112.

The MME 114 determines 1241 whether the handover of the DRB $D_J$ results in a change in the PDCP version the DRB $D_J$ uses (e.g., EUTRA PDCP, NR PDCP). In this example scenario, the MME 104A determines that the DRB $D_J$ is configured to use EUTRA PDCP, but eNB 104B uses NR PDCP. The MME 114 constructs 1242 an S1AP: MME Status Transfer message without a current count value or, in another implementation, with the default DL count value (e.g., zero) and the default UL count value (e.g., zero). In another scenario, the MME 114 determines that the DRB $D_J$ uses the same PDCP version at both the source eNB and the target eNB, and includes the current count value in the S1AP: MME Status Transfer message. The MME 114 then transmits 1250A an S1AP: MME Status Transfer message to the target eNB 104B. The S-GW 112 begins data forwarding by transmitting 1271 a GTP: Forward User data message to the target eNB 104B.

After receiving 1220 the RRCConnectionReconfiguration message, the UE 102 calculates 1231 a pre-allocated grant. The UE 102 then detaches 1232 from the old cell and synchronizes with the new cell. The UE 102 performs 1249 a random access procedure to synchronize the radio connection with the target eNB 104 and transmits 1221 an RCConnectionReconfigurationComplete message to the eNB 104B. The target eNB 104B then transmits 1211 an S1AP: Handover Notify message to the MME 114. The MME 114 transmits 1212 a GTP: Modify Bearer Request message to the S-GW 112, which responds 1213 with a GTP: Modify Bearer Response message. The UE 102 and the S-GW 112 exchange 1224 packets in the downlink and uplink direction. To the release the UE context, the MME 114 transmits 1214 an S1AP: UE Context Release Command to the source eNB 104A and receives 1215 an S1AP: UE Context Release Complete in response.

Figure 12B:
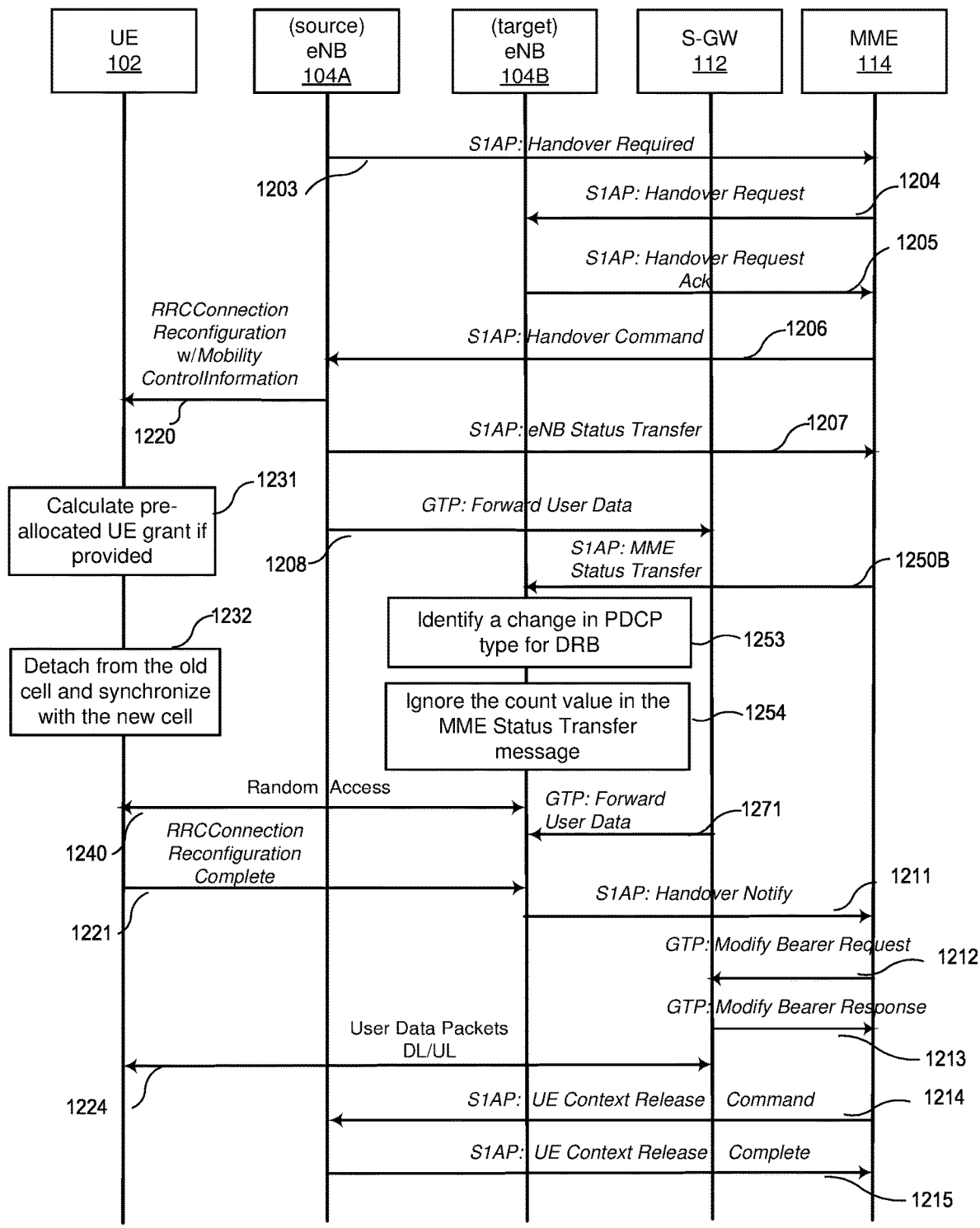
FIG. 12B illustrates a scenario in which a target base station, during an indirect handover procedure, identifies a change in PDCP version for a radio bearer and ignores the count value in the MME status transfer message from the MME.

In the scenario of FIG. 12B, the MME 114 transmits 1250B the SN Status Transfer message to the target eNB 104B and includes the current count value, regardless of whether the PDCP version changes for the DRB $D_J$ as a result of the termination point of the DRB $D_J$ changing. Similar to the examples discussed above, the target eNB 104B determines 1253 whether the handover of the DRB $D_J$ results in a change in the PDCP version the DRB $D_J$ uses. The target eNB 104B then ignores 1254 the count value received in the SN Status Transfer message due to the change in the PDCP version. In another scenario, the target eNB 104B determines that there is no change in the PDCP version as a result of the handover of the DRB $D_J$ and applies the current count value, which can include the UL count and the DL count, to the subsequent packets.

Next, several example methods which a base station of this disclosure (e.g., the eNB 104A, the eNB 104B, the gNB 106A, the gNB 106B) can implement are discussed with reference to FIGS. 12-15.

Figure 13:
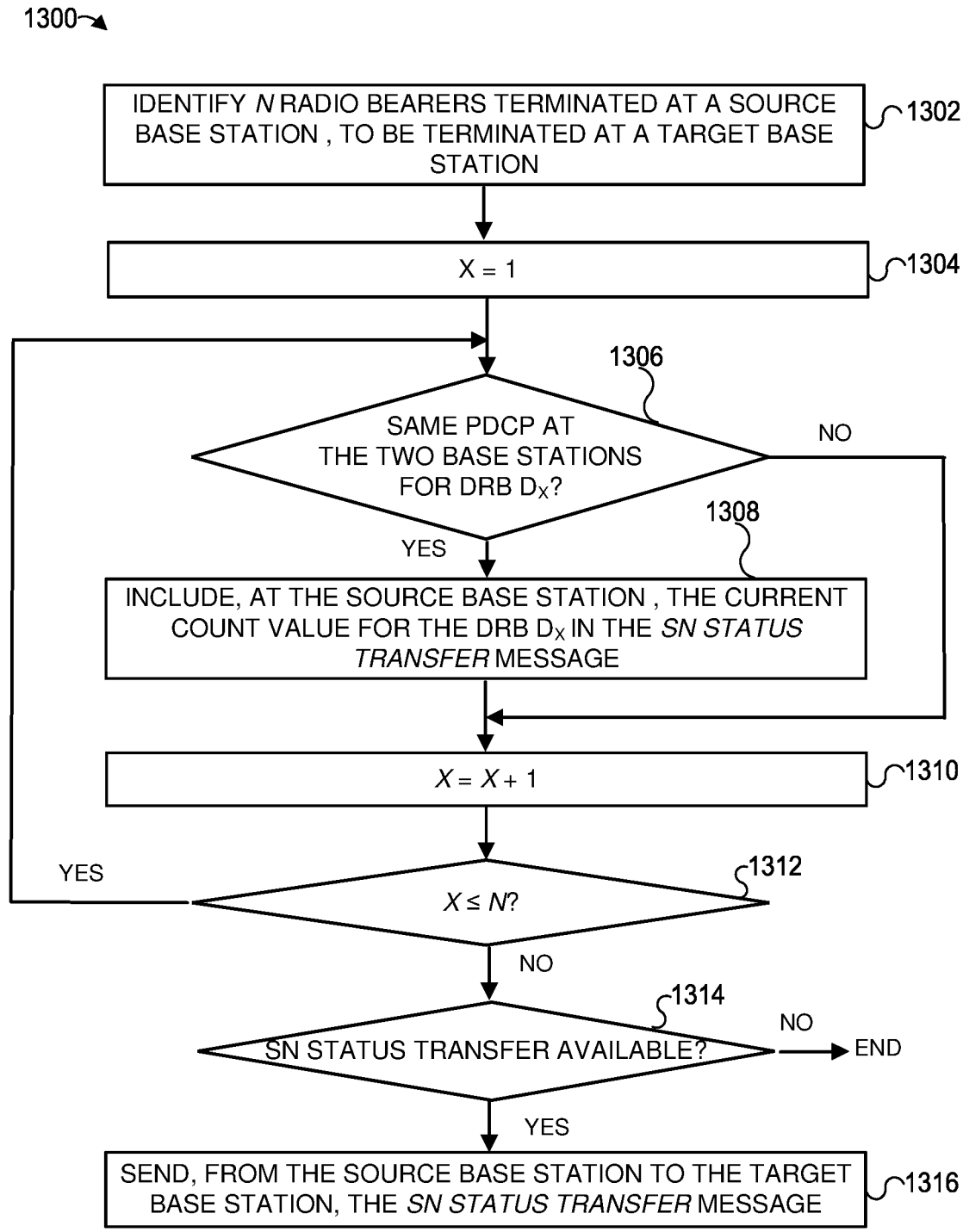
FIG. 13 is a flow diagram of an example method for generating an SN status transfer message according to the techniques of this disclosure, which can be implemented in the base station of FIG. 1A or 1B.

Referring first to FIG. 13, a method 1300 for generating an SN Status Transfer message begins at block 1302, where the base station identifies N radio bearers that terminate at a source base station A but will terminate at a base station B as a result of a procedure such as a secondary node addition, secondary mode modification, handover, SN release, etc. The radio bearer can be an MCG DRB, an SCG DRB, or a split DRB. Because different base stations can implement the method of FIG. 13, the discussion below refers generally to a base station rather than any particular base station illustrated in FIG. 1A or 1B.

At block 1304, the source base station initiates a counter X to the default value, e.g., one. At block 1306, the source base station determines whether the DRB uses the same PDCP version at the source base station as at the target base station. For example, the DRB $D_X$ can use EUTRA PDCP at the source base station and NR PDCP at the target base station due to the different configurations of the source and target base stations. If the source base station determines that the PDCP version is the same, the flow proceeds to block 1308. Otherwise, the flow proceeds to block 1310.

At block 1308, the source base station includes the current value (e.g., DL count and UL count) for the DRB $D_X$ in an SN Status Transfer message. The source base station can include in the SN Status Transfer message.an identifier of the DRB $D_X$ or an identifier of the corresponding E-RAB, for example, a DL count value with the format 250 (see FIG. 2C), and/or a UL count value with the format 250. The source base station generally includes both the UL and the DL count values; however, it is possible for the source base station to set only one of the count values (i.e., either an UL count value or a DL count value).

At block 1310, the source base station increments the counter X and, if X is not greater than the number of DRBs N (block 1312), the flow returns to block 1306 to check the next DRB. Otherwise, if the source base station has exhausted the list of DRBs, i.e., has considered every DRB for which the termination points changes from the source base station to the target base station, the flow proceeds to block 1314. The source base station determines at block 1314 whether there is an SN Status Transfer message to send. In particular, if the source base station determines to not include the current count value for any of the N DRBs, the source base station determines to not generate an SN Status Transfer message at all. See FIG. 8A, event 842; FIG. 9A, event 942. Otherwise, if an SN Status Transfer message is available, the flow proceeds to block 1316, where the source base station transmits the SN Status Transfer message to the target base station. See FIG. 3A, event 350A; FIG. 4A, event 450A; FIG. 5A, event 55A; FIG. 6A, event 650A; FIG. 7A; event 750A; FIG. 10A, event 1050A; FIG. 11A, event 1150A.

Further, in some implementations, the MME 110 can implement a method similar to the method 1300 to generate an MME Status Transfer message. See FIG. 12A, events 1242 and 1250A.

Figure 14:
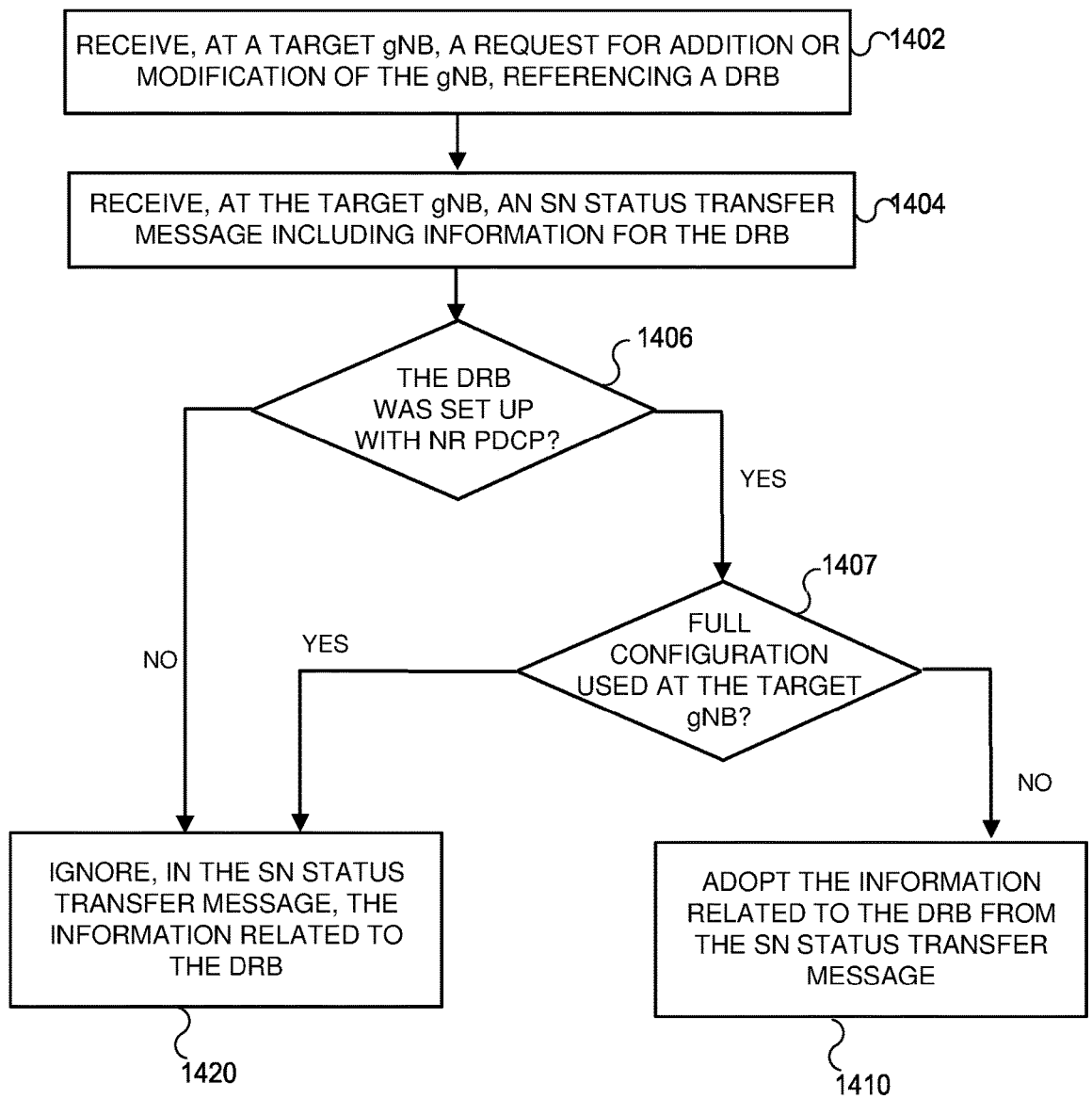
FIG. 14 is a flow diagram of an example method for determining whether a base station should ignore or apply information received in an SN status transfer message during an SN addition procedure, an SN modification procedure, or a similar procedure.

Now referring to FIG. 14, a gNB (e.g., the gNB 106A or 106B) can implement an example method 1400 to determine whether the gNB should ignore or apply information received in an SN Status Transfer message during an SgNB addition procedure, an SgNB modification procedure, or a similar procedure.

The method 1400 begins at block 1402, where the gNB receives a request for an SgNB addition (see, e.g., event 311 in FIG. 3A) or modification (see, e.g., event 415 in FIG. 4A). The request references a DRB which the gNB must support for a certain UE. At block 1404, the gNB receives an SN Status Transfer message (see, e.g., event 350A in FIG. 3A or event 450A in FIG. 4A) that includes the current count value for this new DRB. The current count value can include the DL count value, the UL count value, or both.

At block 1406, the gNB determines whether the node that previously configured the DRB (e.g., the eNB that operates as an MN) used NR PDCP for the DRB (see, e.g., event 351B in FIG. 3B and event 453 in FIG. 4B). To this end, the gNB can process the mcg-RB-Config field of the CG-ConfigInfo IE included in the SgNB Addition Request or SgNB Modification Request message, for example. If the gNB determines that the node used NR PDCP, the flow proceeds to block 1407; otherwise, the flow proceeds to block 1420.

At block 1407, the gNB determines, based on the information in the scg-RB-Config field received from the source base station for example, whether the gNB should apply full RRC configuration to the DRB, and the flow proceeds to block 1410 when full configuration does not apply, or block 1420 when full configuration applies.

At block 1410, the gNB applies the current count value(s) received at block 1404 as a part of the SN Status Transfer message. At block 1420, the gNB ignores the count value received in the SN Status Transfer message (see, e.g., event 352 in FIG. 3B and event 454 in FIG. 4B).

Figure 15:
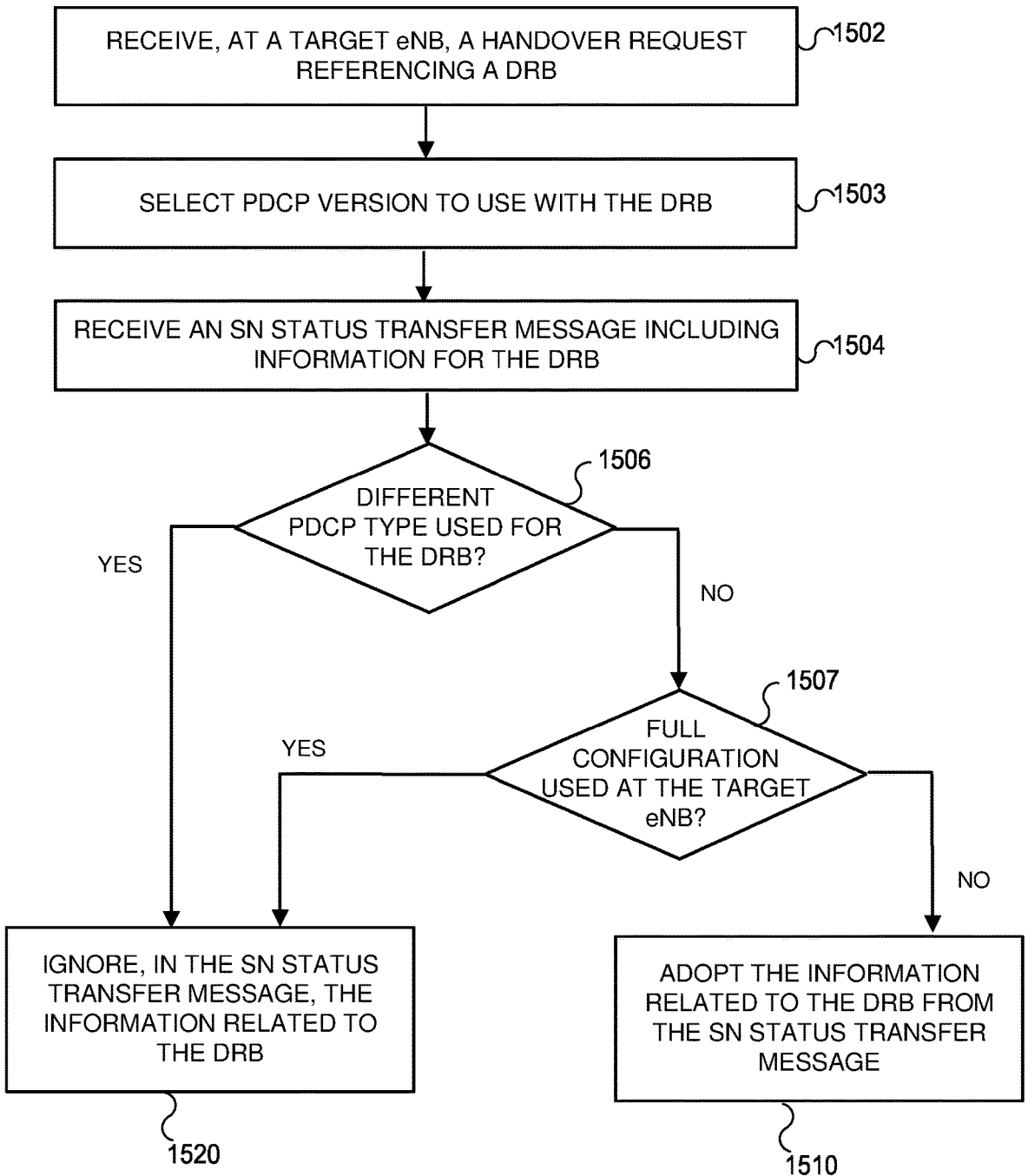
FIG. 15 is a flow diagram of an example method for determining whether a base station should ignore or apply information received in an SN status transfer message during a handover procedure or a similar procedure.

FIG. 15 is a flow diagram of an example method 1500 which an eNB (e.g., the eNB 104B) can implement to determine whether the eNB should ignore or apply information received in an SN Status Transfer message during a handover procedure or a similar procedure.

The method 1500 begins at block 1502, where the eNB receives a Handover Request message (see, e.g., event 503 in FIG. 5B, event 603 in FIG. 6B, event 703 in FIG. 7B). The Handover Request references a DRB which the eNB must support for a certain UE. Next, at block 1503, the eNB determines whether to use NR PDCP or EUTRA PDCP, when the eNB supports both PDCP versions. In other implementations, the eNB supports only EUTRA PDCP, and accordingly selects EUTRA PDCP for every DRB. At block 1504, the eNB receives an SN Status Transfer message that includes the current count value for this new DRB. The current count value can include the DL count value, the UL count value, or both.

At block 1506, the eNB determines whether the node that previously configured the DRB (e.g., the eNB that operates as an MN) used NR PDCP for the DRB (see, e.g., event 553 in FIG. 5B, event 653 in FIG. 6B, event 753 in FIG. 7B). To this end, the eNB can process the as-Config field of the HandoverPreparationInfo IE included in the Handover Request message. If the eNB determines that the node used a different version of PDCP, the flow proceeds to block 1520; otherwise, the flow proceeds to block 1507.

At block 1507, the eNB determines, based on the information in the as-Config field received from the source base station for example, whether the eNB should apply full RRC configuration to the DRB, and the flow proceeds to block 1510 when full configuration does not apply, or to block 1520 when full configuration applies.

At block 1510, the eNB applies the current count value(s) received at block 1504 as a part of the SN Status Transfer message. At block 1520, the eNB ignores the count value received in the SN Status Transfer message (see, e.g., event 554 in FIG. 5B, event 654 in FIG. 6B, event 754 in FIG. 7B).

Figure 16:
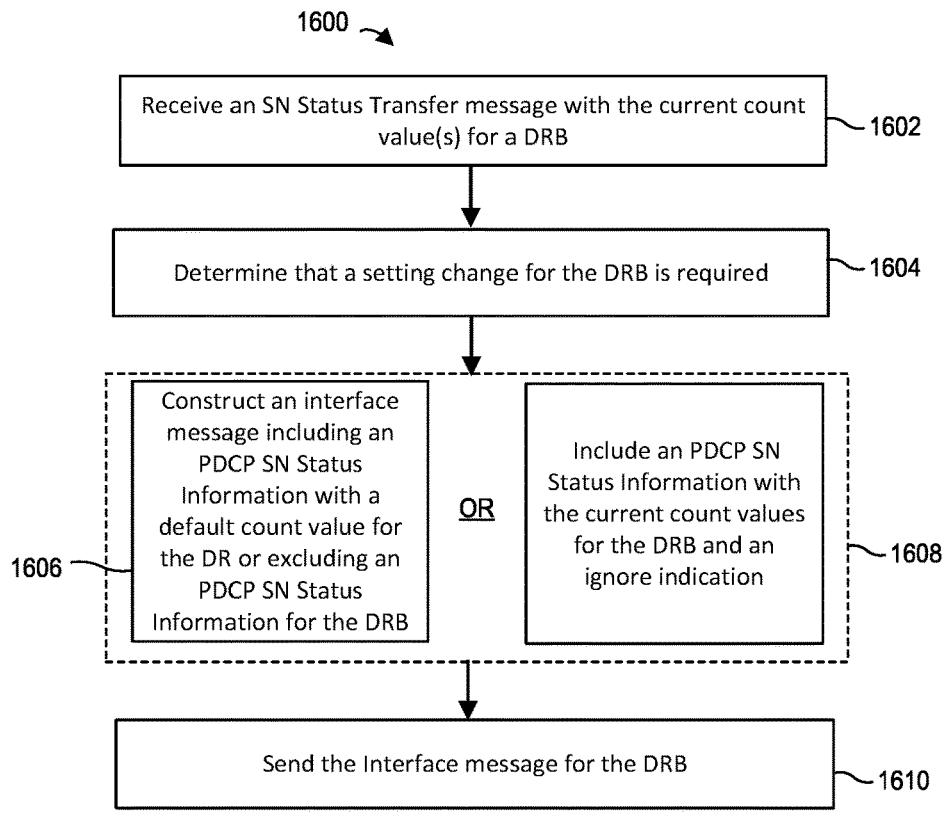
FIG. 16 is a flow diagram of an example method for processing an SN status transfer message at a CU-CP.

FIG. 16 depicts a flow diagram of an example method 1600 for processing an SN status transfer message and generating an interface message (e.g. Bearer Context Modification Request or Bearer Context Setup Request) with suitable PDCP SN Status Information, at a CU-CP or a similar component. The method 1600 can be implemented in the CU-CP 180, for example, which can operate in an SN or an MN. As used in this disclosure, the term "MN" can apply to a base station operating as an MN to provide dual connectivity to a UE as well as to a base station with which the UE communicates in single connectivity.

At block 1602, the CU-CP receives an SN Status Transfer message with the current SN count values for N radio bearers from another base station (see, e.g., event 350C of FIG. 3C, event 350D of FIG. 3D, event 450C of FIG. 4C, event 450D of FIG. 4D, event 450E of FIG. 4E, event 450F of FIG. 4F, event 550C of FIG. 5C, event 550D of FIG. 5D). This event can occur during such procedures as secondary node addition, secondary mode modification, handover, SN release, etc. The radio bearer can be an MCG DRB, an SCG DRB, or a split DRB.

At block 1604, the CU-CP determines that a setting change for a radio bearer is necessary (see, e.g., event 351C of FIG. 3C, event 351D of FIG. 3D, event 451C of FIG. 4C, event 451D of FIG. 4D, event 451E of FIG. 4E, event 451F of FIG. 4F, event 551C of FIG. 5C, event 551D of FIG. 5D). For example, a certain radio bearer $D_X$ can use EUTRA PDCP at the source base station, and the CU-CP receiving the SN Status Transfer message can choose to use NR PDCP instead (or the CU-CP may support only NR PDCP). Other examples of the setting change a change in the PDCP SN length or a change in the RLC mode change. In another scenario, the CU-CP chooses to perform full configuration.

At block 1606, the CU-CP can construct an interface message including a PDCP SN Status Information IE with a default count value (e.g., zero) for the relevant one or more radio bearer(s). Alternatively, the CU-CP at block 1606 can construct the interface message excluding a PDCP SN Status Information IE for the relevant one or more radio bearer(s). See, e.g., event 355C of FIG. 3C, event 455C of FIG. 4C, event 455E of FIG. 4E, event 555C of FIG. 5C.

In another implementation, the CU-CP at block 1608 constructs an interface message including a PDCP SN Status Information IE with the current count value (received in the SN Status Transfer message at block 1602) for the relevant one or more radio bearer(s). However, the CU-CP also includes an indication for the recipient to ignore the PDCP SN Status Information IE. The CU-CP can include the PDCP SN Status Information IE in a DRB To Setup List IE or a DRB To Modify List IE for example. See, e.g., event 355D of FIG. 3D, event 455D of FIG. 4D, event 455F of FIG. 4F, event 555D of FIG. 5D.

At block 1610, the CU-CP sends the interface message for the radio bearer to a CU-UP (e.g. CU-UP 182) or another suitable component (see, e.g., event 357C of FIG. 3C, event 357D of FIG. 3D, event 457C of FIG. 4C, event 457D of FIG. 4D, event 457E of FIG. 4E, event 457F of FIG. 4F, event 557C of FIG. 5C, event 557D of FIG. 5D)

Figure 17:
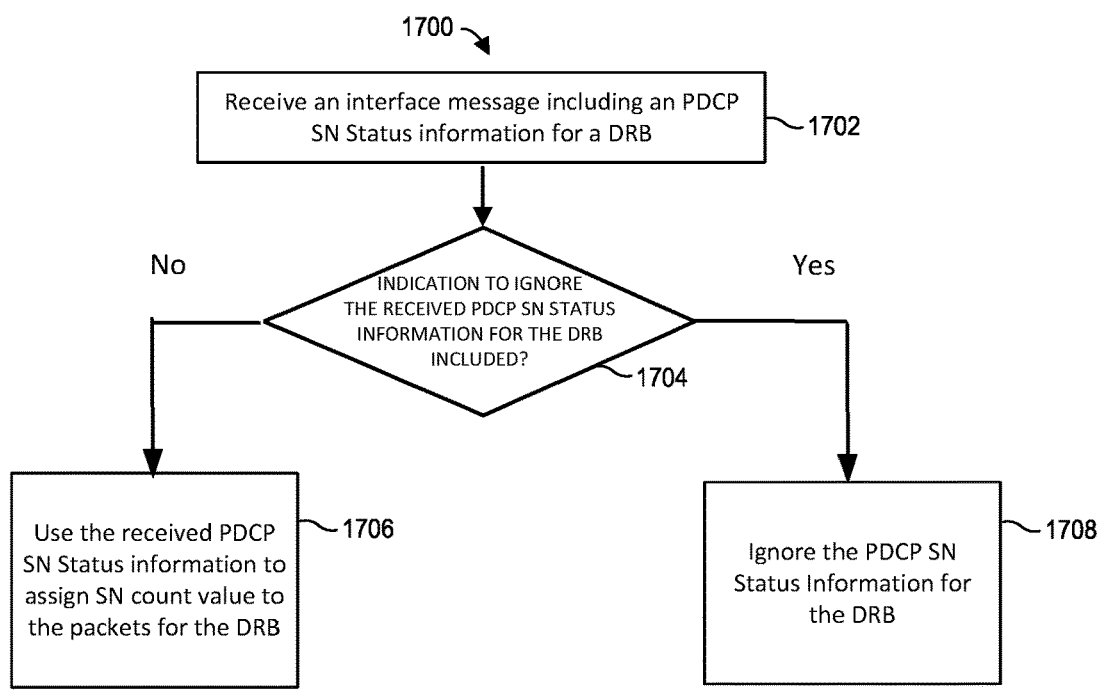
FIG. 17 is a flow diagram of an example method for processing an SN status transfer message at a CU-UP.

Referring now to FIG. 17, a method 1700 for receiving an interface message (e.g. Bearer Context Modification Request or Bearer Context Setup Request) with PDCP SN Status Information and determining whether to apply the count values can be implemented in the CU-UP 182 for example (or another suitable component) operating in an MN or an SN.

The method 1700 begins at block 1702, where the CU-UP receives an interface message including a PDCP SN Status Information IE for a radio bearer as a result of a procedure such as a secondary node addition, secondary mode modification, handover, SN release, etc. See, e.g., event 355D of FIG. 3D, event 455D of FIG. 4D, event 455F of FIG. 4F, event 555D of FIG. 5D. The radio bearer can be an MCG DRB, an SCG DRB, or a split DRB.

At block 1704 the CU-UP determines whether an indication to ignore the received PDCP SN Status Information IE for the relevant radio bearer is included. When the indication is included or has a value indicating that the CU-UP should ignore the PDCP SN Status Information IE for the relevant radio bearer, the flow proceeds to block 1706, where the CU-UP ignores the count values received in the PDCP SN Status Information IE (see, e.g., event 359 of FIG. 3D, event 459 of FIG. 4D or FIG. 4F, event 559 of FIG. 5D). Otherwise, at block 1708, the CU-UP applies the received count values to the relevant radio bearer.

Figure 18:
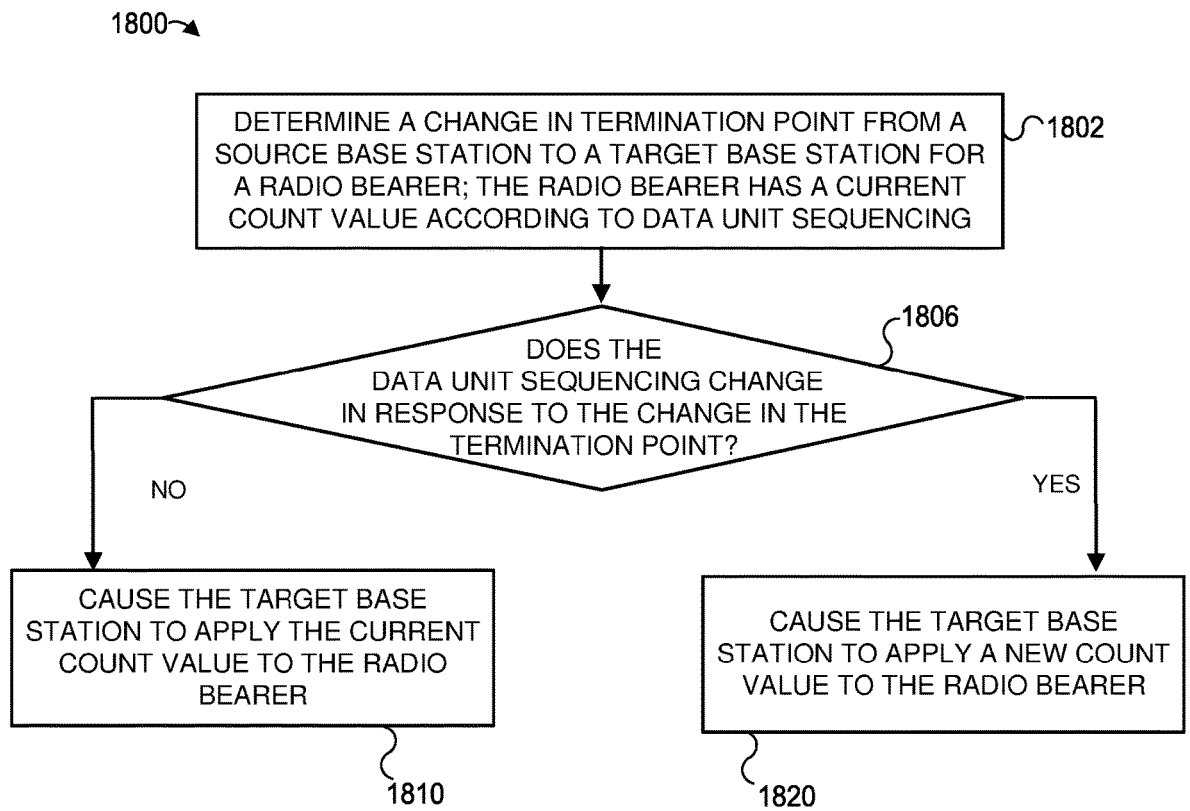
FIG. 18 is a flow diagram of an example method for changing a termination point of a radio bearer, which can be implemented in the system of FIGS. 1A and 1B.

Now referring to FIG. 18, an example method 1800 for changing a termination point of a radio bearer can be implemented in one or more base stations or the MME 114 of FIG. 1A or 1B, collectively referred to as the processing entity. The method 1800 begins at block 1804, where the processing entity determines, for a certain radio bearer (e.g., a DRB), a change in the termination point for the radio bearer from a source base station to a target base station. The processing hardware that executes the methods 1800 can be a part of the source base station or the target base station.

In the examples above, a processing entity determining a change in the termination point for a radio bearer can correspond to the MN 104A generating and transmitting 311 the SgNB Addition Request message, or the SN 106A receiving 311 this message (see FIGS. 3A-B); the MN 104A generating and transmitting 414 the SgNB Modification Required message, or the SN 106A receiving 414 this message (see FIGS. 4A-B); the source eNB 104A generating and transmitting 503 a Handover Request message, or the target eNB 104B receiving 503 this message (see FIGS. 5A-B); the S-MN 104A generating and transmitting 603 a Handover Request message, or the T-eNB 104B receiving 603 this message (see FIGS. 6A-B); the S-MN 104A generating and transmitting 703 a Handover Request message, or the T-MN 104B receiving 703 this message (see FIGS. 7A-B); the new eNB 104A transmitting 831 a Retrieve UE Context Request message, or the old MeNB 104A receiving 831 this message (see FIGS. 8A-B); the new eNB 104A transmitting 931 a Retrieve UE Context Request message, or the old MeNB 104A receiving 931 this message (see FIGS. 9A-B); the MN 104A transmitting 1018 the SgNB Release Request message, or the SN 106A receiving 1018 the SgNB Release Request message (see FIGS. 10A-B); the MN 104A receiving 1108 the SgNB Release Required message, or the SN 106A transmitting 1108 this message (see FIGS. 11A-B); or the MME 114 receiving 1207 an S1AP: eNB Status Transfer message (see FIGS. 12A-B). Further, the processing entity can determine a change in the termination point for a radio bearer at block 1402 of FIG. 14 or block 1502 of FIG. 15, as discussed above.

Next, at block 1806, the processing entity determines whether the change in the termination point for the radio bearer results in a change in data unit sequencing. A source base station can execute the functionality of block 1806 when formatting an SN Status Transfer message or determining whether sending an SN Status Transfer message is necessary. As discussed above, the change in data unit sequencing can be due to a change in PDCP version, e.g., from NR PDCP to EUTRA PDCP or from EUTRA PDCP to NR PDCP. More particularly, the UE establishes a new PDCP entity which in turn restarts data unit sequencing at a default value such as zero, when the PDCP version changes. In the examples of FIGS. 3A-4B, the MN 104A can determine that the PDCP version for a radio bearer will change because the SN 106A is a gNB; in the examples of FIGS. 5A-7B, the source eNB 104A can determine whether the PDCP version for a radio bearer will change based on the information in the Handover Request Acknowledge message (events 505, 605, 705); in the examples of FIGS. 8A-9B, the old eNB 104A can determine whether the new eNB 104B uses NR PDCP or EUTRA PDCP based on the information in the Retrieve UE Context Request message (events 831, 931); in the examples of FIGS. 10A-B, the SN 106A can determine whether the MN 104A uses NR PDCP or EUTRA PDCP based on information received when the MN 104A configured the gNB 106A to operate as an SN. Further, executing block 1806 can include executing block 1306 of FIG. 13.

Alternatively, a target base station can execute the functionality of block 1806 to determine whether to apply or ignore the count value in an SN Status Transfer message or, in some cases, determine whether the target base station should expect an SN Status Transfer message at all. The target base station can determine whether the version of PDCP changes for a radio bearer using mcg-RB-Config field of the CG-ConfigInfo IE in an SgNB Addition Request message or an SgNB Addition Modification Request message, for example (see event 311 of FIG. 3A-B, event 415 of FIGS. 4A-B); using a RadioBearerConfig IE in the Handover Request message (see event 503 of FIGS. 5A-B, event 603 of FIGS. 6A-B, event 703 of FIGS. 7A-B); or information in the Retrieve UE Context Request Response message (event 832 of FIGS. 8A-B, 932 of FIGS. 9A-B). In the examples of FIGS. 10A-B, the MN 104A can determine whether the SN 106A uses NR PDCP or EUTRA PDCP based on the configuration of the gNB 106A as an SN. Further, executing block 1806 in this case can include executing block 1406 of FIG. 14 or block 1506 of FIG. 15.

When the change in the termination point for the radio bearer does not correspond to a change in data unit sequencing, the flow proceeds to block 1810, where the processing entity causes the target base station to apply the current count value to the radio bearer (see also block 1410 of FIG. 14 and block 1510 of FIG. 15). Otherwise, at block 1820, the processing entity causes the target base station to apply a new count value to the radio bearer (see also block 1420 of FIG. 14 and block 1520 of FIG. 15). When the processing entity operates in a source base station or an MME, examples corresponding to block 1820 include event 342 of FIG. 3A, event 444 of FIG. 4A, event 542 of FIG. 5A, event 642 of FIG. 6A, event 742A of FIG. 7A, event 742C in FIG. 7C, event 842 of FIG. 8A, event 942 of FIG. 9A, event 1042 of FIG. 10A, and event 1242 of FIG. 12A. In these cases, the source base station or the MME does not provide the current count value for the radio bearer to the target base station; further, as discussed above, the source base station or the MME in some cases does not transmit an SN Status Transfer message at all. When the processing entity operates in a target base station, examples corresponding to block 1820 include event 352 of FIG. 3B, event 454 of FIG. 4B, event 554 of FIG. 5B, event 654 of FIG. 6B, event 754 of FIG. 7B, event 854 of FIG. 8B, event 954 of FIG. 9B, event 1054 of FIG. 10B, and event 1254 of FIG. 12B.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of aspects reflects another additional embodiment explicitly contemplated by the present disclosure.

Aspect 1. A method in a network for changing a termination point of a radio bearer includes: determining, by one or more processors, a change in the termination point from a source base station to a target base station for the radio bearer with a current count value according to data unit sequencing; determining, by the one or more processors, whether the data unit sequencing changes as a result of the change in the termination point; in a first instance, in response to determining that the data unit sequencing does not change, causing the target base station to apply the current count value to the radio bearer; and in a second instance, in response to determining that the data unit sequencing changes, causing the target base station to apply a new count value different from the current count value to the radio bearer.

Aspect 2. The method of aspect 1, wherein, in the second instance: the source base station operates using a first radio access technology (RAT), and the target base station operates using a second RAT.

Aspect 3. The method of aspect 1, wherein, in the second instance: the source base station and the target base station support a first RAT, the source base station supports a first version of Packet Data Convergence Protocol (PDCP) associated with the first RAT, and the target base station supports a second version of PDCP associated with a second RAT.

Aspect 4. The method of aspect 1, wherein causing the target base station to apply the new count value includes causing target base station to re-start data unit sequencing at zero.

Aspect 5. The method of aspect 1, wherein: causing the target base station to apply the current count value in the first instance includes transmitting, from the source base station to the target base station, a first sequence number (SN) status transfer message including the current count value; and causing the target base station to apply the new count value in the second instance includes transmitting, from the source base station to the target base station, a second SN status transfer message not including the current count value.

Aspect 6. The method of aspect 5, wherein: the radio bearer is a first radio bearer, the current count value is a first count value; the method further comprising, in the second instance: determining, by the one or more processors, a change in a termination point from the source base station to the target base station for a second radio bearer with a second current count value according to the data unit sequencing, determining, by the one or more processors, that the data unit sequencing of the second radio bearer does not change as a result of the change in the termination point, and including the second current count value in the second SN status transfer message.

Aspect 7. The method of aspect 1, wherein: causing the target base station to apply the current count value in the first instance includes transmitting, from a mobility management entity (MME) to the target base station, a first MME status transfer message including the current count value; and causing the target base station to apply the new count value in the second instance includes transmitting, from the MME to the target base station, a second MME status transfer message not including the current count value.

Aspect 8. The method of claim 1, wherein: causing the target base station to apply the current count value in the first instance includes transmitting, from the source base station to the target base station, a first SN status transfer message including the current count value; and causing the target base station to apply the new count value in the second instance includes not transmitting an SN status transfer message from the source base station to the target base station.

Aspect 9. The method of aspect 1, wherein causing the target base station to apply the new count value in the second instance includes transmitting, from the source base station to the target base station, an SN status transfer message including the new count value.

Aspect 10. The method of aspect 1, further comprising: receiving, at the target base station from the target base station, an SN status transfer message including the current count value; wherein: causing the target base station to apply the current count value in the first instance includes using, at the target base station, the current count value received in the SN status transfer message; and causing the target base station to apply the new count value in the second instance includes ignoring, at the target base station, the current count value received in the SN status transfer message.

Aspect 11. The method of claim 10, wherein: the radio bearer is a first radio bearer, the current count value is a first count value; the method further comprising, in the second instance: determining, by the one or more processors, a change in a termination point from the source base station to the target base station for a second radio bearer with a second current count value according to the data unit sequencing, determining, by the one or more processors, that the data unit sequencing of the second radio bearer does not change as a result of the change in the termination point, and using, at the target base station, the second current count value received in the SN status transfer message.

Aspect 12. The method of any of aspects 5-11, wherein determining the change in the termination point is in response to determining that the source base station operates as a master node and has requested an addition of the target base station as a secondary node, to support dual connectivity ($D_C$) for a UE using the radio bearer.

Aspect 13. The method of any of aspects 5-11, wherein determining the change in the termination point is in response to determining that the source base station operates as a secondary node and has requested a modification of the target base station operating a master node, to support $D_C$ for a UE using the radio bearer.

Aspect 14. The method of any of aspects 5-11, wherein determining the change in the termination point is in response to determining that the source base station is performing a handover procedure to hand over a UE using the radio bearer to the target base station.

Aspect 15. The method of any of aspects 5-11, wherein determining the change in the termination point is in response to determining that the source base station, supporting $D_C$ as master node for a UE using the radio bearer, is handing over the radio bearer to the target base station operating in a standalone mode.

Aspect 16. The method of any of aspects 5-11, wherein determining the change in the termination point is in response to determining that the source base station operates as a target MN in an inter-MN handover, and the target base station operates as a secondary SN.

Aspect 17. The method of any of aspects 5-11, wherein determining the change in the termination point is in response to determining that the source base station and the target base station perform a connection re-establishment procedure, and the radio bearer is MN-terminated.

Aspect 18. The method of any of aspects 5-11, wherein determining the change in the termination point is in response to determining that the source base station and the target base station perform a connection re-establishment procedure, and the radio bearer is SN-terminated.

Aspect 19. The method of any of aspects 5-11, wherein determining the change in the termination point is in response to determining that the source base station and the target base station perform an MN-initiated connection release procedure.

Aspect 20. The method of any of aspects 5-11, wherein determining the change in the termination point is in response to determining that the source base station and the target base station perform an SN-initiated connection release procedure.

Aspect 21. The method of aspect 1, wherein the source base station operates as a master node relative to a secondary node; wherein causing the target base station to apply the new count value in the second instance includes: transmitting, from the secondary node to the source base station, a first SN status transfer message including the current count value; determining, at the source base station, that the data unit sequencing changes as a result of the change in the termination point; and transmitting, from the source base station to the target base station, a second SN status transfer message not including the current count value.

Aspect 22. The method of aspect 1, wherein the source base station operates as a master node relative to a secondary node; wherein causing the target base station to apply the new count value in the second instance includes: determining, at the secondary node, that the data unit sequencing changes as a result of the change in the termination point; transmitting, from the secondary node to the source base station, a first SN status transfer message not including the current count value; and transmitting, from the source base station to the target base station, a second SN status transfer message not including the current count value.

What is claimed is:

1. A method in a distributed base station including a central unit (CU) and a distributed unit (DU) for managing a bearer context for a radio bearer, the method comprising:
   receiving, at a control-plane module (CU-CP) of the CU from a source base station, an SN status transfer message including a current count value, to change a termination point of the radio bearer from the source base station to the distributed base station; and
   in response to detecting that the change of the termination point requires a setting change for the radio bearer:
   transmitting, from the CU-CP to a user-plane module (CU-UP) of the CU, a request to modify the bearer context, the request not including the current count value.

2. The method of claim 1, wherein the detecting includes determining, at the CU-CP, that the change in the termination point results in a full configuration.

3. The method of claim 1, wherein the request does not include a Packet Data Convergence Protocol (PDCP) SN Status Information element (IE).

4. The method of claim 1, wherein the radio bearer is a data radio bearer (DRB).

5. The method of claim 1, wherein the transmitting of the request not including the current count value to the CU-UP causes the CU-UP to re-start data unit sequencing at zero.

6. The method of claim 5, wherein the CU-UP re-starts the data unit sequencing in an uplink direction.

7. The method of claim 5, wherein the CU-UP re-starts the data unit sequencing in a downlink direction.

8. The method of claim 1, wherein:
   the source base station operates using a first radio access technology (RAT), and
   the DU operates using a second RAT.

9. The method of claim 1, wherein:
   the source base station and the DU support a first RAT,
   the source base station supports a first version of PDCP associated with the first RAT, and
   the distributed base station supports a second version of PDCP associated with a second RAT.

10. The method of claim 1, wherein:
    the source base station and the distributed base station are implemented as 5G Nodes B (gNBs).

11. A distributed base station configured to manage a bearer context for a radio bearer, the distributed base station comprising:
    a first processing hardware configured to implement a central unit (CU) including a control-plane module (CU-CP) and a user-plane module (CU-UP); and
    a second processing hardware configured to implement a distributed unit (DU), the DU including a component to support a radio interface;
    wherein the distributed base station is configured to:
    receive, at the CU-CP from a source base station, an SN status transfer message including a current count value, to change a termination point of the radio bearer from the source base station to the distributed base station, and
    in response to detecting that the change of the termination point requires a setting change for the radio bearer, transmit, from the CU-CP to the CU-UP, a request to modify the bearer context, the request not including the current count value.

12. The distributed base station of claim 11, wherein the detecting includes determining, at the CU-CP, that the change in the termination point results in a full configuration.

13. The distributed base station of claim 11, wherein the request does not include a Packet Data Convergence Protocol (PDCP) SN Status Information element (IE).

14. The distributed base station of claim 11, wherein the radio bearer is a data radio bearer (DRB).

15. The distributed base station of claim 1, wherein the transmitting of the request not including the current count value to the CU-UP causes the CU-UP to re-start data unit sequencing at zero.

16. The distributed base station of claim 15, wherein the CU-UP re-starts the data unit sequencing in an uplink direction.

17. The distributed base station of claim 15, wherein the CU-UP re-starts the data unit sequencing in a downlink direction.

18. The distributed base station of claim 11, wherein:
    the source base station operates using a first radio access technology (RAT), and
    the DU operates using a second RAT.

19. The distributed base station of claim 11, wherein:
the source base station and the DU support a first RAT,
the source base station supports a first version of PDCP associated with the first RAT, and
the distributed base station supports a second version of PDCP associated with a second RAT.

20. The distributed base station of claim 11, wherein:
the source base station and the distributed base station are implemented as 5G Nodes B (gNBs).

* * * * *